(12) United States Patent
McCormack et al.

(10) Patent No.: US 9,750,068 B2
(45) Date of Patent: *Aug. 29, 2017

(54) VIRTUALIZED PHYSICAL LAYER ADAPTED FOR EHF CONTACTLESS COMMUNICATION

(71) Applicant: Keyssa, Inc., Campbell, CA (US)

(72) Inventors: Gary D. McCormack, Tigard, OR (US); Ian A. Kyles, West Linn, OR (US); Roger D. Isaac, San Jose, CA (US)

(73) Assignee: KEYSSA, INC., Campbell, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/408,937

(22) Filed: Jan. 18, 2017

(65) Prior Publication Data

US 2017/0127465 A1    May 4, 2017

Related U.S. Application Data

(63) Continuation of application No. 14/205,658, filed on Mar. 12, 2014, now Pat. No. 9,559,753.

(60) Provisional application No. 61/799,527, filed on Mar. 15, 2013, provisional application No. 61/845,384, filed on Jul. 12, 2013.

(51) Int. Cl.
*H04B 7/00* (2006.01)
*H04W 76/02* (2009.01)
*H04B 5/00* (2006.01)

(52) U.S. Cl.
CPC ........ *H04W 76/023* (2013.01); *H04B 5/0031* (2013.01)

(58) Field of Classification Search
CPC .. H04B 5/0031; H04B 5/0037; H04W 76/023
USPC .................................................. 455/41.2
See application file for complete search history.

(56) References Cited

U.S. PATENT DOCUMENTS

| | | | |
|---|---|---|---|
| 9,559,753 B2 * | 1/2017 | McCormack | H04B 5/0031 |
| 2008/0008159 A1 | 1/2008 | Bourlas et al. | |
| 2009/0098826 A1 | 4/2009 | Zack et al. | |
| 2009/0257445 A1 | 10/2009 | Chan et al. | |
| 2012/0295539 A1 | 11/2012 | McCormack et al. | |
| 2013/0217336 A1 | 8/2013 | McCormack et al. | |

* cited by examiner

*Primary Examiner* — Eugene Yun
(74) *Attorney, Agent, or Firm* — Van Court & Aldridge LLP

(57) ABSTRACT

A Physical Layer (PHY) of a host system of an electronic device may be implemented as a contactless PHY (cPHY) for extremely high frequency (EHF) contactless communication and the operation of EHF transmitters (TX), receivers (RX) and transceivers (EHF-XCVR) in an extremely high frequency integrated circuit (EHF IC) of the electronic device. The Host-cPHY translates logical communications requests from the Link Layer (LINK) into hardware-specific operations to affect transmission or reception of signals over an EHF contactless link. The Link Layer (LINK) may also be optimized as a contactless Link Layer (cLINK) for EHF contactless communication. A virtualized contactless Physical Layer (VcPHY) may comprise a contactless Physical Layer (Host-cPHY), and a contactless Link Layer (cLINK) for coupling a conventional Link Layer (LINK) with the contactless Physical Layer (Host-cPHY). Multiple data streams may be transported over the EHF contactless link over a range of frequencies.

11 Claims, 25 Drawing Sheets

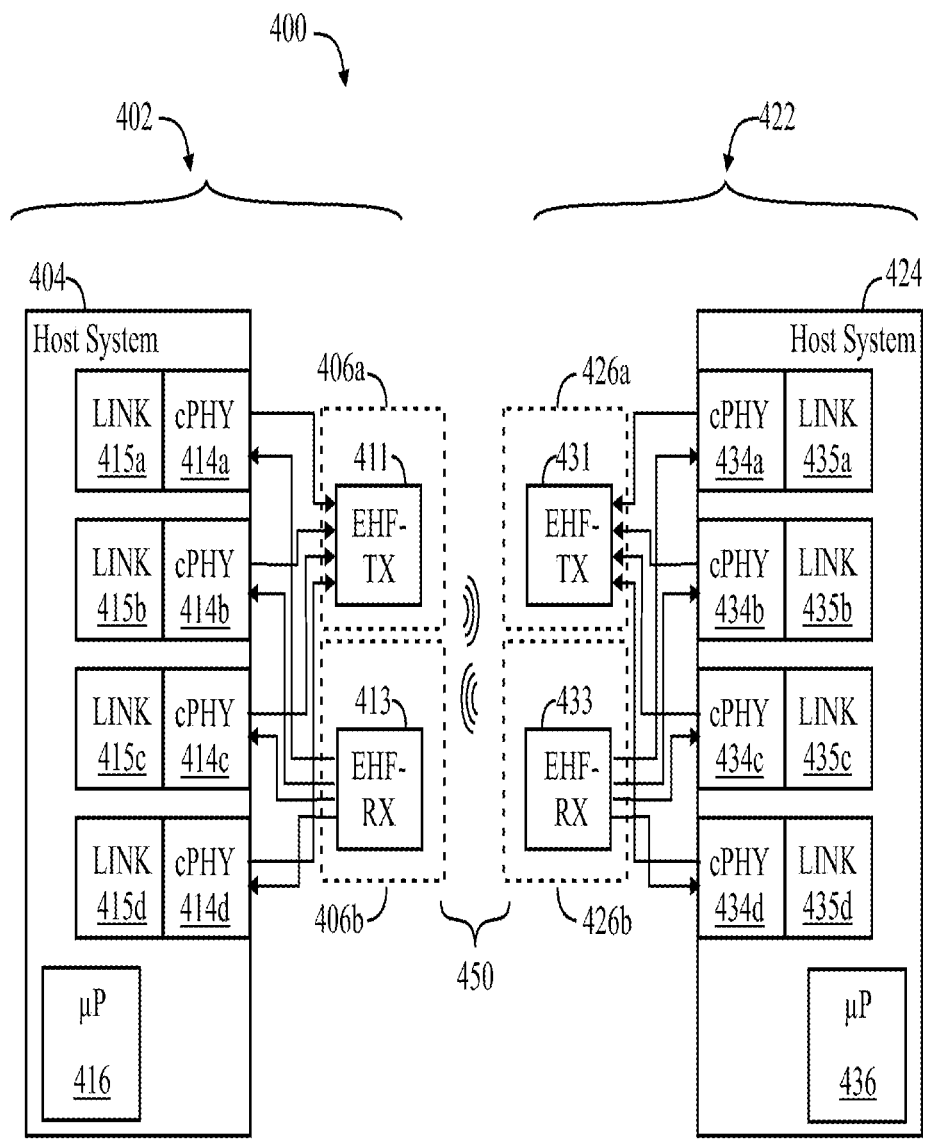

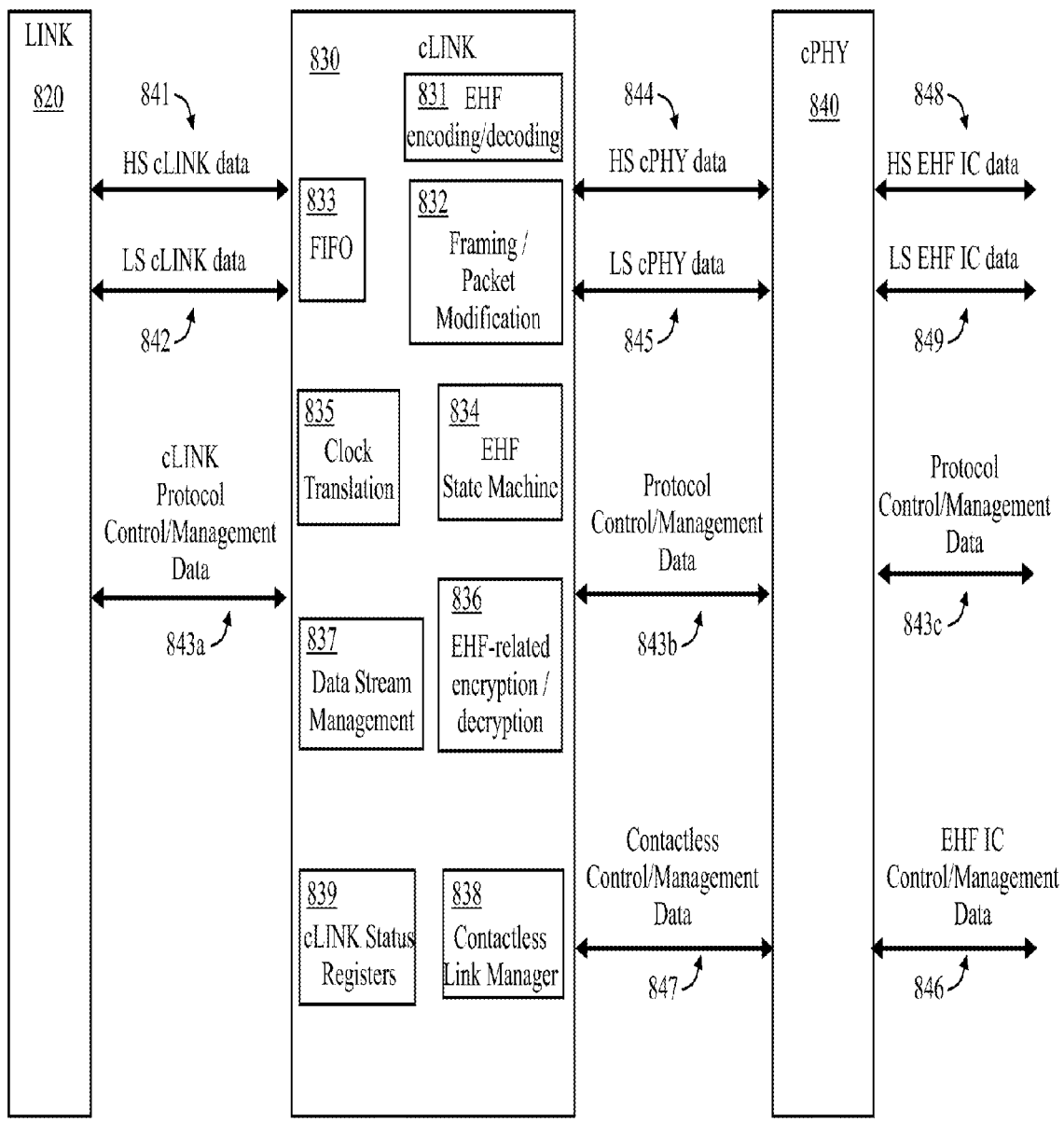

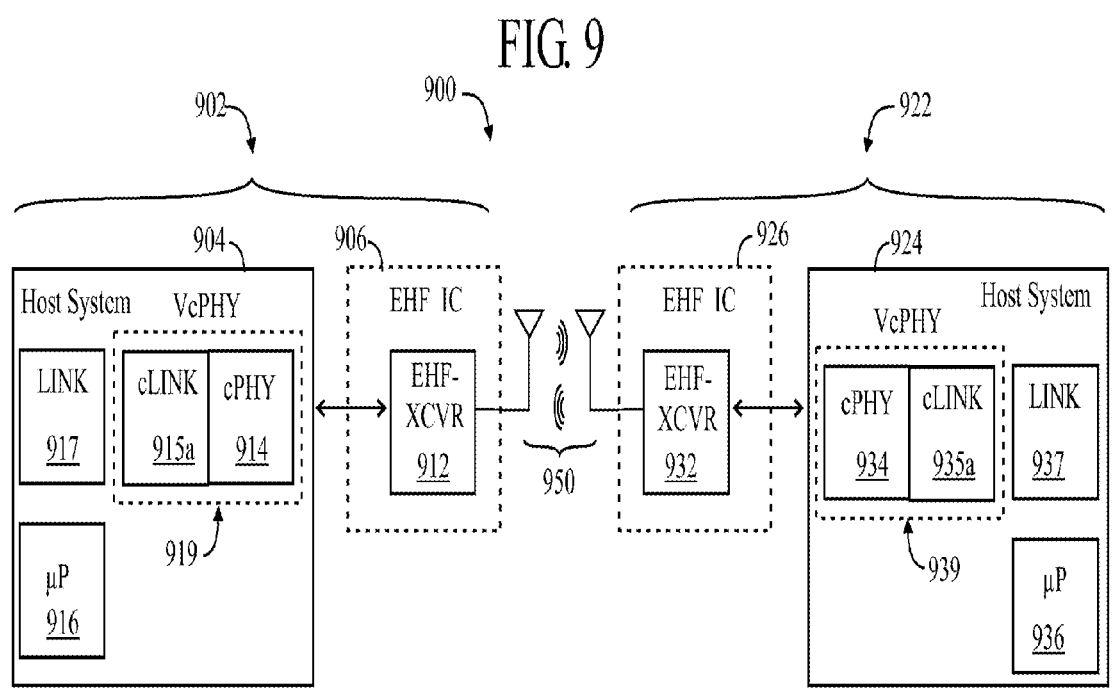

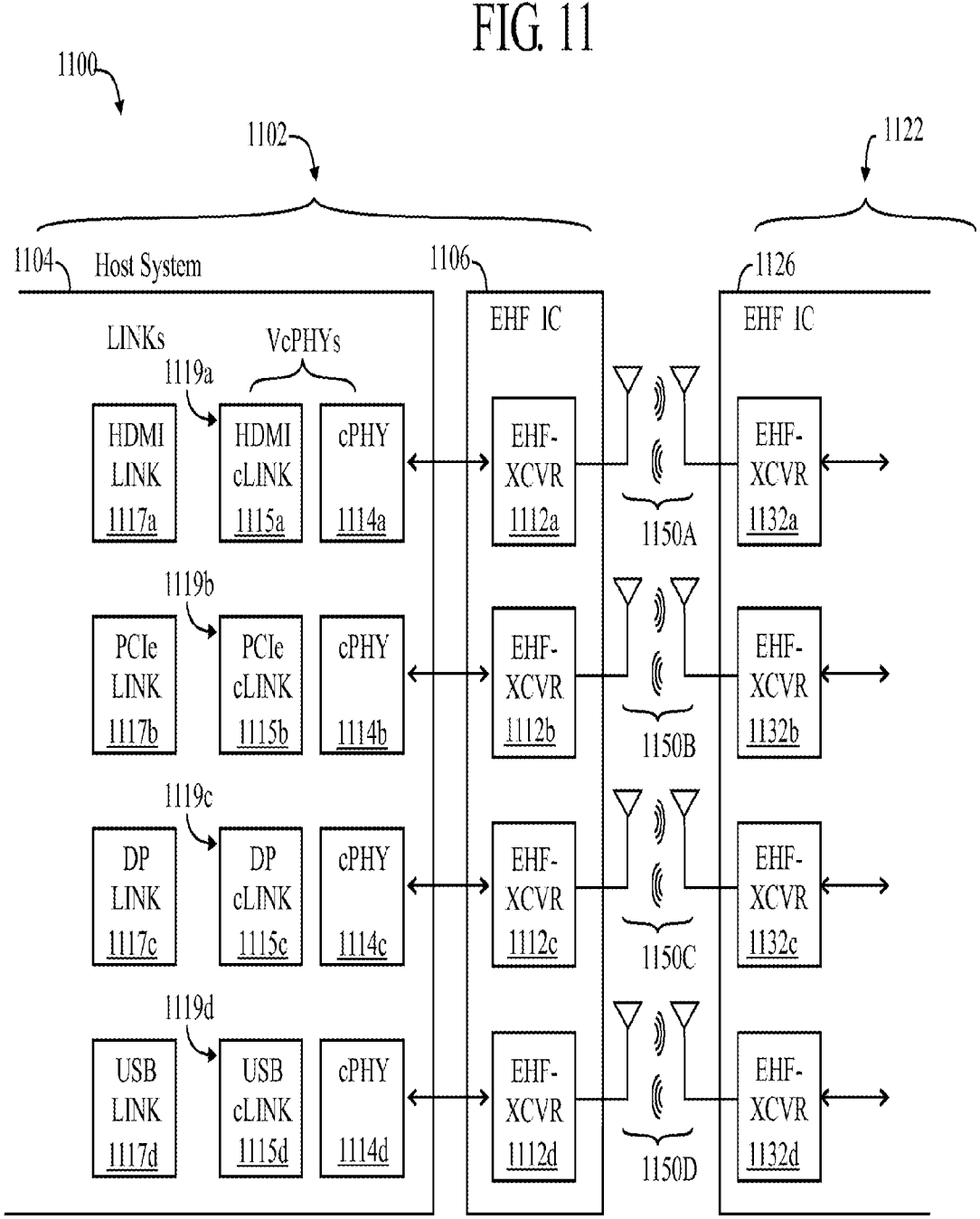

VIRTUALIZED PHYSICAL LAYER ADAPTED FOR EHF CONTACTLESS COMMUNICATION

CROSS-REFERENCE(S) TO RELATED APPLICATIONS

This application is a continuation of U.S. patent application Ser. No. 14/205,658 filed Mar. 12, 2014 (now U.S. Pat. No. 9,559,753), which claims priority from U.S. Provisional Patent Application No. 61/799,527 filed Mar. 15, 2013 and U.S. Provisional Patent Application No. 61/845,384 filed Jul. 12, 2013. Each of these earlier applications is incorporated by reference in its entirety.

TECHNICAL FIELD

This disclosure relates broadly to electronic devices having a host system and a communications subsystem for communicating contactlessly over an extremely high frequency (EHF) contactless link (medium) and, more particularly, to modifications of (including additions to and substitutions for) elements of the host systems, particularly the Physical Layer (PHY) and/or Link Layer (LINK) of the devices for effectively communicating over the EHF contactless medium.

BACKGROUND

It is often important to "connect" electronic devices together, establishing a communications link between the electronic devices, such as for transferring data between the devices, or simply communicating between the two devices. Exemplary data being transferred between devices may comprise a media file (such as an image file, an audio file, a video file), DRM (digital rights management) protected content, an OS (operating system) update, customer specific code, OEM (original equipment manufacturer) specific code, retail specific code, a firmware image for the destination device, user data, encryption/decryption keys (codes), electronic funds transfer (EFT) data, static data and the like.

In the descriptions set forth herein, one of the devices participating in a communications link may be referred to as a "source" (or sending) device, and the other device may be referred to as a "destination" or "sink" (or receiving) device. One of these devices may also be referred to as a "partner" device. However, it should be understood that data may be transferred in either, or both directions between the two devices.

Some examples of electronic devices which may benefit from the techniques disclosed herein may include, but are not limited to cell phones (or handsets, or smart phones), computers, laptops, tablets, or comparable electronic devices.

Typically, the communications link between two devices comprises a cabled connection or a wireless connection. A cabled connection such as USB (Universal Serial Bus) is typically point-to-point, and requires mechanical connectors at each device, and a cable between the devices (one of which devices may be a "hub" connecting point-to-point with several other USB-enabled devices). A wireless connection such as WiFi or Bluetooth operates in more of a "broadcast" mode, where one device can communicate simultaneously with several other devices, over a RF (radio frequency) link, typically in the range of 700 MHz-5.8 GHz.

Mechanical connectors are "passive", and therefore offer no additional features and capabilities with respect to the state of the connection. Generally, either the connection is working, or not. The terms "Host System" or "Host IC" refers to a device or part of a device that may include an integrated circuit(s) that implements the functionality necessary to communicate with a connector. The host system behind the connector may perform some initial analysis (including detection and enumeration of connected devices) in setting up the communications link, which may be a time-consuming process and, generally, after the link is established, no more testing is performed, the link simply operates, until it fails. After link failure, a host system may be programmed to attempt to re-establish the connection, which can be a cumbersome process.

Mechanical connectors are at risk for breakdown either due to wear and tear or due to the use of inappropriate force applied when inserting/de-inserting the connectors. The risk of failure coupled with the fact that mechanical connectors are expensive to manufacture makes the use of mechanical connectors expensive.

The use of a multitude of connectors for transferring different protocol data is cumbersome since a different cable and/or connector will typically be needed for each protocol data transmission. The length of cable that can be used is also limited since transferring data at multi-Gbps through a long cable creates signal reliability issues at the receiver, which could be compensated for either on the transmitter or receiver ends but increases the power dissipation and system complexity.

A wireless connection such as WiFi or Bluetooth operates in more of a "broadcast" mode, where one device can communicate simultaneously with several other devices, over a RF (radio frequency) link, typically in the range of 700 MHz-5.8 GHz.

In the main hereinafter, point-to-point connection-oriented techniques for data transfer between two electronic devices will be discussed. An illustrative example of a point-to-point, wireless connection-oriented communications link for transferring data between electronic devices is Near Field Communication (NFC). NFC implements a set of standards for smartphones and similar devices to establish radio frequency (RF) communication with each other by touching ("bumping") them together or bringing them into close proximity with one another.

Terms and Definitions

The following terms may be used in the descriptions set forth herein.

The acronym "EHF" stands for Extremely High Frequency, and refers to a portion of the electromagnetic (EM) spectrum in the radio frequency (RF) range of 30 GHz to 300 GHz (gigahertz).

Electronic devices may be referred to hereinafter simply as "devices".

"Host systems" refer to integrated circuits that can establish, maintain and/or terminate communications with other integrated circuits.

The term "contactless", as used herein, refers to implementing electromagnetic (EM) rather than electrical (wired, contact-based) connections and transport of signals between entities (such as devices). In some of the literature, the term "wireless" is used to convey this meaning. As used herein, the term "contactless" may refer to a carrier-assisted, dielectric coupling system which may have an optimal range in the zero to five centimeter range (also referred to as "close proximity"). The term "contactless link" refers to a communication link that uses a contactless means of communication. The connection may be validated by proximity of one device to a second device. Multiple contactless transmitters and receivers may occupy a small volume of space. A contactless link established with an electromagnetic connection may be point-to-point, in contrast with a wireless link which typically broadcasts to several points.

The term "contactless connector" refers to a class of connectors that incorporate the contactless function and may encompass integrated circuits, passive components, mechanical components, shielding materials and structures, and other components that may be necessary for integrating the contactless connector into a device.

The term "contactless subsystem" refers to a subsystem that may be incorporated into a contactless connector and may include integrated circuits that may enable the transmission or reception of data or information and may perform other functions including power management and supporting active or passive circuitry, antenna or transducer and other elements as may be necessary to implement a subsystem that is capable of establishing a contactless link. Some part of the active circuitry may be implemented as an integrated circuit (also referred to as "EHF IC") that is part of the contactless subsystem and may contain transmitter(s), receiver(s) that interface with the contactless medium and an electrical interface.

The terms, chip, die, integrated circuit (IC), semiconductor device, and microelectronic device, are often used interchangeably, in common usage, and may be used interchangeably herein. This also may include bare chips (or dies), packaged chips (or dies), and chip modules and packages. The techniques disclosed herein may be implemented with integrated circuits (ICs) using standard CMOS (Complementary-Metal-Oxide-Semiconductor) processes. Some functions described as being implemented by chips may be implemented as macro-functions incorporated into application specific integrated circuits (ASICS) and the like, and may alternatively be implemented, at least partially, by software running on a microcontroller. With respect to chips, various signals may be coupled between them and other circuit elements via physical, electrically-conductive connections. Such a point of connection is may be referred to as an input, output, input/output (I/O), terminal, line, pin, pad, port, interface, or similar variants and combinations.

The term "microprocessor" (μW), or simply "processor", as used herein, may refer to either of a microprocessor or a microcontroller (μC). Generally, a microprocessor is an IC (integrated circuit) that has only the CPU (central processing unit) inside, lacking RAM, ROM, and other peripherals on the chip. Generally, a microcontroller has a CPU, in addition to a fixed amount of RAM (random access memory), ROM (read only memory) and other peripherals, all embedded on a single chip, and may be typically designed to perform specific tasks where the relationship of input and output is defined. Depending on the input, some processing typically needs to be done and output is delivered.

The term "adapted" may be used to mean that the referenced device, IC or part of an IC, or a functional block is either designed, dedicated, arranged, or implemented to suit a particular requirement(s).

"Standards" and related terms such as "Standards-based", "Standards-based interfaces", "Standards-based protocol", "Protocol-based" and the like may refer to wired interface standards which may include but are not limited to USB, DisplayPort (DP), Thunderbolt, HDMI, SATA/SAS, PCIe, Ethernet SGMII, Hypertransport, Quickpath, I2S, GPIO, I2C and their extensions or revisions.

The Physical Layer ("PHY")

The Physical Layer (PHY) provides an electrical interface to the transmission medium; defines physical characteristics such as connections, voltage levels and timing; and defines the means of transmitting raw bits rather than logical data packets over a physical link. The bit stream may be grouped into code words or symbols and converted to a physical signal that is transmitted over a transmission medium. A reference to PHY may also imply its implementation in a semiconductor device.

A Standards-based PHY incorporates the PHY specifications of one or more Standards.

Example Notations Include:
a. Contactless PHY ("cPHY"): a PHY that is designed to communicate between a host system and an EHF IC to permit the host system and/or the EHF IC to optimize both the electrical and contactless links.
b. EHF IC cPHY ("EHF-cPHY"): a cPHY that is incorporated into the EHF IC.
c. Host cPHY ("Host-cPHY"): a cPHY that is incorporated into the host system.

The Data Link Layer ("LINK")

The Data Link Layer (LINK) may encode bits into packets prior to transmission and then decodes the packets back into bits at the destination; may provide reliable data transfer by transmitting packets with the necessary synchronization, error control and flow control; and may provide for logical link control, media access control, hardware addressing, error detection and interfacing with the PHY. The LINK may be divided into sublayers including but not limited to the media access control (MAC) sublayer and the logical link control (LLC) sublayer.

It is to be understood that a reference to LINK may refer to the one or more functionalities of the LINK that may be incorporated in a system in a specific layered stack configuration as defined by the respective standard(s) or proprietary protocols.

A Standards-based LINK incorporates the LINK functions of one or more Standards.

A contactless LINK ("cLINK") is a LINK that is designed to communicate between a host system and an EHF IC to permit the host system and/or the EHF IC to optimize both the electrical and contactless links.

The term "transmitter" (which may be abbreviated "TX") may refer to a device or an IC that may be used to transmit information (data). The term "receiver" (which may be abbreviated "RX") may refer to a device or an IC (integrated circuit) that may be used to receive information (data). The term "transceiver" (which may be abbreviated "XCVR") may refer to a device or an IC including a TX portion and a RX portion, typically sharing some circuitry with one another, so that that the IC may be used to transmit and receive data. Generally, a transceiver (XCVR) may be operable in a half-duplex mode (alternating between transmitting and receiving), or in a full-duplex mode (transmitting and receiving simultaneously), or configured as either a transmitter or a receiver (simplex mode). In some embodiments, separate TXs and RXs may be used, instead of XCVRs, and when the term "XCVR" is used, it should be construed to include separate TXs and RXs. When referring to transceivers, transmitters or receivers in the plural, the singular form of XCVR, TX or RX may be used (rather than XCVRs, TXs, RXs), respectively. When prefixes are used with the terms "XCVR", "TX", "RX", the reference is being made to the specific communication medium to which they interface with and the device or IC they reside in.

An Example List Includes:
  a. EHF-TX: A TX that is adapted for EHF communication and incorporated in the EHF IC.
  b. EHF-RX: A RX that is adapted for EHF communication and incorporated in the EHF IC.
  c. EHF-XCVR: A XCVR that implements the functionality of both the EHF-TX and the EHF-RX.
  d. cPHY-TX: A TX that is adapted for electrical communication and incorporated into a cPHY.
  e. cPHY-RX: A RX that is adapted for electrical communication and incorporated into a cPHY.
  f. EHF-cPHY-TX: A TX that is adapted for electrical communication and incorporated into an EHF-cPHY.
  g. EHF-cPHY-RX: A RX that is adapted for electrical communication and incorporated into an EHF-cPHY.
  h. Host-cPHY-TX: A TX that is adapted for electrical communication and incorporated into a Host-cPHY.
  i. Host-cPHY-RX: A RX that is adapted for electrical communication and incorporated into a Host-cPHY.
  j. HS-Host-cPHY-TX: A high-speed (typically >1 Gbps) Host-cPHY-TX.
  k. HS-Host-cPHY-RX: A high-speed (typically >1 Gbps) Host-cPHY-RX
  l. LS-Host-cPHY-TX: A low-speed (typically <1 Gbps) Host-cPHY-TX.
  m. LS-Host-cPHY-RX: A low-speed (typically <1 Gbps) Host-cPHY-RX.

Generation I ("Gen I") Contactless Subsystem

In a Gen I contactless subsystem, a substantial part of the control and management of the contactless link is performed in the EHF IC, and a substantial part of the control and management of the electrical link is performed in the host system. The EHF IC may also be designed to conform with one or more of the existing Standards on its interface with the host system. A device that incorporates an EHF IC or contactless subsystem that is based on a Gen I contactless subsystem may be referred to as a Gen I device.

Generation II ("Gen II") Contactless Subsystem

In a Gen II contactless subsystem, a substantial part of the control and management of the contactless link and the electrical link is performed in the host system. The EHF IC and the host system may be designed to optimize performance on both the contactless and electrical links. A device that incorporates an EHF IC or contactless subsystem that is based on a Gen II contactless subsystem may be referred to as a Gen II device.

Serializer/Deserializer ("SERDES")

Part of the PHY that implements either or both of the serializer or deserializer function(s).

SUMMARY

It is a general object of the invention to provide improved techniques for communicating between electronic devices, which may include some techniques for incorporating EHF contactless communications capability into, such as (but not limited to) by modifying, the PHY and/or the LINK of the host systems of the devices.

These and other objects may generally be achieved by eliminating mechanical connectors and cable wires, using instead contactless connectors and an electromagnetic (EM) communications link. The contactless subsystem, associated with a host system of a device, may comprise at least one EHF-XCVR or separate EHF-TX and EHF-RX and associated transducers or antennas, for converting between electrical signals and EM signals.

According to some embodiments of the invention disclosed herein, generally, a given electronic device may comprise a contactless subsystem and a host system having a Standards-based PHY.

According to some embodiments of the invention disclosed herein, generally, a given electronic device may be based on a Gen II contactless subsystem interfacing with a host system.

According to some embodiments of the invention disclosed herein, generally, a host system may further comprise Standards-based interfaces and may also comprise a Standards-based LINK, such as a LINK for the DisplayPort (DP) protocol. The host system may further comprise a SERDES. The EHF IC may comprise one or more EHF-XCVRs, alternatively one or more EHF-TXs or EHF-RXs.

According to some embodiments of the invention disclosed herein, generally, data and control blocks (or functions, such as measurement and control circuits) of the EHF IC may be split out from the EHF IC, and all or part of these data and control blocks may be integrated into the host system of the device. In this manner, the EHF signaling portion of a EHF IC may be simplified and integrated into an EHF IC focused primarily on the analog and RF portions of the contactless communication over the contactless link.

According to some embodiments of the invention disclosed herein, generally, the PHY in the host system of an electronic device may be implemented as (or replaced, or modified, or augmented by) a Host-cPHY adapted to take advantage of EHF contactless communication and the operation of EHF-XCVRs or EHF-TXs and EHF-RXs, in an EHF IC of an electronic device. The Host-cPHY may translate logical communications requests from the LINK into hardware-specific operations to influence (implement, control, manage) transmission or reception of signals over the EHF contactless link. A EHF-cPHY in the EHF IC may handle signals passing between the PHY or Host-cPHY in a host system of the device and the EHF IC. The LINK in the host system of the device may also be optimized as a cLINK for EHF contactless communication. Signaling between the Host-cPHY and the EHF IC may be implemented using either digital or analog signaling, or both. Compatibility of Gen II devices having a Host-cPHY with Gen I devices having a Standards-based PHY is disclosed. Multiple data streams may be transported over the contactless link over a range of frequencies.

According to some embodiments (examples) of the invention, generally, a virtualized contactless Physical Layer ("VcPHY layer", or simply "VcPHY") may be a Host-cPHY which is arranged (adapted, implemented, configured, defined), and possibly combined with a cLINK, for a contactless link that enables the seamless communication between devices. The VcPHY, which may be part of a host system, interfaces electrically with an EHF IC, that is capable of contactless communication. The EHC IC is capable of communicating with another EHF IC, or with a contactless connector, using an EHF contactless link.

Generally, a VcPHY may comprise a Host-cPHY which has some part of either the LINK or cLINK functionality incorporated therein. LINK functionality may be defined (implemented) within the VcPHY that functionally couples a Standards-based LINK with the Host-cPHY in the VcPHY. The resulting VcPHY may have LINK functionality that is directed towards the contactless link and may also have PHY functionality that is directed towards the electrical connection between the host system and the EHF IC. The VcPHY may manage the contactless link to perform functions based on the underlying protocol data to be transmitted over the contactless link, and the application environment in which the contactless link is implemented.

Contactless communication may enable data transfers at multi-Gbps rates, comparable with traditional wireline communications, but several fundamental advantages of contactless communication may include absence of mechanical connectors and the associated advantages in terms of cost, reliability of the connection, simplicity of usage, power dissipation, and silicon footprint. The Host-cPHY and the cLINK may enable many of these advantages. The VcPHY may further extend the use of contactless connectors by further simplifying the integration of EHF ICs into host systems and devices, offering even greater flexibility in transmitting a variety of protocol data across the contactless link with minimal protocol-related operations in the EHF IC. Some of the embodiments take advantage of the processing capabilities of a host system that may include a processor or a controller to control and direct either partially or fully the functionality of the EHF IC device so that the overall power dissipation and silicon footprint of the system may be improved. By enabling the host system to take a more active role in the contactless communication, the EHF IC can be simplified in terms of implementation. The EHF IC may predominantly have analog blocks that are primarily directed towards maintaining EHF signaling across the EHF contactless link. This make the EHF IC more simple to implement, and may also simplify the logical or processing operations that may be required in the EHF IC.

According to some embodiments (examples) of the invention, an electronic device may comprise: a host system (Host IC) operating with an Open Systems Interconnection (OSI) network architecture comprising a Physical Layer (PHY) and a first Standards-based Link Layer (LINK); and an EHF contactless EHF IC (EHF IC) comprising at least one transceiver (EHF-XCVR) and capable of communicating over an EHF contactless link transmission medium with another electronic device; and may be characterized by: the PHY layer (PHY) may comprise at least one virtualized contactless link-based Physical Layer (VcPHY) comprising: a contactless Physical Layer (Host-cPHY) which is adapted to implement interface specifications and medium requirements for sending and receiving signals over the EHF contactless link via the EHF contactless EHF IC (EHF IC); and a second Link Layer (cLINK) for coupling the first Standards-based Link Layer (LINK) with the contactless Physical Layer (Host-cPHY). The second Link Layer (cLINK) may comprise a functionality that is directed towards the contactless link. The second Link Layer (cLINK) may comprises a functionality that is directed towards the electrical connection between the host system and the EHF IC. The second Link Layer (cLINK) may be operable to enable the first Link Layer (LINK) to communicate with the virtualized contactless link-based PHY (VcPHY) as though the VcPHY is a Physical Layer implementation from a corresponding Standards' specification. The Standards' specification may be selected from the group consisting of Display Port, HDMI, PCIe and USB. The first and the second Link Layers may have at least one function in common. The second Link Layer (cLINK) may be operable to perform at least one of discovering, configuring and maintenance functions that are directed towards enabling and maintaining a contactless link. The second Link Layer (cLINK) may be operable to perform at least one of polling, beaconing and security verification functions. The first conventional Link Layer (LINK) may be operable to perform beaconing or listening for the EHF contactless link, and may be operable to configure the link parameters of at least a segment of the path that couples the first conventional Link Layer and the contactless EHF IC. The second Link Layer (cLINK) may be operable to configure the link parameters of at least a segment of the path that couples the second Link Layer (cLINK) and the contactless EHF IC. The second Link Layer (cLINK) may be operable to configure parameters of the contactless link. The first conventional Link Layer (LINK) may be operable to direct a first set of link training operations for the contactless link. The electronic device may comprise: a plurality of LINKs; a plurality of VcPHYs; and a plurality of at least one transceivers (EHF-XCVR). The electronic device may comprise: a plurality of LINKs; and a single VcPHY; wherein a given one of the plurality of LINKs is selectively connected to the single VcPHY at a given time. The electronic device may comprise: multiple LINKs; multiple VcPHYs; and a switch routing data streams between the multiple LINKs and the multiple VcPHYs. The electronic device may comprise: multiple EHF ICs. The electronic device may comprise: one or more LINKs and an associated EHF IC; an Ethernet protocol stack and an associated EHF IC. The other electronic device may comprise: two EHF ICs; a first host system having a first VcPHY; and a second host system having a second VcPHY. The electronic device may comprise at least two VcPHYs and associated at least two EHF ICs; and the other electronic device may comprise a network processor. The electronic device may comprise at least two VcPHYs and associated at least two EHF ICs; and the other electronic device may comprise a switch. The other electronic device may comprise a bridge chip.

According to some embodiments (examples) of the invention, a method of communicating between electronic devices over an EHF contactless communications link, at least one device having a host system and an EHF contactless EHF IC (EHF IC), may be characterized by: providing at least one of the electronic devices with a virtualized contactless link-based Physical Layer (VcPHY) which is dedicated to EHF contactless communication over the EHF contactless communications link. A contactless Physical Layer (Host-cPHY) may be provided within the virtualized contactless link-based Physical Layer (VcPHY) which may be adapted to implement interface specifications and medium requirements for sending and receiving signals over the EHF contactless communications link; and a contactless link-based Link Layer (cLINK) may be provided within the virtualized contactless link-based Physical Layer (VcPHY) that may functionally couple a conventional Link Layer (LINK) with the contactless Physical Layer (Host-cPHY) in the virtualized contactless link-based Physical Layer (VcPHY). The contactless Link Layer (cLINK) may provide (i) functionality directed towards the contactless link and (ii) functionality directed towards the electrical connection between the host system and the EHF IC. The contactless Link Layer (cLINK) may be positioned functionally between the conventional Link Layer (LINK) and the contactless Physical Layer (Host-cPHY) to isolate the Link Layer (LINK) from the EHF contactless communications link.

According to some embodiments (examples) of the invention, a contactless communication device may comprise: a virtualized contactless link-based Physical Layer (VcPHY) which is adapted to implement interface specifications and medium requirements for sending and receiving signals over an EHF contactless communications link; a first, conventional, Standards-based Link Layer (LINK) that directs a first set of link training operations for the contactless link; and a second Link Layer (cLINK) in the VcPHY that couples with the first Link Layer (LINK) that directs a second set of link training operations; and an EHF IC capable of communicating over the contactless communications link.

The invention(s) described herein may relate to industrial and commercial industries, such as electronics and communications industries using devices that communicate with other devices or devices having communication between components in the devices.

Other objects, features and advantages of the invention(s) disclosed herein may become apparent in light of the following illustrations and descriptions thereof.

BRIEF DESCRIPTION OF THE DRAWINGS

Reference will be made in detail to embodiments of the disclosure, non-limiting examples of which may be illustrated in the accompanying figures (FIGs). The figures may be in the form of diagrams. Some elements in the figures may be exaggerated or drawn not-to-scale; others may be omitted, for illustrative clarity. Any text (legends, notes, reference numerals and the like) appearing on the drawings are incorporated by reference herein. When terms such as "left" and "right", "top" and "bottom", "upper" and "lower", "inner" and "outer", or similar terms are used in the description, they may be used to guide the reader to orientations of elements in the figures, but should be understood not to limit the apparatus being described to any particular configuration or orientation, unless otherwise specified or evident from context. Different "versions" of elements may be referenced by reference numerals having the same numbers (such as "123" or the like) followed by a different letter suffix (such as "A", "B", "C", "a", "b", "c" or the like), in which case the similar elements may be inclusively referred to by the numeric portion ("123") only of the reference numeral. (For example, elements "123a", "123b" and "123c" may collectively be referred to as "123".) With regard to circuit diagrams, some connections between elements which are shown may be described only briefly, and some connections between elements may be omitted, for illustrative clarity.

FIGS. 4, 5, 5A are diagrams illustrating multiple streams of data passing over a EHF contactless communications link between two Gen II electronic devices.

FIG. 8C is a diagram illustrating some details of a cLINK communicating and interacting with a Standards-based LINK and a Host-cPHY.

FIG. 9 is a diagram illustrating devices having host systems with a VcPHY.

FIG. 11 is a diagram illustrating a device having a host system with multiple VcPHYs.

DETAILED DESCRIPTION

Various embodiments (or examples) may be described to illustrate teachings of the invention(s), and should be construed as illustrative rather than limiting. It should be understood that it is not intended to limit the invention(s) to these particular embodiments. It should be understood that some individual features of various embodiments may be combined in different ways than shown, with one another. Reference herein to "one embodiment", "an embodiment", or similar formulations, may mean that a particular feature, structure, operation, or characteristic described in connection with the embodiment is included in at least one embodiment of the present invention.

The embodiments and aspects thereof may be described and illustrated in conjunction with systems, devices and methods which are meant to be exemplary and illustrative, not limiting in scope. Specific configurations and details may be set forth in order to provide an understanding of the invention(s). However, it should be apparent to one skilled in the art that the invention(s) may be practiced without some of the specific details being presented herein. Furthermore, some well-known steps or components may be described only generally, or even omitted, for the sake of illustrative clarity.

In the following descriptions, some specific details may be set forth in order to provide an understanding of the invention(s) disclosed herein. It should be apparent to those skilled in the art that these invention(s) may be practiced without these specific details. Headings (typically underlined) may be provided as an aid to the reader, and should not be construed as limiting.

Contactless Connectivity

A contactless connector (that may include a contactless subsystem/EHF IC) having an interface to the host system and the contactless medium may be used to replace existing wired connections with little or no host system interaction. The EHF IC may comprise a controller, one or more storage elements, and a radio frequency (RF) circuitry that implements a EHF-TX, EHF-RX or EHF-XCVR. Contactless connectors may be capable of monitoring, controlling, and directing (managing) link operation to dynamically adapt to conditions, as well as monitoring and altering (or modifying) data passing through the contactless connectors. The connectors may be capable of identifying the type of content being transferred, providing authentication and security services, and enabling application support for the host systems based on the type of connection or the type of content. The connectors may operate independently of the host systems.

Gen I Contactless Connectivity

Figure 1:
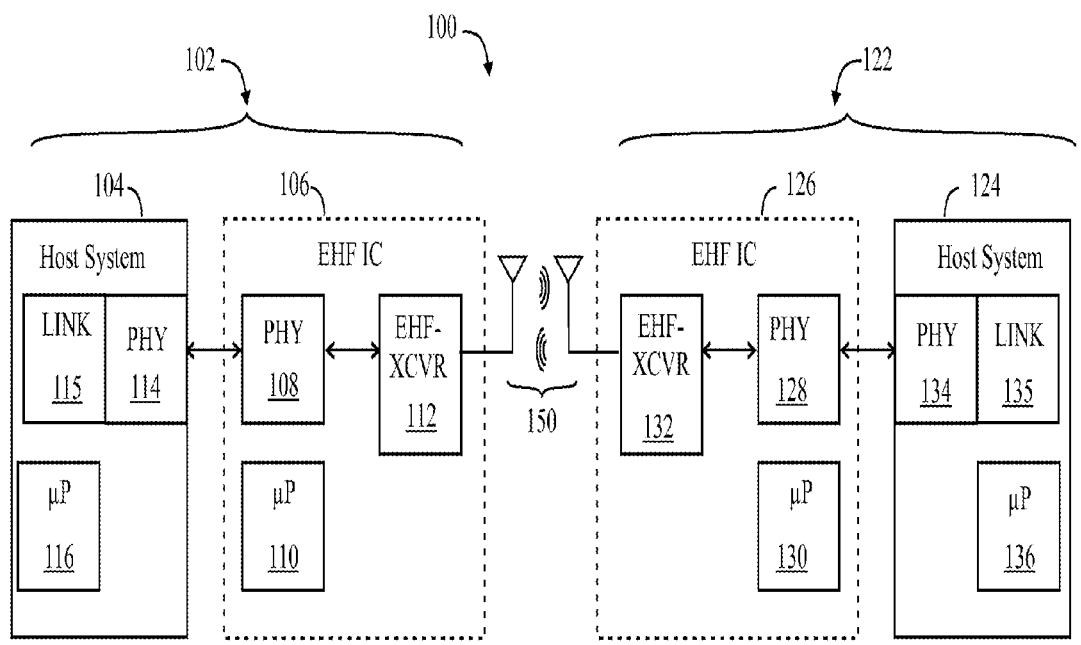
FIG. 1 is a diagram illustrating an EHF contactless communications link between two Gen I electronic devices.

FIG. 1 illustrates an overall system architecture which may be representative of some Gen I contactless connectivity solutions. Certain features associated with the individual solutions may be omitted, for illustrative clarity. Other features may be described which are particular to selected ones of the solutions.

A communications system 100 comprises two electronic devices 102 and 122 which may communicate with one another (using Standards-based protocols and/or signaling) over associated electrical links, between the host systems and the EHF ICs, and over the EHF contactless link transmission medium 150. (In some contexts, such as USB, one of the devices may be referred to as the "host", with the other device being referred to simply as "device", or "partner device".)

Data may be transferred in at least one direction, from a first device 102 which may be regarded as a "source" for sending the data to be transferred, to a second device 122 which may be regarded as a "destination" for receiving the data which is transferred. In the main hereinafter, the transfer of data from the first device 102 to the second device 122 may be described. However, it should be understood that data may alternatively or additionally be transferred from the second device 122 (acting as a "source" for sending the data) to the first device 102 (acting as a "destination" for receiving the data), and that often information may be exchanged in both directions between the two devices 102 and 122 during a given communications session.

For illustrative clarity, the two devices 102 and 122 may be described as "mirror images" of one another, but it should be understood that the two devices 102 and 122 may be different than each other. For example, one of the devices may be a laptop computer, the other device may be a mobile phone. Some examples of electronic devices which may benefit from the techniques disclosed herein may include cell phones (or handsets, or smart phones), computers, docks (docking stations), laptops, tablets, or comparable electronic device, to name but a few.

The first electronic device 102 is a Gen I device and may comprise a host system 104, and a Gen I EHF IC 106.

The EHF IC 106 may be capable of performing at least one of:
  establishing and managing operation of a contactless link 150 with the second device 122,
  monitoring and modifying data passing though the EHF IC 106 onto/from the link 150, and
  interfacing with and providing application support for the host system 104.

The EHF IC 106 may comprise some or all of the following elements:
  an EHF-PHY 108
  optionally, a processor or microcontroller 110, and associated memory (not shown)
  one or more EHF-XCVR 112 (or at least an EHF-TX or an EHF-RX)

The EHF-PHY 108 of the connector 106 may comprise a communications port/channel adapted to communicate with the host system 104 via the particular PHY 114 (and LINK 115) implemented in the host system 104.

The connector 106 may further comprise control circuits and measurement circuits, which are omitted, for illustrative clarity.

The host system 104 may comprise a PHY 114 which may, for example, be configured for operating with a cabled connection such as USB, PCIe, DP, etc. The host system 104 may also be provided with a microprocessor 116. The host microprocessor or microcontroller 116 of the host system 104 may serve as the processor 110 (if any) of the EHF IC 106.

The host system 104 may further comprise a Standards-based LINK 115 which may, for example, be configured for operating with a Standards-based protocol.

The second electronic device 122 is a Gen I device and may be substantially identical to the first electronic device 102 (with regard to EHF contactless operability), and may thus comprise a host system 124 and a contactless connector or a contactless subsystem or an EHF IC 126.

The EHF IC 126 may comprise some or all of the following elements:
  an EHF-PHY 128
  optionally, a processor or microcontroller 130 (and associated memory, not shown)
  one or more EHF-XCVR 132 (or, at least, an EHF-TX and an EHF-RX)

The host system 124 may comprise a PHY 134 which may, for example, be configured for operating with a cabled connection such as USB, PCIe, DP, etc. The host system 124 may also be provided with a microprocessor or a microcontroller 136. The host microprocessor or microcontroller 136 of the host system 124 may serve as the processor 130 (if any) of the EHF IC 106.

The EHF-PHY 128 of the EHF IC 126 may comprise a communications port/channel adapted to communicate with the host system 124 via the particular PHY 134 (and LINK 135) implemented in the host system 124.

The host system 124 may further comprise a LINK 135 which may, for example, be configured for operating with a Standards-based protocol.

The EHF ICs 106 and 126 may operate with minimal or no intervention from the host system or its processors 116 and 136, and may provide control signals to the host system 104 and 124, respectively, or portions thereof. For example, the host system may provide some basic functions like a power-on enable signal, indication to increase or decrease EHF power to the EHF IC.

The EHF ICs 106 and 126 may open/activate applications, return status/power levels, connection parameters, data types, information on devices/systems that are connected, content information, amount of and type of data being transferred, including device configuration based on connection type, link management, quota information, channel control, and the like.

The dashed-line rectangles shown (in the figure) around the EHF ICs 106 and 126 may simply represent "partitioning" of functions, separating (distinguishing) the EHF ICs from the host systems 104 and 124, respectively. The antennae shown (symbolically) outside of the dashed-line rectangles may be considered to be within the functional blocks of the EHF ICs 106 and 126, but may be disposed either internal or external to an EHF IC constituting the contactless subsystem.

The processors 110/130 and 116/136, may be embedded microprocessors, or microcontrollers, or state machines, may run a management operating system (OS) for the connection, and may have built-in authentication/encryption engines.

Signals flowing between the two electronic devices (102/122, 202/222, 302/322, 402/422, 502/522) may be implemented over an EHF contactless link (150, 250, 350, 450, 550), using a medium that may comprise a non-electrical (dielectric) medium such as an air gap, waveguide, plastics (polyethylene, thermoplastic polymers, polyvinylidene difluoride, fluoropolymers, ABS, and other plastics), including combinations of these materials. The EHF signal can pass through other dielectric materials such as cardboard. The EHF signal can pass through a series of different dielectric materials and/or waveguides.

Figure 6:
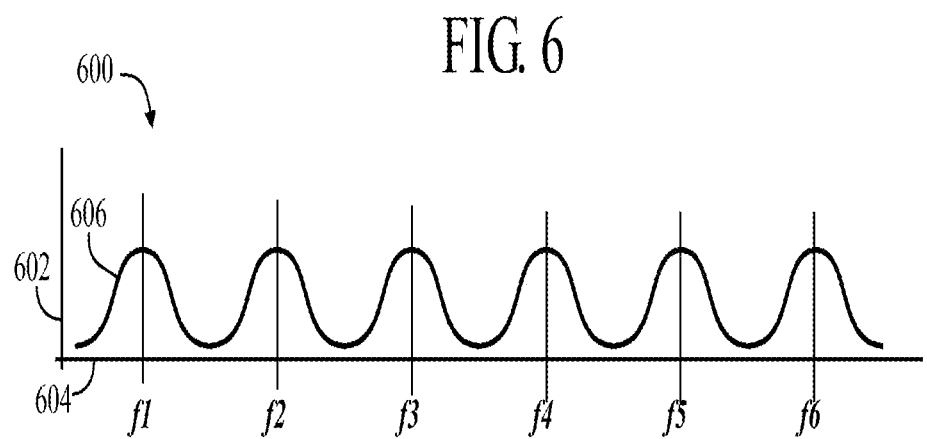
FIG. 6 is a diagram illustrating the frequency spectrum of a multi-channel contactless communication.

A single communications link may comprise several (multiple) independent LINKs associated with several independent data streams, such as described with respect to FIG. 4 and FIG. 6.

Due to the high data rate enabled by the EHF contactless communication, large data files, such as movies, audio, device images, operating systems, and the like may be transferred in very short periods of time in contrast with existing technologies such as NFC. As an example, a 1 Gigabyte data file may be transferred in as little as 5 seconds.

The electromagnetic communication may typically be over an air gap and may be limited to a short range, such as 0-5 cm. A dielectric medium such as a dielectric coupler may be used to extend the range of the contactless link between the devices 102 and 122 to several centimeters, meters, or more.

It should be understood that in this, and any other embodiments of contactless links discussed herein, an overall communications system may be implemented as a combination of contactless and physical (wired) links. Furthermore, some of the techniques described herein may be applied to transferring data over a physical link, such as a cable and connectors. Similarly, some of the techniques described herein may be applied to transferring data over a wireless link, such as WiFi or Bluetooth. In the main, hereinafter, the use of an EHF contactless link for transferring data between the two devices will be described.

An exemplary "data flow" may proceed as follows. Data originating from the host system 104 (or data originating at the first EHF IC 106) may be provided by the first EHF IC 106, via its EHF-XCVR 112, onto the contactless link 150. The data passes through (or over) the contactless link 150. Data received from the contactless link 150 by the EHF-XCVR 132 of the second EHF IC 126 may be provided to the host system 124 (or may remain in the second EHF IC 126). Data may flow in the reverse direction, from the host system 124 via the EHF IC 126 (or originating at the EHF IC 126) onto the contactless link 150 to the EHF IC 106 which may pass the data to the host system 104 (or it may remain in the first EHF IC 106). The EHF ICs 106 and 126 are described herein.

The EHF-XCVRs disclosed herein (112/132, 212/232, 312/332, 512/532) and, as may be applicable, the EHF-TXs (411/431) and EHF-RXs (413/433) disclosed herein, may comprise any means suitable for converting between electrical signals and electromagnetic (EM) signals and for communicating EHF signals contactlessly over an EHF transmission medium (150, 250, 350, 450, 550) between first and second electronic devices (102/122, 202/222, 302/322, 402/422, 502/522).

Gen I Contactless Subsystems

Gen I embodiments of contactless subsystems may include an EHF IC comprising two or more transceivers. Having two (or more) transceivers (or transmitters and receivers) may support a feedback loop, latency, changes, full duplex operation, and simultaneously establishing a second communications link (such as for communicating with the host system). The transceivers may each be a half-duplex transceiver which can asynchronously convert a baseband signal into a modulated EHF carrier which is radiated from an internal or external antenna or can receive and demodulate the carrier and reproduce the original baseband signal. The EHF carrier may penetrate a wide variety of commonly-used non-conductive materials (glass, plastic, etc.).

It should be understood that if only one-way communication is required, such as from the first device (102, 202, 302, 502) to the second device (122, 222, 322, 522), the transmit functionality of the transceiver (112, 212, 312, 512) could be realized by a transmitter and the transceiver (132) could be replaced by a receiver. As illustrated in FIG. 4, for multiple data streams, each EHF IC (406, 426) may be provided with a separate EHF-TX (411/431) and EHF-RX (413/433).

Transmit power and receive sensitivity for the transceivers (or transmitters and receivers) disclosed herein may be controlled to minimize EMI (electromagnetic interference) effects and simplify FCC certification. RF energy output by contactless connectors may be below FCC requirements for certification or for transmitting an identification (ID) code which would otherwise interrupt data flow during data transfers.

The signals transmitted by the transceivers (or transmitters) may be modulated in any suitable manner to convey the data being transferred from one device to the other device, some non-limiting examples of which are presented herein. Modulation may be OOK (on/off keying) or other similar simple modulation techniques. Signals may be encoded and packetized and transmitted by one transceiver (such as 112), and received and unpacketized and decoded by another transceiver (such as 132). Out-of-band (OOB) signaling or other suitable techniques may be used to convey information other than or related to the data being transferred between the two devices.

The transceivers, or individual transmitters and receivers, which may be implemented as chips, may be factory-serialized, so that the chips and their transmissions may be 'tagged' (fingerprinted), which may enable a later forensic analysis to be performed for digital rights management (DRM). For example, protected (premium) content could be freely (unimpeded) transferred from one device to another, but the transaction could be traced to the specific devices involved, so that the participants in the transaction can be held accountable (such as, billed).

Some of the features discussed in the Gen I approaches may be implemented in the Gen II devices disclosed herein. A benefit of approaches to establishing contactless connectivity between (typically two) electronic devices, such as have been described herein, is that existing systems can take advantage of contactless connectivity with minimal changes to the host system. For example, the EHF IC may communicate with its host system using Standards-based interfaces. Hence, the Gen I contactless solutions may require all or a part of the PHY in the host system or EHF-PHY to be Standards compliant. This approach, while suitable for multiple systems due to its relative ease of implementation, may need to be adapted to suit other applications or systems. A few key attributes of Gen I systems include:

- There may be several host systems, each communicating using one or more of the many Standards. Designing an EHF IC that can communicate with many hosts (conforming to the many Standards' specifications) raises the complexity, power dissipation and cost of the contactless connector (or the contactless subsystem). Standards' specifications are updated frequently, dictating a new design for the contactless connectivity chip for substantially every version of the specification and this may increase the cost of the system.
- Implementation of the PHY in the host system and of the EHF-PHY in the EHF IC, in a way that is substantially Standards compliant increases the silicon footprint as well as the power dissipation of the system. This is because the requirement to have a PHY in the host system (and EHF-PHY in the EHF IC) that conforms to Standards' specifications requires circuits to compensate for channel non-idealities (pre-emphasis and equalization circuits) associated with the worst-case channel specification. The power dissipation and the silicon footprint problem is exacerbated by the fact that the PHY in the host system may be targeted to transmit multi-Gbps data rates in the range of 5-10 Gbps and beyond.
- During communication with the host system using the Standards' protocols, the EHF IC functionally isolates the EHF-XCVRs from the host system. This restricts co-optimization possibilities based on the current state of the host system or the EHF IC.
- The EHF IC requires additional functionality that enables communication between the EHF-PHY and EHF-XCVRs. For example, based on the underlying protocol power states, the EHF IC must set the EHF-XCVR to either its "On" or "Off" state.

The electronic devices disclosed herein may comprise the following elements. In the following table, elements of the EHF IC (106/126/206/226, 325, 306/326, 406/426, 506/526) are listed above the dashed line (----). Elements of the host system (104/124, 204/224, 304/324, 404/424, 504/524) are listed below the dashed line (----). The following elements may be listed.

Figure 2:
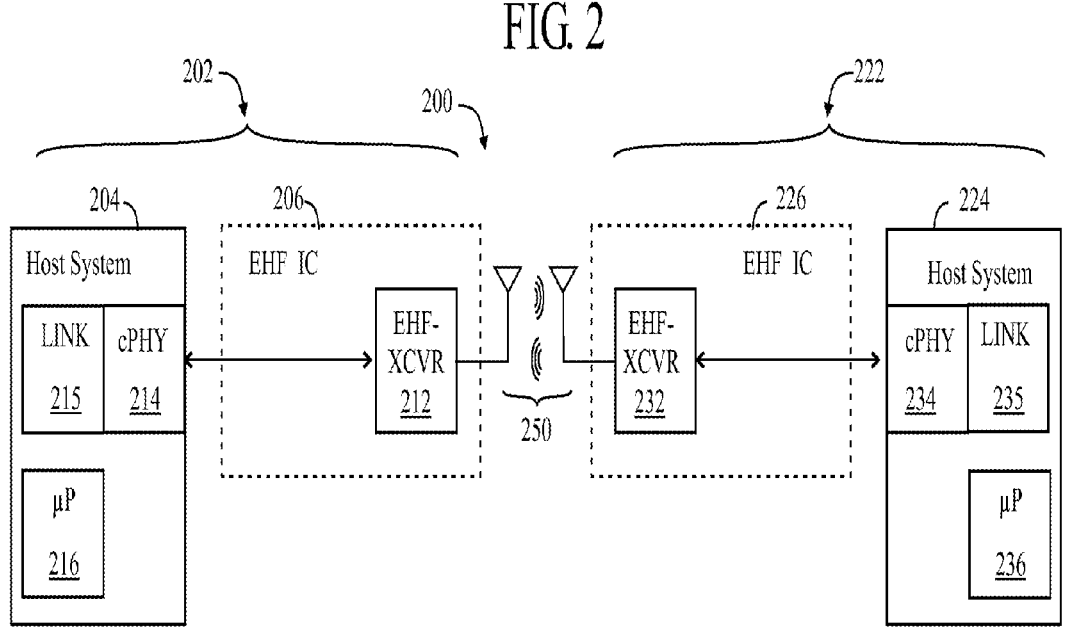
FIG. 2 is a diagram illustrating two Gen II devices, each comprising a host system having a Host-cPHY, and a EHF IC comprising an EHF IC having at least one EHF-XCVR, the two devices being shown communicating with one another over a contactless link, according to an exemplary embodiment of the invention.
Figure 2A:
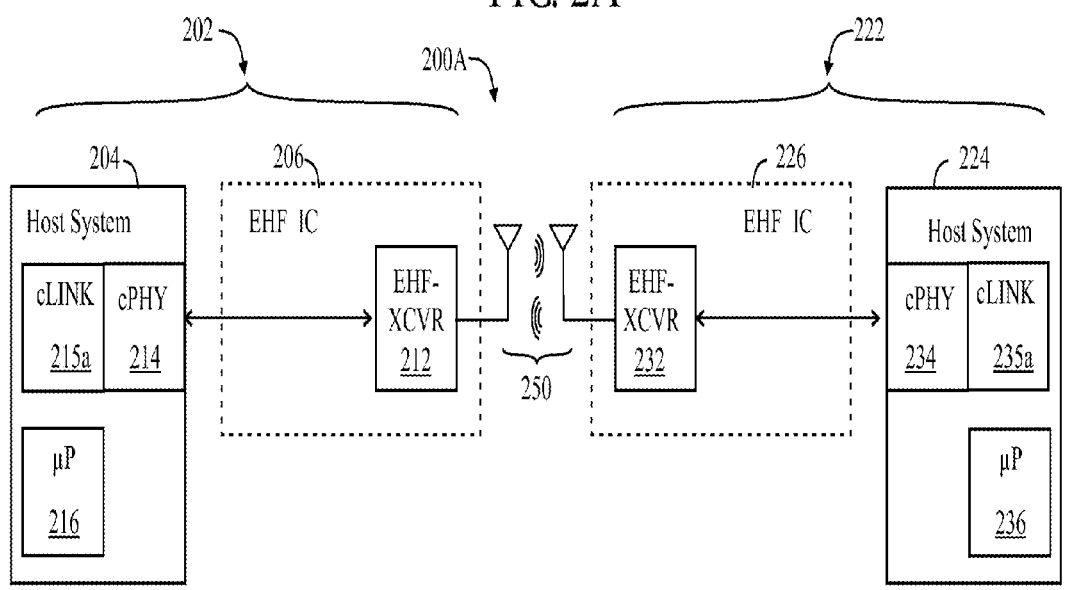
FIGS. 2A, 2B, 2C, 2D 2E, 2F, 3A and 3B are diagrams illustrating various other embodiments of devices communicating over contactless links, some of which comprise a host system with a contactless cLINK, some of which may comprise an EHF IC having a EHF-cPHY.
Figure 2B:
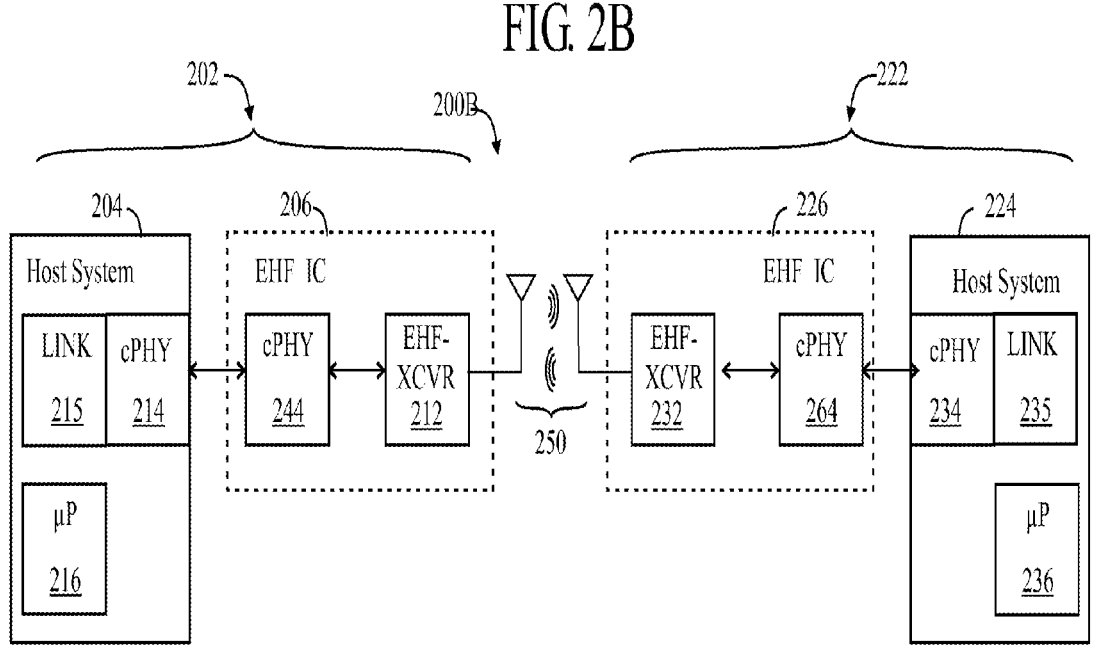
Figure 2C:
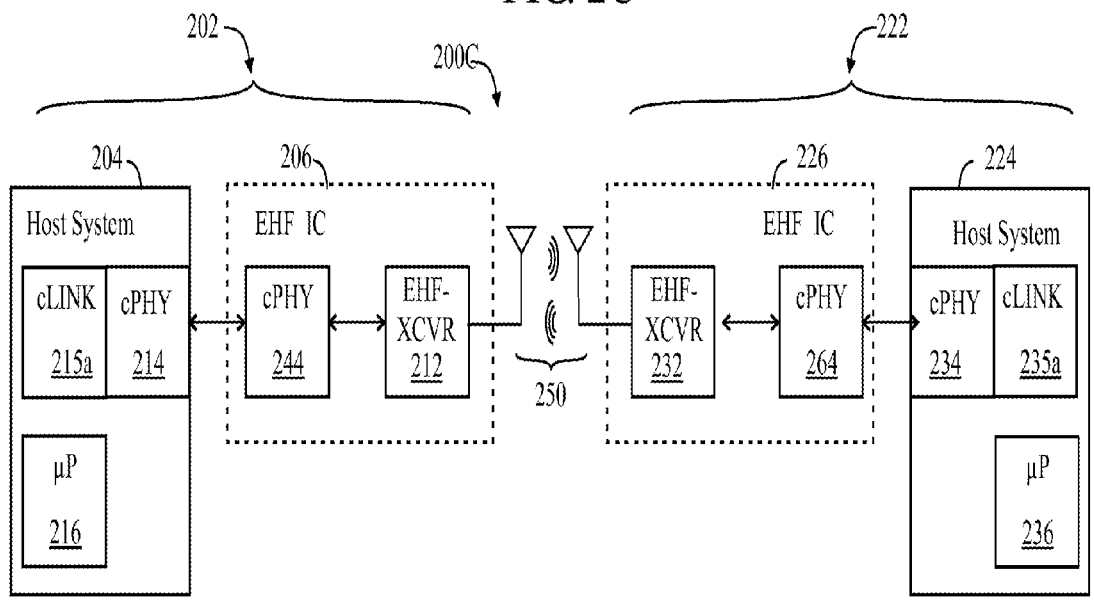
Figure 2D:
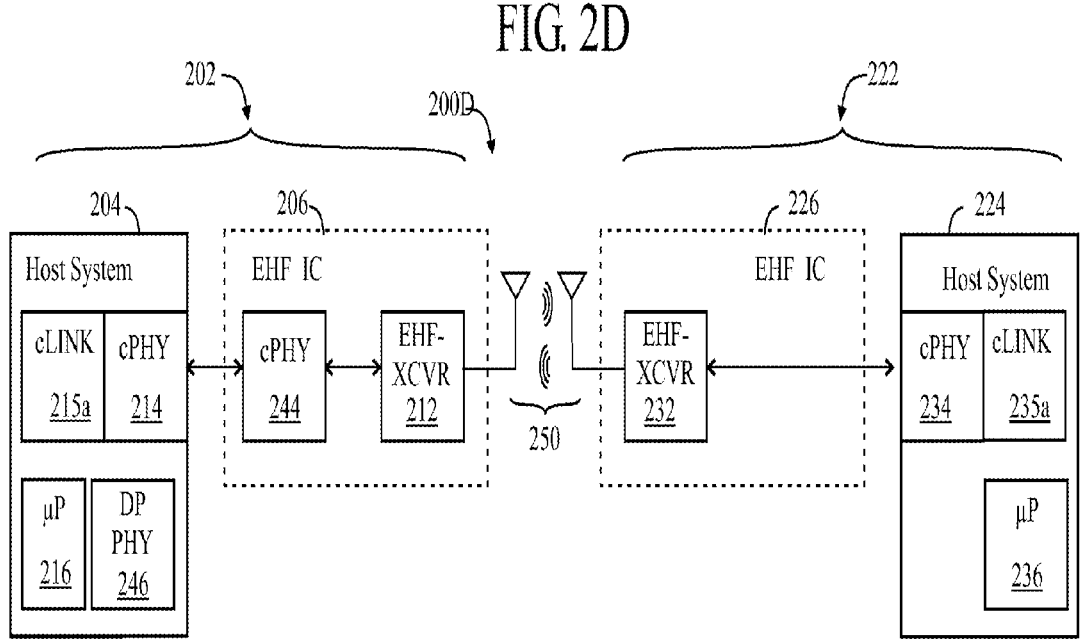
Figure 2E:
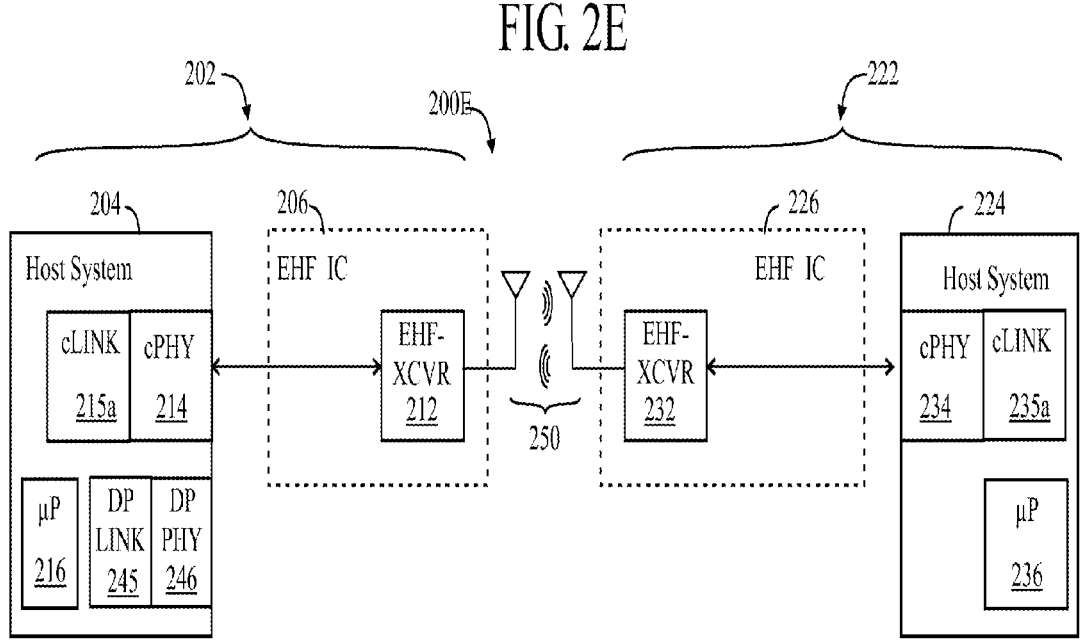
Figure 2F:
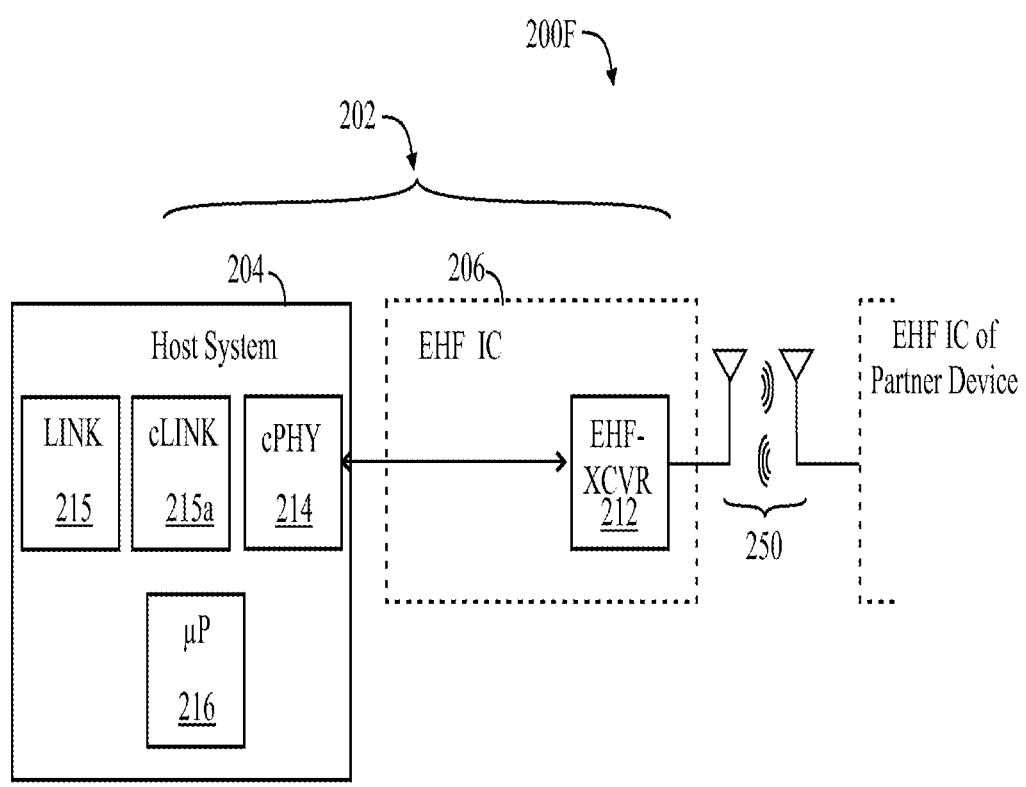
Figure 3:
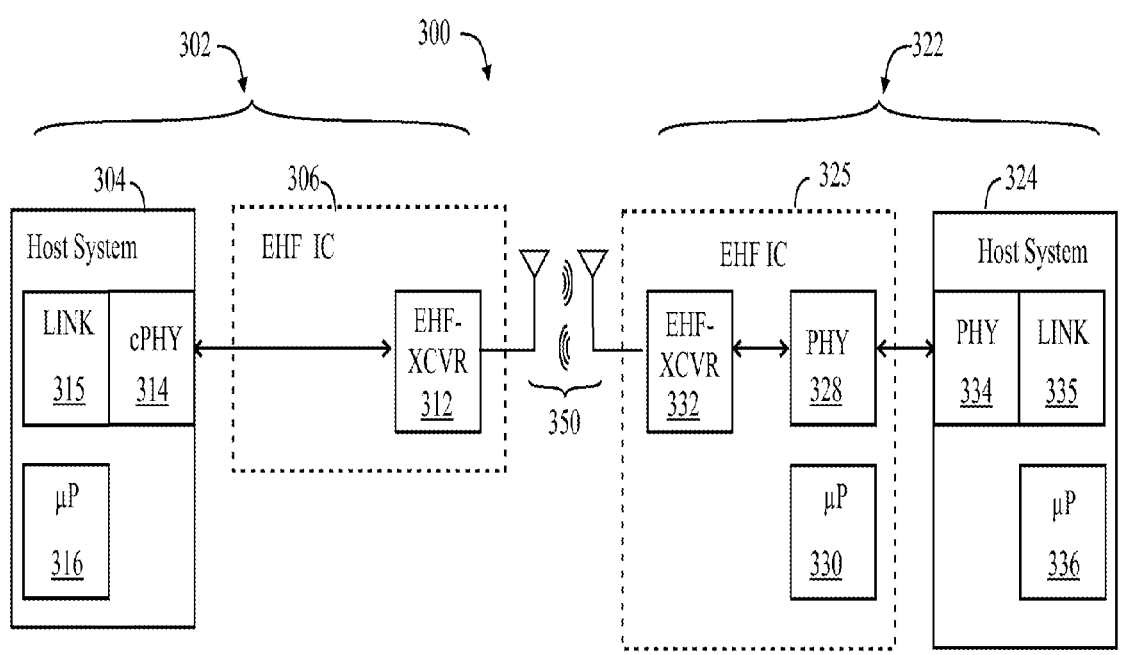
FIG. 3 is a diagram illustrating compatibility of a Gen II electronic device (left) with a Gen I electronic device (right).
Figure 3A:
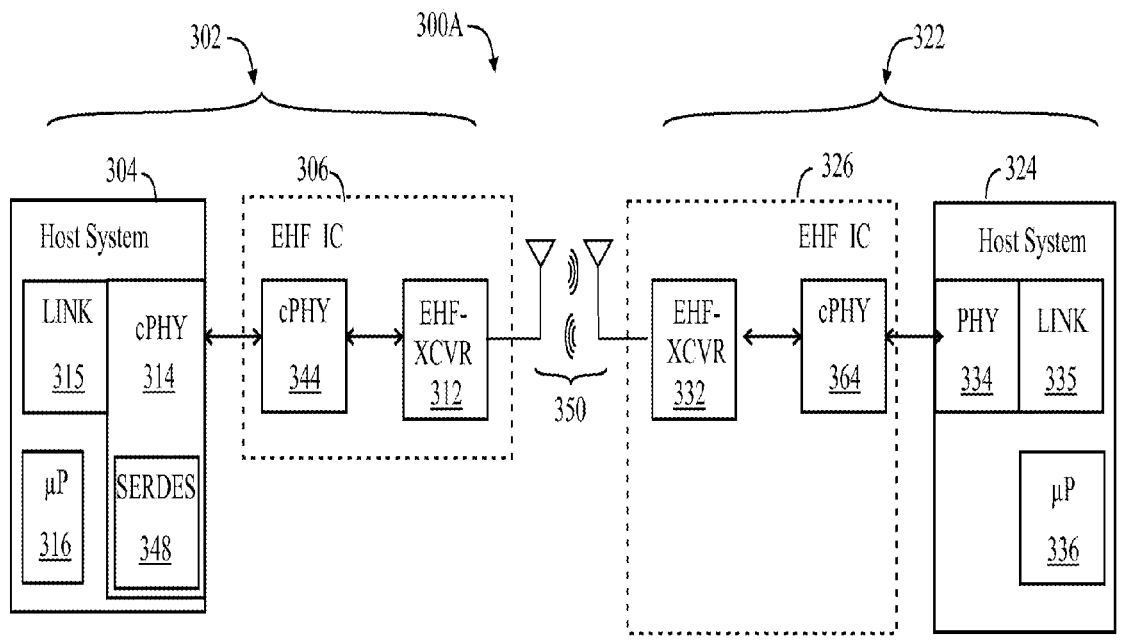
Figure 3B:
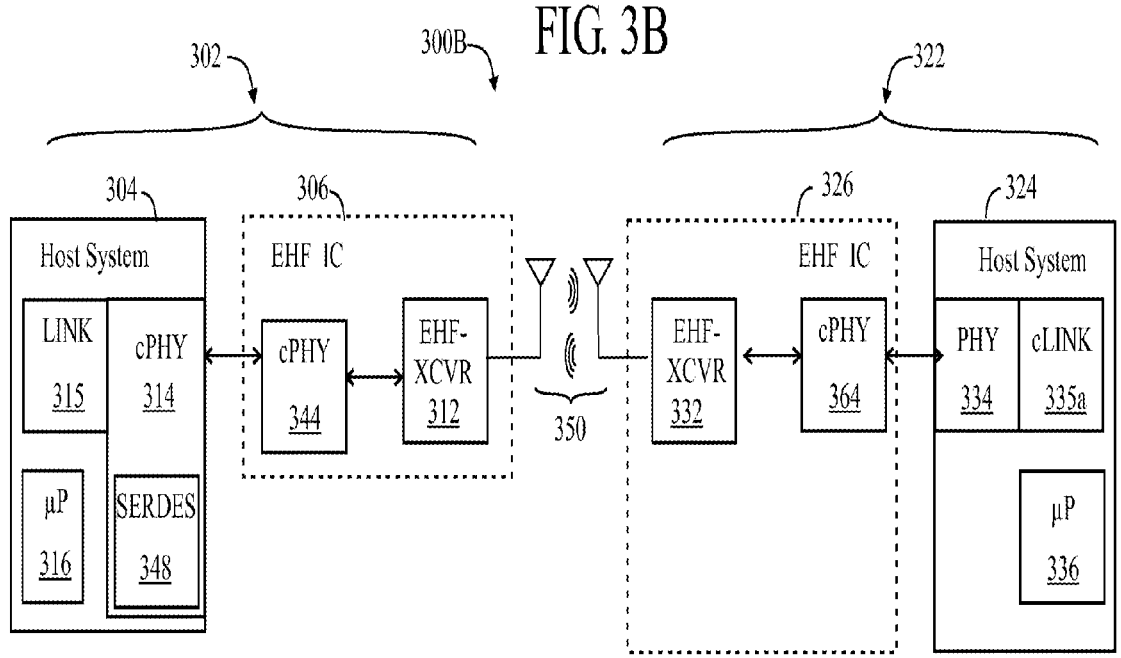

| FIG. # | Device on the Left (as viewed) 102, 202, 302 | Device on the Right (as viewed) 122, 222, 322 |
|---|---|---|
| FIG. 1 | EHF-XCVR 112<br>EHF-PHY 108<br>----------<br>PHY 114<br>LINK 115 | EHF-XCVR 132<br>EHF-PHY 128<br>----------<br>PHY 134<br>LINK 135 |
| FIG. 2 | EHF-XCVR 212<br>----------<br>Host-cPHY 214<br>LINK 215 | EHF-XCVR 232<br>----------<br>Host-cPHY 234<br>LINK 235 |
| FIG. 2A | EHF-XCVR 212<br>----------<br>Host-cPHY 214<br>cLINK 215a | EHF-XCVR 232<br>----------<br>Host-cPHY 234<br>cLINK 235a |
| FIG. 2B | EHF-XCVR 212<br>EHF-cPHY 244<br>----------<br>Host-cPHY 214<br>LINK 215 | EHF-XCVR 232<br>EHF-cPHY 264<br>----------<br>Host-cPHY 234<br>LINK 235 |
| FIG. 2C | EHF-XCVR 212<br>EHF-cPHY 244<br>----------<br>Host-cPHY 214<br>cLINK 215a | EHF-XCVR 232<br>EHF-cPHY 264<br>----------<br>Host-cPHY 234<br>cLINK 235a |
| FIG. 2D | EHF-XCVR 212<br>EHF-cPHY 244<br>----------<br>Host-cPHY 214<br>cLINK 215a<br>DP-PHY 246 | EHF-XCVR 232<br>----------<br>Host-cPHY 234<br>cLINK 235a |
| FIG. 2E | EHF-XCVR 212<br>----------<br>Host-cPHY 214<br>cLINK 215a<br>DP-PHY 246<br>DP LINK 245 | EHF-XCVR 232<br>----------<br>Host-cPHY 234<br>cLINK 235a |
| FIG. 2F | EHF-XCVR 212<br>----------<br>Host-cPHY 214<br>cLINK 215a<br>LINK 215 | Partner Device |
| FIG. 3 | EHF-XCVR 312<br>----------<br>Host-cPHY 314<br>LINK 315 | EHF-XCVR 332<br>EHF-PHY 328<br>----------<br>PHY 334<br>LINK 335 |
| FIG. 3A | EHF-XCVR 312<br>EHF-cPHY 344<br>----------<br>Host-cPHY 314<br>LINK 315<br>SERDES 348 | EHF-XCVR 332<br>EHF-cPHY 364<br>----------<br>PHY 334<br>LINK 335 |
| FIG. 3B | EHF-XCVR 312<br>EHF-cPHY 344<br>----------<br>Host-cPHY 314<br>cLINK 315a<br>SERDES 348 | EHF-XCVR 332<br>EHF-cPHY 364<br>----------<br>PHY 334<br>cLINK 335a |

Gen II Contactless Connectivity

According to some embodiments of the invention, generally, data and control blocks (or functions, such as measurement and control circuits) of the EHF IC (e.g., 106, 126) may be split out from the EHF IC (such as 106/126), and all or part of these data and control blocks may be integrated into the host system (such as 104/124) of the device (such as 102/122). In this manner, the EHF signaling portion of the EHF IC may be simplified and focused primarily on the analog and RF portions of the contactless communication over the contactless link.

As will be evident from the various embodiments and examples described henceforth, the Gen II contactless connectors (or Gen II contactless subsystems/EHF ICs) offer a high degree of flexibility for the design of the contactless system. It should be understood the Gen II implementations may include some features of the Gen I embodiments. In one example, the EHF IC may control one or more aspects of the contactless and the electrical links, which may include one or more of the power management features of the EHF IC, signal swings of the electrical interface and other parameters, but the overall state of the contactless and electrical links is substantially controlled and managed by the host system.

Information pertaining to the contactless data and control portions may be exchanged through a Standards-based interface of the host system and the EHF IC, and may or may not be visible to software running on the host system. If the host system includes a Gen II contactless connectivity interface, then this interface may be directly accessible by the host system of the device, and may be accessible by the host system software in the device.

FIG. 2 illustrates, generally, an example of an embodiment of an overall system architecture for a communications system 200 wherein two Gen II electronic devices 202 and 222 may communicate with one another over an associated EHF contactless link 250. Data may be transferred in at least one direction, from a first device 202 for sending the data to be transferred, to a second device 222 for receiving the data which is transferred. The second device 222 can be considered to be the partner device. In the main hereinafter, the transfer of data from the first device 202 to the second device 222 may be described. However, it should be understood that data may alternatively or additionally be transferred from the second device 222 (acting as a source for sending the data) to the first device 202 (acting as a destination or sink) for receiving the data), and that often information may be exchanged in both directions between the two devices 202 and 222 during a given communications session. An EHF contactless link 250 is shown between the two devices 202 and 222.

For illustrative clarity, the two devices 202 and 222 may be described as "mirror images" of one another, but it should be understood that the two devices 202 and 222 may be different than each other. For example, one of the devices may be a laptop computer and the other device may be a mobile phone. Some examples of electronic devices which may benefit from the techniques disclosed herein may include cell phones (or handsets, or smart phones), computers, laptops, tablets, or comparable electronic device, to name but a few. (In some contexts, such as USB, one of the devices may be referred to as the "host", with the other device being referred to simply as "slave".)

The first electronic device 202 is a Gen II device, and may comprise a host system 204 and an EHF IC 206. Generally, the EHF IC 206 may simply comprise one or more EHF-XCVRs 212. Note that there may be minimal or no processor or other data and control logic needed in the EHF IC 206. Generally, the host system 204 may comprise a Host-cPHY 214 and a Standards-based LINK 215. The host system 204 may also have a microprocessor or microcontroller 216.

The second electronic device 222 is a Gen II device, and may comprise a host system 224 and an EHF IC 226. Generally, the EHF IC 226 may simply comprise one or more EHF-XCVRs 232. Note that there may be minimal or no processor or other data and control logic needed in the EHF IC 226. Generally, the host system 224 may comprise a Host-cPHY 234 and a Standards-based LINK 235. The host system 224 may also have a microprocessor or microcontroller 236.

The TX portion of the EHF-XCVRs (212/232, 312/332, 512/532) and the EHF-TXs (411/431) of the EHF ICs disclosed herein may comprise an oscillator (not shown), a modulator (not shown), an antenna (which may be internal or external to the IC), and in some instances an electrical interface (EHF-PHY 328; or EHF-cPHY 244, 344/364) to the PHY (334) or Host-cPHY (214/234, 314, 414/434, 514/534) which may include capability for power control.

The RX portion of the EHF-XCVRs (212/232, 312/332, 512/532) and the EHF-RXs (413/433) of the EHF ICs disclosed herein may comprise an oscillator (not shown), a demodulator (not shown), an antenna (which may be internal or external to the IC), optionally a signal strength detector (not shown) and an electrical interface to the PHY (334) or Host-cPHY (214/234, 314, 414/434, 514/534). The EHF IC (206/226, 306/326, 406/426, 506/526) may not require or receive a clock input; the EHF IC on-chip oscillator may act as a clock source for the EHF IC. Instead, the on-chip oscillator clock is pre-programmed using fuses or other calibration techniques before it is used for EHF contactless communication.

The Host-cPHY (214/234, 314, 414/434, 514/534) may comprise means for implementing, interface specifications and medium (EHF contactless link) requirements for sending and receiving signals over an EHF transmission medium (250, 350, 450, 550) via an EHF IC (206/226, 306/326, 406/426, 506/526). (The Host-cPHY may have functionality that is directed towards the contactless link.) Any suitable encoding for formatting a bit stream being sent over the EHF transmission medium may be implemented by the Host-cPHY, such as (but not limited to) 8b/10b (a line code that maps 8-bit symbols to 10-bit symbols), and the like. Additional functionality may be incorporated into the Host-cPHY or accessible to the µP (216/236, 316, 416/436) via the Host-cPHY. The Host-cPHY may be incorporated into a system-on-chip (SOC) of the µP (216/236, 316, 416/436, 516/536). Generally, the EHF IC in a Gen II device is adapted to be used in conjunction with and benefit from the functionality of the Host-cPHY. The Host-cPHY may operate in conjunction with a Standards-based LINK or cLINK (described in greater detail hereinbelow).

The Host-cPHY may be designed to take advantage of and optimize EHF contactless communication and the operation of EHF-TXs, EHF-RXs and EHF-XCVRs, such as have been disclosed herein. The Host-cPHY may translate logical communications requests from the LINK) into hardware-specific operations to affect (including establish and control) transmission and/or reception of signals over the EHF contactless link. The Host-cPHY may provide customized signaling that may be optimized for at least one of power and performance.

The signal output from the Host-cPHY may determine (control) the strength of EHF signal output from the EHF IC, including whether the EHF IC is outputting a signal or not. The signal output may also determine the power state of the EHF IC and whether the EHF IC is in the "On" state or the "Off" state. The Host-cPHY may direct and manage the operation of the EHF communication link. Additional control signals (which may be provided from a separate interface in the Host-cPHY, over additional control signal paths, not shown) from the Host-cPHY in the host system of the device to the EHF IC may be used for providing power control of the EHF IC. Spread spectrum clocking may be employed to even out distribution of energy. The Host-cPHY may control modes of operation of the EHF IC including, but not limited to programming registers, controlling transmitter and receiver settings, adjusting power settings and selecting frequencies.

The Host-cPHY may be implemented with a Standards-based LINK, and without (or significantly) modifying other higher-layer functions between the LINK and the host processor.

Utilizing an existing (or Standards-based) PHY-to-LINK interface, additional features can be implemented to enable functionality associated with the EHF link, such as polling, beaconing, security, through the host system (202, 302, 402, 502) giving direction (additional information) to registers in the Host-cPHY. For example, the host system could transmit beacon signals through the EHF IC for device detection without the EHF IC taking up the responsibility for detection of other devices thus reducing system power and potentially reducing sync-up time when a new device is detected.

Control and management data in Standards-based protocols, that is typically communicated through an explicit side channel (like the AUX channel in DisplayPort, for example), can also be transmitted through the EHF link. Some implementations may include, but are not limited to:

- the Host-cPHY may multiplex/de-multiplex the main data from the LINK with control/management data from the LINK, and may transmit/receive one stream of data to/from the EHF IC.
- the Host-cPHY may transmit/receive the data to/from the LINK and the control/management data over two unique electrical links to the EHF IC. In this embodiment, the EHF IC can transmit each of these streams on two or more carrier frequencies.
- the EHF IC may multiplex/demultiplex the data from the LINK with the control/management data, and may transmit/receive through the contactless link over a single carrier frequency.
- the EHF IC may perform serializer/deserializer functionality.
- the control/management data from the LINK may partially or completely terminate in the Host-cPHY (and may not propagate to the EHF IC). In this embodiment, where the control/management data is partially or completely terminated in the Host-cPHY, the response signals may be generated by the Host-cPHY to ensure the compatibility of the LINK with the Host-cPHY. For example, ACK signals generated in USB may need to be generated in the Host-cPHY (fake signals) if the control/management communication from the LINK is terminated in the Host-cPHY.

Multiple data streams (FIGS. 4, 5, 6) may be merged and sent over a single EHF contactless link. Multiple data streams may be sent and received from multiple Host-cPHYs to multiple EHF ICs.

Single data streams received from the host system may be split by the Host-cPHY and routed to multiple EHF ICs. In a similar manner, multiple data streams received by the Host-cPHY from the EHF IC may be merged and sent to the host system.

Figure 8A:
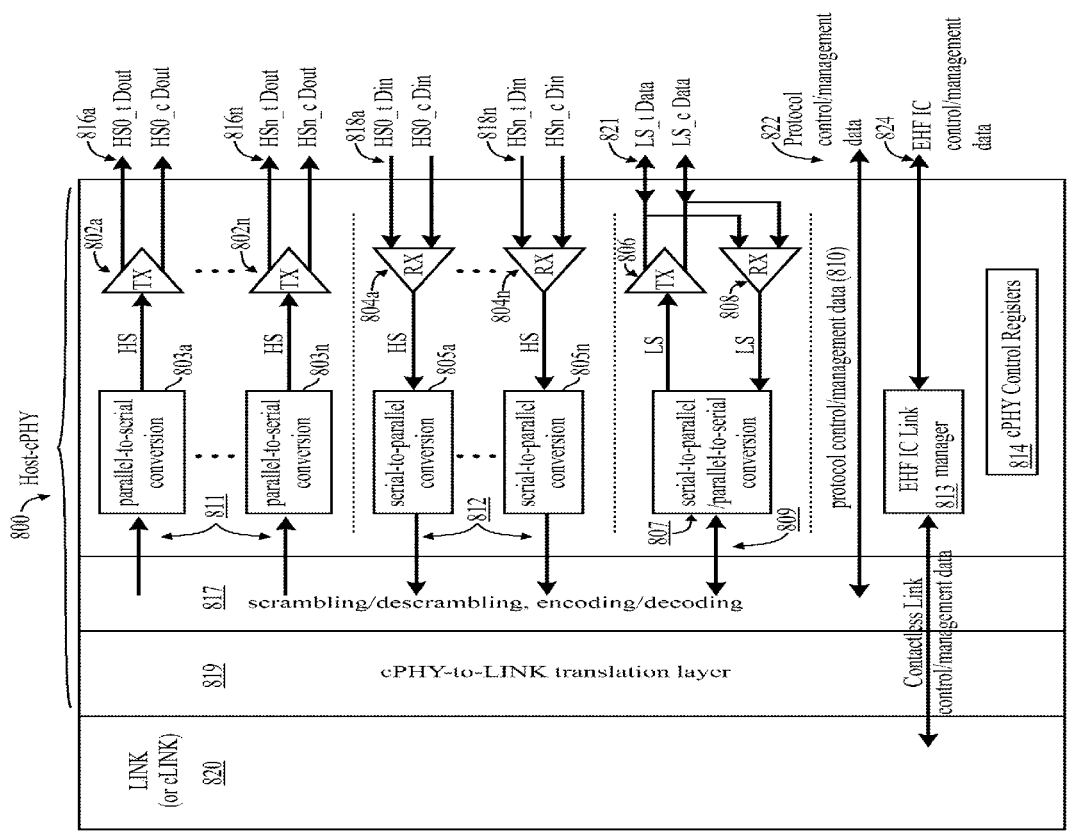
FIG. 8A is a diagram illustrating a Host-cPHY, including a Host-cPHY-to-LINK translation layer.

The Host-cPHY may be installed (resident) in the host system in addition to other Standards-based interfaces. Generally, the Host-cPHY may be implemented transparently (without requiring substantial software and/or hardware changes in rest of the host system), independently performing the task of translating (converting, adapting) the output of the LINK to a suitable format for interfacing with (and being transmitted over) the EHF transmission medium. Support of Standards-based protocols can be achieved with minimal or no software changes in the host system. (FIG. 8A illustrates an example of a Host-cPHY performing the translation.)

The LINK and other layers of the protocol stack may also be modified (arranged) to better utilize EHF contactless communication between two separate and distinct electronic devices communicating over the EHF transmission medium.

A Host-cPHY-to-LINK translation layer, which may be part of the Host-cPHY, may perform translation between the Host-cPHY and the LINK.

The Host-cPHY may perform encoding to control the EHF IC. In some implementations, the Host-cPHY is capable of driving the EHF IC (which includes turning it On and Off), performing power management, optimizing performance of the communication link, and detecting the presence of external devices. Additional control signal paths between the host system (when Host-cPHY is implemented in the host system) and the EHF IC may be provided to implement power management and control of the EHF IC by the Host-cPHY.

The Host-cPHY may (i) determine and establish optimum timing, frequency, and amplitude of the EHF signal being sent via the EHF IC over the contactless link (250, 350, 450, 550) and (ii) adjust the phase, equalization, voltage levels, drive strength, slew rate, and termination for electrical signals between the host system and the EHF IC. The Host-cPHY may also adjust the phase, equalization, voltage levels, drive strength, slew rate, and termination between a partner device's EHF IC and host system. In this manner, the communication channel can be optimized, from end-to-end, along the entire path from the host system of one electronic device to the host system of a partner device. The Host-cPHY may control and manage when to start sending the signal over the communications link, the power level of the signal, and when to stop sending the signal.

The Host-cPHY may be further adapted to interface between the LINK and the EHF IC, for implementing (initiating, managing, controlling) the transfer of data over the EHF transmission medium, and for allowing the Host IC to implement additional functionality (such as power management, encryption, digital rights management, vibration detection, etc.).

The Host-cPHY can transcode the data that it receives from the LINK, irrespective of the underlying protocol, and transmit the transcoded data through the EHF IC which then may be transcoded to the original coding by the Host-cPHY in the receiving device. The Host-cPHY may additionally contain a subset or all of the functionalities of the Standards-based PHY. These functionalities may or may not include Standards-based electrical signaling requirements.

Generally, the signaling between the host system and the EHF IC may be implemented with customized signaling, such as "8b10b", which may be optimized for at least one of power and performance. This customized signaling, as implemented by the Host-cPHY 214/224 may be optimized such that the signaling from the host system 204/224 may directly power and modulate the EHF-XCVR (particularly the EHF-TX portion of the EHF-XCVR) 212/232 in the EHF IC 206/226. This eliminates the need (such as in Gen I devices) to terminate signals from the host system (with a Standards-based PHY) through resistors, to ground or supply. Rather, signals from the host system may be provided to the high-speed analog inputs at differential inputs of the EHC IC's EHF-TXs (or transmitter portions of the EHF-XCVR).

The Host-cPHY may communicate with the EHF IC using digital signaling. "Digital signaling" may refer to two-level single-ended or differential signaling. However, it should be understood that the Host-cPHY may communicate using analog electrical signaling to and from the EHF IC. "Analog signaling" may refer to multi-level single-ended or differential signaling. The analog signaling may directly drive the EHF IC. The Host-cPHY may also be able to create multi-level signaling, and perform signal shaping, encoding and decoding of signals. Analog signaling may include audio, video, or other types of analog signaling. Backwards compatibility may be provided, such as with digital-only PHYs or Host-cPHYs by incorporating digital-to-analog converters (DACs) and analog-to-digital converters (ADCs) in an analog-enabled Host-cPHY. Using conventional techniques and circuitry (such as mixers and adders), analog signals may be transmitted and received on the same wires from the Host-cPHY to the EHF IC. In this manner, full-duplex communication between the Host-cPHY and the EHF IC may be implemented. Discovery and enumeration techniques may be implemented to facilitate the exchange of signals between the Host-cPHY and the EHF IC.

The Host-cPHY may optimize the end-to-end signal path from one device to the other (connected, via the EHF contactless link) device. This optimization may include modification of the electrical signal(s) sent to or received from the EHF IC. The signal levels of the electrical signal(s) may be optimized for power, performance, or signal integrity. The electrical signal may be encoded (using 8b10b or other coding schemes, for example) to improve the end-to-end transmission path and improve the signal integrity of the received signal at the corresponding device's Host-cPHY. The Host-cPHY may select a code that provides optimized emissions from the EHF IC across the contactless communications link, and may change codes depending upon emissions requirements and the like. The Host-cPHY may use other techniques to help improve signal quality and performance including, but not limited to, providing or embedding signaling in order to modify the frequency, phase, or amplitude of the EHF IC carrier frequency. In addition, depending on the channel characteristics between the Host-cPHY and the EHF IC, transmitter pre-emphasis and/or receiver equalization techniques may also be employed. For example, if the channel (electrical channel) loss between the host system and the EHF IC is beyond negligible levels, the signal integrity may be degraded and techniques such as pre-emphasis or equalization may compensate for such non-idealities of the channel.

Transmitter pre-emphasis and receiver equalization functions may be substantially implemented in the host system. These functionalities may also be partially or substantially implemented in the EHF IC. By implementing these functionalities in the EHF IC, the Host-cPHY design may be simplified across many host systems. Pre-emphasis and equalization functions can also be implemented as optional features which can be turned on only for systems that have severe channel non-idealities, while in other cases they could be turned off. In a typical tablet/phone application the host system (primarily its Application Processor) could be located at relatively longer distances from the EHF IC, where the EHF IC could be conveniently placed near the edge of the PCB (printed circuit board), while the pre-emphasis and equalization functions compensate for channel non-ideality between these two ICs (Host IC and EHF IC). These functions may therefore provide flexibility for mobile platform designs with negligible penalties in power dissipation or silicon footprint. This may be contrasted with, and may represent an improvement upon some existing approaches where the PHY is optimized for a worst-case channel condition (such as an external cable), thus resulting in greatly increased power dissipation and/or silicon footprint.

The Host-cPHY, in combination with the EHF IC, may be capable of generating one or more of the following modulation schemes: OFDM (Orthogonal Frequency Division Multiplexing), FDMA (Frequency Division Multiple Access), TDMA (time division multiple access), SC-FDMA (single-carrier FDMA), OOK (on/off keying), ASK (amplitude shift keying), PSK (phase-shift keying), QAM (quadrature amplitude modulation), APSK (Amplitude and phase-shift keying or asymmetric phase-shift keying), FPSK (frequency phase-shift keying) and other modulation techniques. The elements of the Host-cPHY may be adapted to the modulation technique used. The Host-cPHY and the EHF IC can co-optimize the functionality of modulating/demodulating the digital stream passing through the contactless transmission medium. In an exemplary embodiment, the Host-cPHY would transmit/receive data stream(s) while the encoding/decoding (for generating or decoding symbols) and mixing functions for modulation/demodulation is performed in the EHF IC. In another embodiment, the encoding function could be performed in the Host-cPHY and an encoded symbol may be transmitted to the EHF IC, where the mixing function is performed; and in the receive path the EHF IC could perform the mixing function while the decoding is done either in the EHF IC or the Host-cPHY. The ability to divide multiple functionalities between the Host-cPHY and the EHF IC provides the flexibility to optimize a system/device design based on trade offs between data throughput, power, SNR/BER (signal-to-noise ratio/bit error rate) and cost.

In the case of PSK, APSK, FPSK, QAM modulation and other similar modulation techniques, elements that may be included in the Host-cPHY for these coding schemes may include constellation mappers, single or multiple DFTs (discrete Fourier transform), single or multiple iDFTs (inverse DFTs), transmitter(s), and receiver(s). One or more of the transmitters and receivers may be configured to output/input in-phase data (I) to/from the EHF IC, while at the same time one or more of the transmitters and receivers may be configured to output/input quadrature-phase data (Q) to/from the EHF IC. Various embodiments may be implemented, including but not limited to:

- the EHF IC may receive/transmit I or/and Q data from the Host-cPHY. The EHF IC may receive from the Host-cPHY I and Q data but may transmit only one of the I or Q phase data streams over the contactless link.
- the EHF IC may receive over the contactless link I and Q data streams and may transmit one or both data streams to the Host-cPHY.
- the EHF IC may receive I and Q data streams over the contactless link and may decode this data using a simplified mixing scheme wherein some data is not decoded. This may provide reception loss immunity. For example, a receiver that is designed for decoding a single phase amplitude shift keying modulation could decode either I or Q data from a received data stream that includes both I and Q data.

It should be understood that other embodiments are possible in addition to the I and Q example implementations mentioned above. In these other embodiments the EHF IC may only transmit a subset of the data received over the contactless link or over the Host-cPHY link. This may enable the EHF IC to maintain some compatibility with existing or future contactless implementations. The high-speed transmitter(s) in the Host-cPHY may be programmed to output two or more signal levels that may correspond to the level of the EHF signal produced by the EHF IC. The high-speed receiver(s) in the Host-cPHY may convert between signal levels received by the EHF IC and internal digital signals. These levels may map to one or more states of the internal digital signaling. For example, in a signaling scheme where four-level voltage signaling is used between the EHF IC and the Host-cPHY, the internal digital signaling would correspond to "two" digital bits per each sampled four-level voltage signal.

The Host-cPHY may encode the signal to create a specific output spectrum, and may manipulate the emissions inbound and outbound in order to overlap data streams onto the same carrier frequencies, and different protocols may be selected based on different end goals. Encoding may be used to separate transmit and receive portions of the communication. Providing multiple carriers (both inbound and outbound) may frustrate attempts at snooping. Providing multiple carriers may also enable emissions compliance. The Host-cPHY may provide multi-level signaling, and signaling that has otherwise been customized (such as by altering phase and frequency).

The Host-cPHY may enable modifying the encoding of data sent across the contactless link to meet FCC or other country specific requirements. Different encoding schemes may be implemented, based on which codes result in compliance with emissions requirements.

Additionally, the need for the EHF IC to determine and/or regulate voltage levels may be eliminated. The combination of a Host-cPHY and a "simplified" EHF IC can enable enhanced functionality and significant power savings.

The Host-cPHY may include a pair of lines for a differential transmitter of the EHF IC, a pair of lines for a differential receiver of the EHF IC, and one or more control lines for controlling the power of the EHF IC. The Host-cPHY, operating in conjunction with the EHF IC may have several advantages, including but not limited to:

- The EHF IC may be driven (powered) by the signaling input from the host/device IC. The signaling lines could be used to draw current from the respective host system (or elsewhere in the host device) to power-up the EHF IC. In other words, the EHF IC may not have an explicit supply voltage; instead the power may be partially or completely derived from the input signal lines.
- The EHF IC may be greatly simplified (in contrast, for example, to the EHF ICs 106/126) due to the removing of much of the data and control portions. Generally, the EHF IC may include EHF-cPHY-TX(s), EHF-cPHY-RX(s), analog support circuitry and EHF-XCVR(s).
- The die size for the EHF IC can be reduced based on the simplicity of the EHF IC (such as limited need for data and control portions).
- Testing may be greatly simplified for the EHF IC due to its limited control portions and the relaxation of Standards-based compatibility requirements (in contrast, for example, to the EHF IC 106/126).
- Multiple high-speed data streams (refer, for example, to FIGS. 4,5,6) can be directed to the EHF IC and output over a range of frequencies or mixed into a single carrier.

Direct communication between the host system and the EHF-XCVRs, without the EHF-PHY, such as the EHF-PHY 108, enables multiple co-optimization possibilities of the EHF IC and the host system. For example, the host system can directly control the power dissipation of the EHF-XCVRs or EHF-TXs based on the state of the link being on, off or in a low power state. This flexibility may reduce the amount of logic needed on the EHF IC.

The EHF IC's electrical interface with the host system can be in conformance with a Standards' electrical specification (such as USB, DisplayPort) either partially, completely or not at all. Designing the EHF IC communication interface to the host system to be Standards-agnostic may provide significant flexibility for the design of the EHF IC and the host system. For example, if the electrical interface is in accordance with the DisplayPort electrical specification, the EHF contactless link could transport DisplayPort (DP) data as well as USB or Thunderbolt data with appropriate LINKs implemented in the corresponding host systems. This may enable the EHF IC to be independent of both the electrical and protocol updates to any of the Standards' specifications. This may not only reduce the complexity of the EHF IC and the host system, but may also reduce the overall power dissipation and silicon footprint of the host system and the EHF IC. With a Gen II EHF IC (206/226, 306/326, 406/426, 506/526) the requirement to upgrade the contactless connector for every revision of the Standards' specification may be reduced or eliminated, thus significantly reducing development and upgrade costs.

FIG. 2A illustrates an embodiment of an EHF communication system 200A that may be considered to be an expansion of the embodiment shown in FIG. 2. In this embodiment, the devices 202/222 are shown as mirror images of one another. Two Gen II electronic devices 202 and 222 are shown, communicating over an EHF contactless link 250. Both devices 202/222 are shown having an EHF IC 206/226 with one or more EHF-XCVRs 212/232. The host systems 204/224 of both devices are shown having a Host-cPHY 214/234, and a cLINK 215a/235a. The host systems 204/224 of both devices are shown having a microprocessor or microcontroller 216/236.

A cLINK may be modified from an existing LINK in order to take advantage of the capabilities of the EHF contactless link. The cLINK may have functionality that is directed towards the contactless link and may also have a functionality that is directed towards the electrical connection between the host system and the EHF IC. For example, the cLINK may be capable of initiating a power-down or power-up sequence directed to the Host-cPHY and/or the EHF IC, which may not have been a feature of the LINK when it was designed for a Standards-based protocol. Other enhancements could be made to improve performance metrics such as speed and power dissipation and also to enable security enhancements. Updates to the cLINK could also be made to enable the same cLINK to support a plurality of communication paths (such as in the manner of FIG. 5A). The cLINK can support/switch between multiple LINKs at the same time. One cLINK may be shared by many Standards-based LINKs.

It should be understood that the connection between (shown as a line extending between) the Host-cPHY 214 and the EHF IC 206 may represent a plurality of signal paths for transferring both main data and the control/data management data, and may be applicable to the various embodiments shown in FIGS. 2, 2A, 2B, 2C, 2D, 2E.

The cLINK, or a number of cLINKs may be implemented so as to be compatible with a specific LINK interface which could be (for example) a given Standards-based LINK. A portion of the cLINK that communicates with each of these LINKs may be designed (configured) such that the remainder of the cLINK may be substantially agnostic to the underlying Standards-based protocols. The cLINK may, at least partially be implemented in software thus enabling easier interfacing to specific Standards-based LINKs.

In some scenarios, the connection (and interface) between the cLINK and Host-cPHY may be implemented so as to be transparent to a Standards-based LINK. For example, from FIG. 2E the embodiment shows a cLINK that is a modification of the Standards-based LINK. In such a case, the cLINK may not be an adaptation of the Standards-based LINK, but rather the cLINK may be optimized for the EHF contactless link. In FIG. 8C, the LINK could be any of the Standards-based LINKs and may interface with the cLINK, which also interfaces with the Host-cPHY. The cLINK may be designed to significantly improve the reliability of the EHF contactless link as well as providing seamless control (from the LINK perspective) of the Host-cPHY and the EHF IC.

The cLINK, as shown in the embodiment in FIG. 8C, may have several capabilities. For example, an EHF state machine may keep track of the state of the EHF contactless link including the Host-cPHY. These states may be shared with the LINK based on a particular protocol. For example, when a contactless link is established between two devices, the state information as it relates to this connectivity may be stored only in the EHF state machine while the overall link connectivity state (that includes the end-to-end link) information may be stored in the LINK, as is defined in the Standard(s) associated with the LINK. The cLINK may provide encryption as it relates to the EHF contactless link. This encryption could be in addition to the encryption that may already be provided at the LINK.

The cLINK may also multiplex/demultiplex the stream data and the control/management data from/to the LINK to enable the Host-cPHY and the EHF IC to transmit both streams over a single lane or carrier frequency in the EHF IC without the use of an additional transceiver (in the EHF IC) for transmitting/receiving control/management data received/transmitted from/to the LINK This may reduce complexity, area and power dissipation in the EHF IC. Frequency translation may enable the function of multiplexing/demultiplexing in the cLINK to account for different data rates before and after the multiplexing/demultiplexing operations.

In some embodiments, a cLINK may interface with a Host-cPHY that communicates through the contactless link, and with one or more other PHYs (for example a DisplayPort PHY (DP-PHY)), that may communicate over a different link (DisplayPort LINK (DP-LINK)), which may or may not be a contactless link. In these embodiments, the cLINK may transmit and receive main link data through one of a Host-cPHY or the PHY, but not substantially at the same time. In other embodiments, there may be a substantially dedicated LINK for each PHY. For example, a cLINK for the Host-cPHY and a different LINK for each other PHY interface. For example, FIG. 2E shows two LINKs. The cLINK is dedicated for the Host-cPHY, and a DP-LINK (245) is dedicated for the DP-PHY (246). Any combinations of these embodiments are possible, based on the particular requirements of the system and/or the applications of the electronic devices within which these LINKs and PHYs are resident.

As described in greater detail with respect to FIG. 9, a VcPHY is adapted for a contactless link that enables seamless communication between devices or host systems. The VcPHY, which may be part of a host system, may interface electrically with an EHF IC that is capable of contactless communication. The cLINK may be adapted for the VcPHY and functionally couples a Standards-based LINK with the Host-cPHY in the VcPHY. The adapted cLINK may have a LINK functionality that is directed towards the contactless link and may also have a functionality that is directed towards the electrical connection between the host system and the EHF IC. The contactless link may be optimized to perform functions based on an underlying protocol and the application environment in which the contactless link is implemented.

FIG. 2B illustrates an embodiment of an EHF communication system 200B that may be considered to be an expansion of the embodiment shown in FIG. 2A. (In this embodiment, the devices 202/222 are shown as mirror images of one another.) Two Gen II electronic devices 202 and 222 are shown, communicating over an EHF contactless link 250. Both devices 202/222 are shown having an EHF IC 206/226 with one or more EHF-XCVRs 212/232. The EHF ICs 206/226 of both devices 202/222 are shown having EHF-cPHYs 244/264 which are adapted for contactless communication. The host systems 204/224 of both devices are shown having Host-cPHYs 214/234 adapted for EHF contactless communication and a Standards-based LINK 215/235. The host systems 204/224 of both devices are shown having a microprocessor or microcontroller 216/236.

Regarding the EHF-cPHY, as may be relevant to the EHF ICs of any of the Gen II devices disclosed herein (or otherwise implemented), the EHF-cPHY, which is disposed in a signal path between the Host-cPHY and the EHF-XCVR of the EHF IC, may incorporate some PHY functionality, and in addition to the standard I/O, may function to improve the reliability of the transmission between the EHF IC and the host system. The EHF-cPHY may enable better signal integrity in the EHF IC, and may perform retiming of signals which are transmitted or received. The EHF-cPHY may also include other functions such as equalization, pre-emphasis or CDR (clock and data recovery). The EHF-cPHY may also be just a simple buffer that improves signal integrity of the link.

The EHF-cPHY may be implemented, to perform various functions, including, but not limited to:

The EHF-cPHY may not need a clock input and may merely act as a buffer/driver for the input/output data from an electrical interface.

The EHF-cPHY may use an output clock (input to the EHF IC) to retime input data and/or to drive output data from an electrical interface.

The EHF-cPHY does not use an output clock but instead may use the clock from the on-chip oscillator clock to retime/drive the data received/transmitted from/to an electrical interface.

The EHF-cPHY may use an external clock input for either retiming of the received data from the host system or for transmitting data to the host system or both.

The external clock input could be spread spectrum modulated for reducing EMI at higher data rates (for example, data rates >10 Gbps).

The transmitted data from the EHF IC to the host system, through the EHF-cPHY, may be spread spectrum modulated.

The transmitted data from the host system to the EHF IC, through the EHF-cPHY, may be spread spectrum modulated.

In the example of FIG. 2B, the Host-cPHY 214/234 may be adapted to interface between a Standards-based LINK 215/235 and the EHF-cPHY 244/264 of EHF IC 206/226, for directly driving and controlling the EHF IC 206/226, and for implementing (initiating, managing, controlling) the transfer of data over the EHF contactless link 250, and for allowing the host system 204/224 to implement additional functionality (such as power management, encryption, digital rights management, vibration detection, etc.).

FIG. 2C illustrates an embodiment of an EHF communication system 200C that may be considered to be an expansion of the embodiment shown in FIG. 2B. In these embodiments, the devices 202/222 are shown as mirror images of one another. Two Gen II electronic devices 202 and 204 are shown, communicating over an EHF contactless link 250. Both devices 202/222 are shown having an EHF IC 206/226 with one or more transceivers EHF-XCVR(s) 212/232. The EHF ICs 206/226 of both devices 202/222 are shown having an EHF-cPHY 244/264. The host systems 204/224 of both devices are shown having a Host-cPHY 214/234 and cLINK 215a/235a. The host systems 204/224 of both devices are shown having a microprocessor or microcontroller 216/236.

FIG. 2D illustrates an embodiment of an EHF communication system 200D that may be considered to be an expansion of the embodiment shown in FIG. 2C. In this embodiment, the devices 202/222 are shown as not being mirror images of one another. Two Gen II electronic devices 202 and 222 are shown, communicating over an EHF contactless link 250. Both devices 202/222 are shown having an EHF IC 206/226 with one or more EHF-XCVR(s) 212/232. The EHF IC 206 of the device 202 is shown as having a EHF-cPHY, whereas the EHF IC 226 of the device 222 is shown without a EHF-cPHY. The host systems 204/224 of both devices comprise a Host-cPHY 214/234 and a cLINK 215a/235a. The host system 204 of the device 202 may include a DP-PHY 246. The host system 224 of the device 222 is shown without a DP-PHY or LINK implementation. The host systems 204/224 of both devices 202/222 are shown having a microprocessor or microcontroller 216/236.

FIG. 2E illustrates an embodiment of an EHF communication system 200E that may be considered to be an expansion of the embodiment shown in FIG. 2D. In this embodiment, the devices 202/222 are shown as not being mirror images of one another. Two Gen II electronic devices 202 and 204 are shown, communicating over an EHF contactless link 250. Both devices 202/222 are shown having an EHF IC 206/226 with one or more EHF-XCVR(s) 212/232. In this embodiment, the EHF ICs 206/226 of both devices 202/222 are shown without a EHF-cPHY. The host systems 204/224 of both devices are shown as having a Host-cPHY 214/234 and a cLINK 215a/235a. The host system 204 of the device 202 comprises a DP PHY 246 and a DP LINK 245. The host system 224 of the device 222 is shown without a DP PHY or a DP LINK. The host systems 204/224 of both devices are shown having a microprocessor or microcontroller 216/236.

The DP LINK 245 may be a LINK which is adapted to assign an appropriate physical protocol to data, in this case for the DP PHY 246.

FIG. 2F illustrates an embodiment of an EHF communication system 200F that may be considered to be an expansion of the embodiment shown in FIG. 2E. In this embodiment, only one of the devices 202 is shown in detail. The device 202 has an EHF IC 206 with one or more EHF-XCVR(s) 212. In this embodiment, the EHF IC 206 of the device 202 is shown without a EHF-cPHY. The host system 204 of the device is shown as having a Host-cPHY 214 and a cLINK 215a. The host system 204 of the device 202 comprises a Standards-based LINK 215, and is shown having a microprocessor or microcontroller 216.

FIG. 3 illustrates an embodiment of an EHF communication system 300, and is illustrative of "backwards" compatibility of a Gen II electronic device 302 (left) with an electronic device 322 (right) with a Gen I EHF IC. In this embodiment, the devices 302/322 are shown as not being mirror images of one another. The two electronic devices 302 and 322 are shown communicating over an EHF contactless link 350. The device 302, which may be substantially similar to the device 202 of FIG. 2, is shown having an EHF IC 306 with one or more EHF-XCVR(s) 312. The device 322, which may be substantially similar to the device 126 of FIG. 1, is shown having a EHF IC 325 having one or more EHF-XCVRs 332, an EHF-PHY 328 and its own microprocessor or microcontroller 330. The EHF IC 306 of the device 302 is shown without its own microprocessor or microcontroller. The host system 304 of the device 302 is shown having a Host-cPHY 314, and a Standards-based LINK 315. The host system 324 of the device 322 is shown having a Standards-based PHY 334 and a Standards-based LINK 335. The host systems 304/324 of both devices are shown having a microprocessor or microcontroller 316/336.

The first electronic device 302 is shown as a Gen II device and may be substantially identical to the device 202 (or 222), having a host system 304 (compare 204/224) and an EHF IC 306 (compare 206/226). The host system 304 may comprise a Host-cPHY 314 (compare 214/234), a LINK 315 (compare 215/235), and a processor 316 (compare 216/236). The EHF IC 306 may simply comprise at least one EHF-XCVR 312 (compare 212/232).

The second electronic device 322 is shown as a Gen I device and may be substantially identical to the device 122 (or 102), having a host system 324 (compare 124/104) and an EHF IC 325 (compare 126/106). The host system 324 may comprise a Standards-based PHY 334 (compare 134/114) and a processor 336 (compare 136/116). The EHF IC 325 may comprise an EHF-PHY 328 (compare 128 or 108), at least one EHF-XCVR 332 (compare 132/112), and optionally a processor 330 (compare 130/110).

This illustrates incorporating backwards compatibility into an electronic device 302 incorporating the Host-cPHY 314, and the operating system (or an application) in the Gen II device 302 may be adapted to incorporate functionality for communicating with a Gen I device 322. The Host-cPHY 314 may emulate Standards-based PHYs, and may be operated with Host-cPHY capability or Standards-based PHY capability depending on whether the partner device is detected to be a Gen II or a Gen I device.

The Host-cPHY 314 of the Gen II device 302 may emulate the PHY 334 of a Gen I device 322. For example, during enumeration in conjunction with link discovery, the Gen II Host-cPHY 314 can discover that the partner device has a Gen I PHY 334, and registers in the Host-cPHY 314 may be configured to interact appropriately with the Gen I PHY 334 of the partner device 322. Discovery and enumeration can be extremely short (such as a few milliseconds), so as to be substantially transparent to the host system. The Host-cPHY may be configured to perform as a Standards-based PHY. The Host-cPHY can be toggled between Gen II and Gen I functionality.

The EHF-cPHY may implement SERDES functionality or any other necessary function to improve the reliability of the transmission between the EHF IC and the host system. FIGS. 3A, 3B disclose having a SERDES in the Host-cPHY.

FIG. 3A illustrates an embodiment of an EHF communication system 300A that may be considered to be an expansion of the embodiment shown in FIG. 3. In this embodiment, the devices 302/322 are shown as not being mirror images of one another. Two Gen II electronic devices 302 and 322 are shown, communicating over an EHF contactless link 350. The devices 302/322 are shown having an EHF IC 306/326 with one or more EHF-XCVRs 312/332. The EHF ICs 306/326 of both devices 302/322 are shown having a EHF-cPHY 344/364 which is adapted for contactless communication. The host system 304 of the device 302 is shown having a Host-cPHY 314, and a Standards-based LINK 315. The host system 304 of the device 302 is shown having a SERDES 348. The host system 324 of the device 322 is shown having a Standards-based PHY 334 and a Standards-based LINK 335, and without a SERDES. The host systems 304/324 of both devices are shown having a microprocessor or microcontroller 316/336.

FIG. 3B illustrates an embodiment of an EHF communication system 300B that may be considered to be an expansion of the embodiment shown in FIG. 3A. In this embodiment, the devices 302/322 are shown as not being mirror images of one another. Two Gen II electronic devices 302 and 322 are shown, communicating over an EHF contactless link 350. The devices 302/322 are shown having an EHF IC 306/326 with one or more EHF-XCVR(s) 312/332. The EHF ICs 306/326 of both devices 302/322 are shown having a EHF-cPHY 344/364. The host system 304 of the device 302 is shown having a Host-cPHY 314, and a cLINK 315a. The host system 304 of the device 302 is shown having a SERDES 348. The host system 324 of the device 322 is shown having a Standards-based PHY 334 and a cLINK 335a adapted for EHF contactless communication, and without a SERDES. The host systems 304/324 of both devices are shown having a microprocessor or microcontroller 316/336.

FIGS. 3A and 3B illustrate some embodiments where SERDES functionality may be implemented in the host system (304), rather than in the EHF IC (306). In this manner, the burden on signal processing may be borne by the host system (instead of the EHF IC) where the clock and data recovery circuits (CDR) and transmit pre-processing may be substantially performed in the digital domain. As compared to when this is done in the EHF IC, the overall system power dissipation and cost of the silicon footprint may be reduced. It is also contemplated that an EHF IC may implement SERDES functionality as well. This may augment or replace the SERDES functionality in the host system.

Multiple Data Streams

FIG. 4 illustrates an example of implementing Gen II contactless connectivity for multiple data streams, using separate EHF-TX and EHF-RX in EHF ICs 406a and 406b, respectively. A communications system 400 is illustrated with two electronic devices 402 and 422 communicating with one another over an associated EHF contactless link 450. The two electronic devices 402 and 422 may be substantially identical.

The first electronic device 402 is a Gen II device, and may comprise a host system 404 and an EHF IC 406a/406b. The host system 404 may comprise a plurality of individual Host-cPHYs 414a-414d (which may collectively be referred to as "414"), a plurality of individual Standards-based LINKs 415a-415d (which may collectively be referred to as "415"), and a processor 416. Four each of Host-cPHYs 414 and LINKs 415 are shown, for illustrative purposes, but there may be more (or less). Some or all of the LINKS may be cLINKs, such as the cLINKs 215a described hereinabove, and the host system may have both Standards-based LINKs and cLINKs.

Generally, the EHF IC 406 associated with the first electronic device 402 may comprise an EHF IC 406a comprising an EHF-TX 411 and an EHF IC 406b comprising a EHF-RX 413. The EHF IC 406a may include a EHF-cPHY (not shown), such as in the manner described herein with respect to FIGS. 2B, 2C. The EHF-TX 411 may have a differential amplifier at its input, in the manner described herein with respect to the EHF-XCVRs (212/232, 312/332). No processor and no or minimal data and control logic may be needed in the EHF IC 406a/406b.

The second electronic device 422 is a Gen II device, and may be substantially identical to the first electronic device 402, and may comprise a host system 424 and an EHF IC 426a/426b. The host system 424 may comprise a plurality of individual Host-cPHYs 434a-434d (which may collectively be referred to as "434"), a plurality of individual LINKs 435a-435d (which may collectively be referred to as "435"), and a processor 436. Four each of Host-cPHYs 434 and LINKs 435 are shown, for illustrative purposes.

The EHF IC 426a/426b associated with the second electronic device 422 may comprise an EHF IC 426a comprising an EHF-TX 431 and an EHF IC 426b comprising a EHF-RX 433. The EHF IC 426a may include a EHF-cPHY (not shown), such as in the manner described herein with respect to FIGS. 2B, 2C. The EHF-TX 431 may have a differential amplifier at its input, in the manner described herein with respect to the transceivers (212/232, 312/332). No processor and no or minimal data and control logic may be needed in the EHF IC 426a/426b.

The purpose of having multiple LINKs 415/435 and multiple Host-cPHYs 414/434 is to provide capability for accommodating multiple data streams generated by the host systems 404 and 424, and passing via the EHF ICs 406a/406b and 426a/426b between the two electronic devices 402 and 422, respectively, over the EHF contactless link 450.

Figure 5:
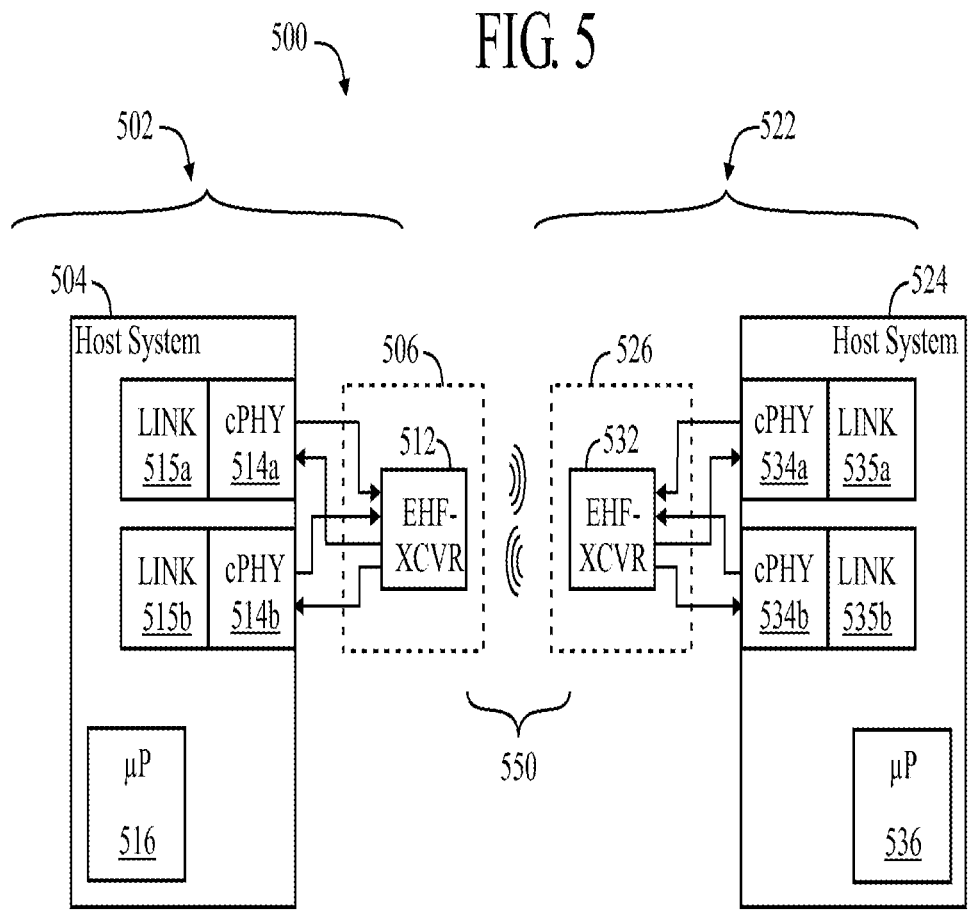

FIG. 5 illustrates a communications system 500 with two Gen II electronic devices 502 and 522 communicating with one another over an associated contactless link 550 and configured to handle multiple transmit and receive streams of data. The two electronic devices 502 and 522 may be substantially identical with one another.

The first electronic device 502 is a Gen II device, and has a host system 504 and an EHF IC 506. The host system 504 may comprise two individual Host-cPHYs 514a and 514b (which may collectively be referred to as "514"), two corresponding individual LINKs 515a and 515b (which may collectively be referred to as "515"), and a processor 516. The EHF IC 506 may comprise a single EHF-XCVR 512. Some or all of the LINKs may be cLINKs, such as the cLINKs 215a described hereinabove, and the host system may have both Standards-based LINKs and cLINKs.

The second electronic device 522 is a Gen II device, and has a host system 524 and an EHF IC 526. The host system 524 may comprise two individual Host-cPHYs 534a and 534b (which may collectively be referred to as "534"), two corresponding individual LINKs 535a and 535b (which may collectively be referred to as "535"), and a processor 536. The EHF IC 506 may comprise a single EHF-XCVR 532. The EHF-XCVRs 512 and 532 of the EHF ICs 506 and 526 may each have two inputs and two outputs to accommodate two full-duplex channels of data.

FIG. 4 illustrated a single electronic devices generating four data streams and using a single EHF-TX 411 and a single EHF-RX 413, for contactless data transfer over the link 450.

FIG. 5 shows cPHYs (514a/514b) handling two full duplex lanes, with a single EHF-XCVR in the EHF IC 506 and 526 of each device 502 and 522 respectively, for contactless data transfer over the link 550. It is also contemplated that the cPHYs 514a/514b could be replaced by a Standards-based PHY. It is also contemplated that device 502 could communicate with device 522 or with device 422.

Multiple data streams can be used to achieve higher bit rates for a contactless interface. This may be accomplished by the Host-cPHY or cLINK splitting a very high-speed data stream(s) into multiple data streams. In this manner, one high bandwidth data stream (for example, a single 24 Gb/s data stream) may be broken into many lower bandwidth streams of interfaces (for example, four 6 Gb/s streams), sent over the contactless link, and re-combined at the other end of the link. Each stream may be sent over the link via at a unique frequency by one or more transceivers.

Figure 5A:
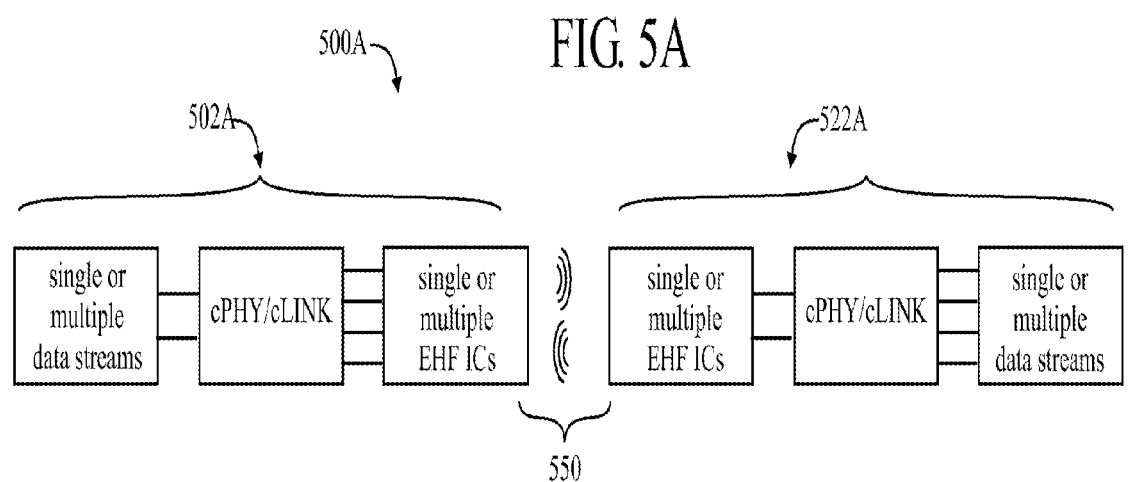

FIG. 5A shows a communications system 500A comprising two Gen II electronic devices 502A and 522A communicating over a contactless link 550 with one another. In the first device 502A, a single (or multiple) high-speed data stream (such as a 12 Gbps data stream) may be provided, such as by the host processor (not shown), and may be split by a Host-cPHY or cLINK into two or more contactless data streams that may be transmitted over the contactless link, using a single or multiple EHF ICs.

In a similar manner, the Host-cPHY or cLINK of the partner device 522A may combine multiple data streams that are received from one or more EHF ICs into a single (or multiple) high-speed data stream.

Figure 5B:
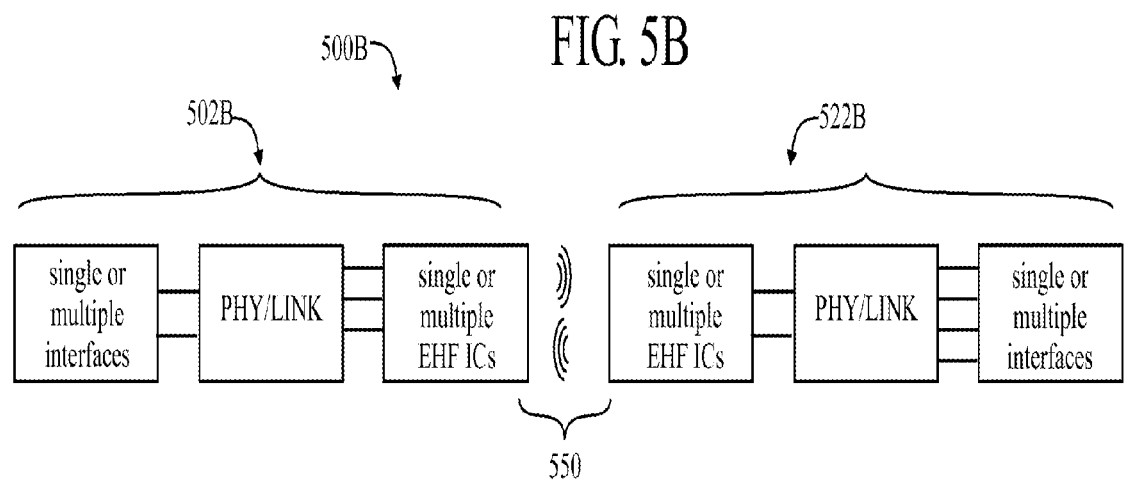
FIG. 5B is a diagram illustrating multiple streams of data passing over a EHF contactless communications link between two Gen I electronic devices.

FIG. 5B shows a communications system 500B comprising two Gen I electronic devices 502B and 522B, with Standards-based PHY and LINK, communicating over a contactless link 550 using multiple EHF data streams. Single or multiple EHF ICs and may have multiple Standards-based inputs and outputs (such as multiple PCIe, DisplayPort, USB lanes or any combination thereof). These inputs and outputs may be multiplexed onto a single EHF link or may be spread across multiple EHF links. By spreading the inputs and outputs across multiple EHF links, a very high bandwidth device can be realized. A single EHF device may be able to transmit and/or receive several (such as 4 or 8) from/to high-speed Standards-based interfaces.

FIG. 6 illustrates an exemplary implementation 600 of frequency spectrum multi-channel EHF contactless connection, such as may be utilized to implement the multiple data streams mentioned with respect to FIGS. 4 and 5. In the graph, the vertical axis 602 represents output power (of a given transmitter or transceiver), the horizontal axis 604 represents center frequency (f1, f2, f3, f4, f5, f6) for each of a plurality of data streams passing over an EHF contactless link (450, 550).

FIG. 6 shows different channels (f1, f2, f3, f4, f5, f6) spaced at 10 GHz intervals, from 30-80 GHz, but these channels could be narrower (<10 GHz), or they could be wider (>10 GHz), and they could span frequencies that are higher than 80 GHz. The various frequencies for the channels may be generated from a single or multiple oscillators. The channels may be spaced closer together or farther apart, and can be unevenly spaced over the range of usable frequencies. One of the frequencies may be designated as a "base" (or initial) frequency (such as 60 GHz) which is used during discovery and enumeration, after which communication may proceed on to the other frequencies, in any prescribed sequence. For example, starting with f1, if another frequency is to be used (for a second data stream), f3 may be selected, then for a third data stream, f5 may be utilized, then f2, then f4. In this manner, multiple lanes (channels) can be handled by each EHF IC chip.

Figure 7:
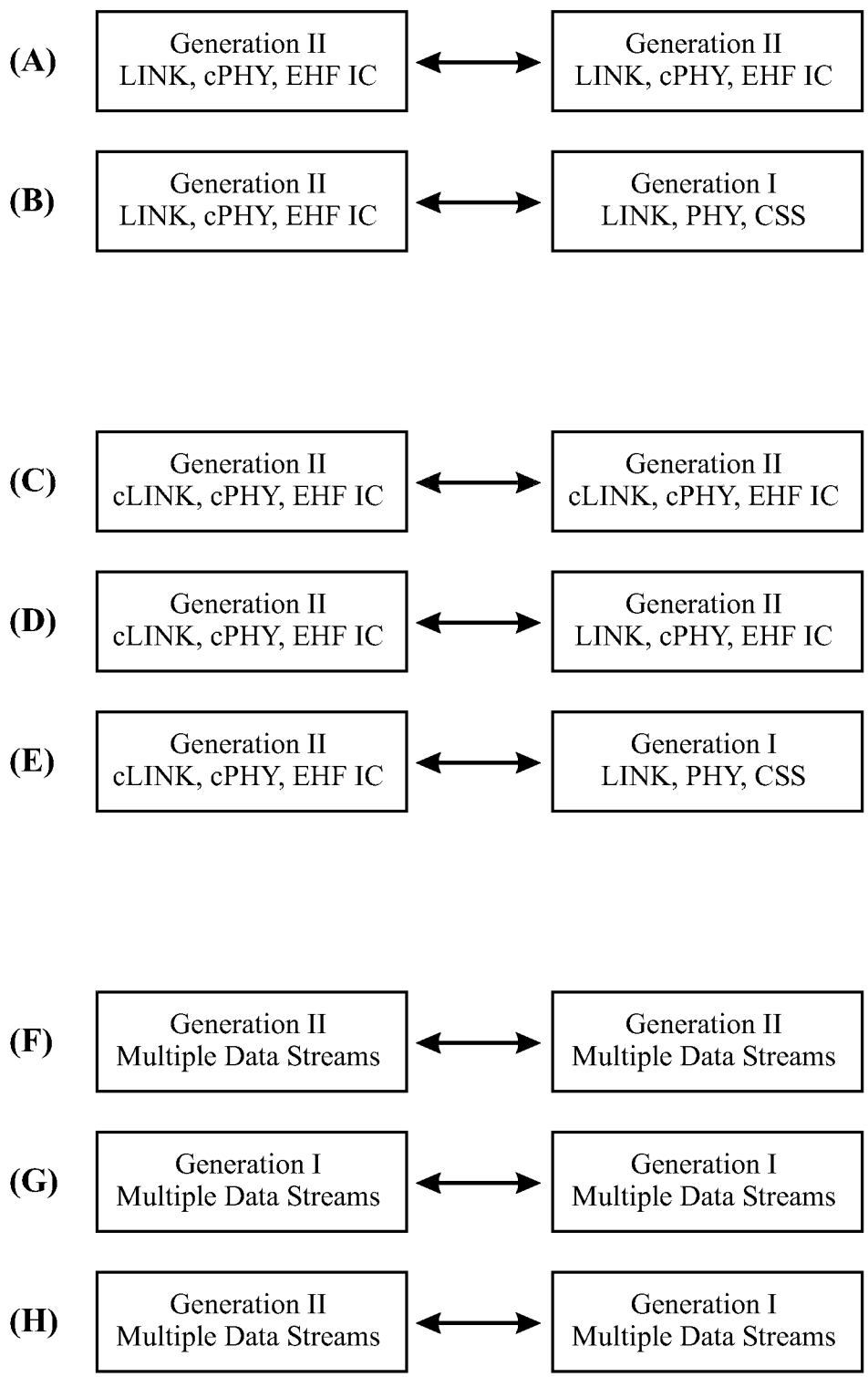
FIG. 7 shows various combinations (A-H) of Gen I and Gen II devices interacting with other Gen I and Gen II devices.

FIG. 7 illustrates some combinations (A)-(H) of electronic devices and communicating with each other over an EHF contactless link, summarizing some of the combinations described above, and presenting some additional combinations, as follows.

(A) a Gen II electronic device (shown on the left) having a Standards-based LINK, a Host-cPHY and an EHF IC, communicating over an EHF contactless link (shown in the middle) with another Gen II device (shown on the right) having a Standards-based LINK, a Host-cPHY and an EHF IC. (compare FIG. 2)

(B) a Gen II electronic device (shown on the left) having a Standards-based LINK, Host-cPHY and an EHF IC, communicating over an EHF contactless link (shown in the middle) with a Gen I electronic device (shown on the right) having a Standards-based LINK, a Standards-based PHY, and a EHF IC. (compare FIG. 3)

(C) a Gen II electronic device (shown on the left) having a cLINK, a Host-cPHY and an EHF IC, communicating over an EHF contactless link (shown in the middle) with another Gen II device (shown on the right) having a cLINK, a Host-cPHY and an EHF IC. (compare FIG. 2A)

(D) a Gen II electronic device (shown on the left) having a cLINK, a Host-cPHY and an EHF IC, communicating over an EHF contactless link (shown in the middle) with another Gen II device (shown on the right) having a Standards-based LINK, a Host-cPHY and an EHF IC.

(E) a Gen II electronic device (shown on the left) having a cLINK, a Host-cPHY and an EHF IC, communicating over an EHF contactless link (shown in the middle) with a Gen I electronic device (shown on the right) having a Standards-based LINK, a Standards-based PHY, and an EHF IC.

(F) a Gen II electronic device (shown on the left) communicating with multiple data streams over an EHF contactless link (shown in the middle) with a second Gen II electronic device (shown on the right) (compare FIGS. 4, 5).

(G) a Gen I electronic device (shown on the left) communicating with multiple data streams over an EHF contactless link (shown in the middle) with a second Gen I electronic device (shown on the right)

(H) a Gen II electronic device (shown on the left) communicating with multiple data streams over an EHF contactless link (shown in the middle) with a Gen I electronic device (shown on the right).

Some Additional Enabling Features of Gen II Devices

Gen II devices (some examples of which have been disclosed herein) may provide several additional enabling features, which may be incorporated into a system incorporating the devices, may include but not limited to the following:

Power Level Control:

Transmit power and receiver sensitivity may be controlled to minimize EMI effects and simplify FCC certification. RF energy output may be below FCC requirements for certification or for transmitting an identification (ID) code which would otherwise interrupt data flow during data transfers. Reference is made to 47 CFR §15.255 (Operation within the band 57-64 GHz).

Transmit power and receiver sensitivity may also be controlled based on the requirements of the system and/or the application. For example, a high power level may be used for transmitting (receiving) data at rates greater than 1 Gbps, while a low power level may be used for transmitting (receiving) data at data rates of less than 1 Gbps. Power level control may also be critical is when devices can have a wide range of distances between them (zero to 5 cm, for example), in which case the transmit power can be lower for shorter distances as compared to longer distances. Similarly, the receiver sensitivity can be adjusted depending on the distance (separation) between the devices. The power level control could be part of the negotiation phase when devices are exchanging information regarding device capabilities, or distance, and/or location.

Link Discovery:
The transceivers of the devices may be enabled to detect a link partner while dissipating minimal power. Link discovery may be implemented by one device periodically transmitting a beacon signal, and a partner device being enabled to periodically listen for the beacon.

Electrostatic Shielding:
Devices which are communicating contactlessly with one another may be enclosed in a non-conducting barrier (housing, enclosure, or the like, not shown), such as of plastic or acrylic. Electromagnetic (EM) radiation may pass easily through the barrier, but electrical current may not pass easily through the barrier.

Dielectric Coupler:
A dielectric coupler may be used to extend the range of the contactless link, and may include an elongate strip of dielectric material (medium) such as plastic, glass, rubber or ceramic, and may have a rectangular cross-section with two ends. Suitable plastic materials for the dielectric medium may include, but are not limited to, PE (polyethylene), acrylic, PVC (polyvinylchloride), ABS (Acrylonitrile-Butadiene-Styrene), and the like.

Securing Transmissions:
A communication device may employ contactless secure communication interface to transmit and receive data with a computing device using close proximity EHF communication. The communication device and the computing device may periodically initiate a "discovery" mode of operation, whereby the devices periodically transmit identifying information about their respective host devices and listen for identifying information from the other device. Upon completion of the discovery mode operation, the devices enter a link-training operation mode and exchange capability information about their respective devices. During transport mode operation, the communication device employs methods to manage access to data stored on the communication device by encrypting the information using one or a combination of training information or capability information as a basis for generating an encryption key.

A few techniques that can be employed to improve security of transmissions, in addition to the encryption provided by security protocols like HDCP (High-Bandwidth Digital Content Protection), may include (but are not limited to):

Data being conveyed over a contactless link between two devices can be secured (such as against "snooping") using "technical" approaches such as the sending device skipping transmission of a data stream at periodic intervals, and allowing the receiving device to transmit "skip fills" back to the sending device during the skipped periods. Transmissions may be shielded using "physical" approaches such as disposing dielectric, plastic or other passive materials as a "security coating" around at least a portion of the data path, so that signals passing through the security coating may become "muddled" by the composition or structure of the security coating, thereby making any signals received outside the security coating unintelligible.

Random data may be inserted together with main data, to obfuscate real data and frustrate snooping attempts.

Randomization may be applied to the main data.

Two or more data streams may be established, traversing the link in one direction. The data streams may be out-of-phase with one another so as to substantially cancel each other from the perspective of an unauthorized observer.

With two EHF-TXs, and with information about where the EHF-RX is (during link discovery), the two EHF-TXs can send a given signal in a manner, such as phase-shifted, to reinforce the signal strength at the known location of the receiver, and to commensurately decrease the signal strength at other locations, so as to frustrate snooping.

Some Additional Functionality

In addition to the Host-cPHY providing an interface designed to handle EHF contactless communications, and simplifying the EHF IC, the Host-cPHY enables the host system to perform many functions, including (but not limited to):

Monitoring and Managing the Connection (or Contactless Link):
  How much mechanical tolerance is present.
  If the connection is improving or degrading. The host can estimate the likelihood of connection failure or whether a connection failure is imminent.
  Time-of-flight, used to verify proper connection (security)
  Sophisticated power management algorithms
  Metering, quotas, speed/power scaling
  Multi-channel (carrier frequency) control
  Monitors to observe the connection state/status, the connection type, data being transmitted.

Managing Data Transfer:
  Prevention of data transfer of certain types of data (non-authorized DRM content, viruses, OS, firmware, etc.)
  Security, including key exchanges, encryption, and the like.
  Determination of the systems and devices that are connected (capabilities, source or destination for data, management of devices, device status, connection status, limitation on the amount of data transferred, etc.), tracking and logging of data being transferred, information on data being transferred, transcryption, transactional coding of data
  Digital watermarking, signature detection/stamping
  Steganography/obfuscation algorithms
  Connection-state (e.g. span) driven encryption
  Threat detection—link qualification (proper timing, loading)
  Built in authentication/encryption engines
  Circuitry to actively append or change data on the fly as it goes through the contactless connector
  Registers containing configuration, status, permissions, content permissions, keys for authentication/encryption Proximity Detection and Relative Positioning:
  object detection (proximity and position) yielding radar-like data, touch detection
  vibration detection (amplitude and frequency of the relative motion of the devices)

Application Support:
  Security applications (authentication, encryption, prevention of certain types of content being transferred)
  Content aware connection that can identify and direct applications
  providing application support based on the type of connection or the type of content
  the contactless connectors can manage data, performing many of these (or similar) functions without host interaction.
  performing host system wake up storing register settings associated with the type of connection or type of content being sent over the connection providing interrupts to the host system based on the presence of a contactless connection or specific qualities of the contactless connection opening/activating applications, returning status/power levels, connection parameters, data types, info on devices/systems that are connected, content info, amount of and type data being transferred, performing device configuration based on connection type, link management, quota information, and channel control An embedded microprocessor/microcontroller in the Host-cPHY may run a management OS for the connection. The Host-cPHY may take control of the system (or portions of the system) without host system's processor intervention.

Example Implementation for Host-cPHY:

In this section, some example implementations for Host-cPHY (or block) are presented. FIG. 8A shows a Host-cPHY block interfacing with a LINK in a host system and includes various possible functional blocks. The role of Host-cPHY in the host system is to reliably transmit and/or receive data to/from a partner host system through a contactless subsystem, for example the EHF IC.

Transmit Path:

The Host-cPHY 800 comprises a transmit path 811 that may have one or multiple transmit lanes. The transmit lanes of the Host-cPHY, represented as 816*a* . . . 816*n* (for lanes "a" to "n"; which may collectively be referred to as "816") are electrically coupled to the Host-cPHY-TXs 802*a* . . . 802*n* (which may collectively be referred to as "802"), respectively, for transmission of high-speed data. The Host-cPHY-TXs 802*a* . . . 802*n* are capable of electrically driving the external differential lanes through a differential switching mechanism that can be either voltage-mode or current-mode. The voltage swing of each transmit lane may be a function of several parameters including the termination impedance on the receiving device (not shown), the regulated voltage in the transmitter, and other process and voltage conditions. The Host-cPHY-TXs 802 may be capable of transmitting one or more of NRZ (non-return-to-zero) signals, multiple-level signals or signals that are based on certain coding schemes like Manchester coding. The Host-cPHY-TXs are coupled to the parallel-to-serial conversion blocks 803*a* . . . 803*n* (which may collectively be referred to as "803") that provide the high-speed data to be transmitted on the output lanes 816*a* . . . 816*n*. ESD (electrostatic discharge) protection may be obtained by having ESD relevant circuitry on the output nodes of 802 that connect to the output lanes 816.

Parallel-to-Serial Conversion:

The role of the parallel-to-serial (serialization) conversion blocks 803 is to serialize the slow-speed parallel data received from the LINK 820 through the various blocks including the scrambling/descrambling/encoding/decoding block 817 and may include the Host-cPHY-to-LINK translation layer 819. The serialization process enables transmission of high-speed data through a minimal number of output lanes 816, thus reducing the number of Host-cPHY-TXs 802 required in the Host-cPHY 800. In some implementations where serialization is not required, these blocks 803 may be completely bypassed (eliminated), for example, when the net data rate at the transmitter output 816 is <1 Gbps.

Receive Path:

The Host-cPHY 800 comprises a receiver path 812 that may have one or more receive lanes. The receiver lanes of the Host-cPHY, represented as 818*a* . . . 818*n* (for lanes "a" to "n" which may collectively be referred to as "818") are electrically coupled to the Host-cPHY-RXs 804*a* . . . 804*n* (which may collectively be referred to as "804"), respectively, for reception of high-speed data. The Host-cPHY-RXs 804 are capable of receiving and detecting one or more of NRZ signals, multi-level signals or signals that are based on certain coding schemes like Manchester coding. The receivers 804 are coupled to the serial-to-parallel conversion blocks 805*a* . . . 805*n* (which may collectively be referred to as "805") to which high-speed data received from the output lanes 818 is provided. The input devices of the receivers may be ESD protected by having ESD relevant circuitry on the input nodes of the receivers 804 that connect to the output lanes 818.

Serial-to-Parallel Conversion:

The serial-to-parallel conversion (deserialization) block converts serial data received from the Host-cPHY-RXs 804 into parallel data that is provided to the LINK 820. The parallel data may be manipulated in the scrambling/descrambling/encoding/decoding block 817 and/or the Host-cPHY-to-LINK translation layer 819. The deserialization enables providing data at a much reduced rate to the LINK such that the processing and/or packet manipulation could be done at a much reduced rate. In some implementations where deserialization is not required, this block is optional and may be completely bypassed, for example, when the net data rate at the receiver input 818 is <1 Gbps.

Low-Speed Lane:

The Host-cPHY 800 may also comprise a low-speed lane 809 that may transmit and/or receive data in a half-duplex method. This lane could be used, for example, for transmitting and receiving data or clock which is not at high-speed (for example, less than 500 Mbps) compared to the transmit and receive paths that are dedicated to transmitting and receiving high-speed data (for example, greater than 1 Gbps). In some implementations this lane could be used to transmit control/management data that may relate to protocol data being transmitted. For example, for DisplayPort, the low-speed lane could represent the AUX channel that transmits/receivers data in a half-duplex mode. The serial-to-parallel/parallel-to-serial conversion block 807 may perform the serialization/de-serialization function and in some implementations the serialization/de-serialization function is optional.

The Host-cPHY may also have its own clock generation block (not shown) for generating the data clock for the EHF contactless link. The clock may be used to generate a serialized data stream from a parallel data stream received from the LINK or cLINK. The clock may also be used to perform clock and data recovery from a received contactless serial data stream. Alternatively, clocking may be supplied from an external source to the Host-cPHY, which may include a reference clock from an external crystal unit.

The protocol control/management data path 810 represents an additional optional path that may be used to transfer protocol related data through standard I/Os (not shown). The EHF IC Link Manager 813 is the logic part of the Host-cPHY block 800 that may be directed by the LINK (or cLINK) 820 to perform control of the Host-cPHY block and also through its interface—EHF IC control/management data 824—may be used to control and manage the EHF IC (not shown). In some implementations, the beaconing, listening, polling activity of the EHF IC may be directed by the EHF IC Link Manager 813. The EHF IC Link Manager 813 may provide control of the Host-cPHY through the Host-cPHY Control Registers 814. For example, the Host-cPHY Control Registers 814 may contain settings that may define the pre-emphasis or equalization settings of the Host-cPHY-TXs 802 or Host-cPHY-RXs 804. In some implementations, the Host-cPHY Control Registers 814 may be directly accessed externally using a JTAG (Joint Test Action Group) or a I2C (Inter-Integrated Circuit) interface. The EHF IC Link Manager 813 may also receive directives from the LINK (or cLINK) for control and management of either the Host-cPHY or the EHF IC. Control and management directives may also be sent to the partner device's Host-cPHY or the EHF IC. An advantage of having the EHF IC control/management data path through 813 and 824 independent of the protocol control/management path is that the Host-cPHY and EHF IC can be made seamless to higher layers including the LINK. Training steps specific to the EHF IC may be contained within the scope of EHF IC control/management data, thus making data communication through the EHF IC seamless to the LINK and higher layers. The EHF IC control/management data path and the protocol control/management path may address specific requirements without conflicting with each other. In cases where there is a conflict, the protocol related control/management data could take precedence over the EHF IC control/management data.

The Host-cPHY, as a transmitter, may also perform additional functions such as scrambling and/or coding (for example, 8b/10b coding) for improved performance of the communications link. Improved performance may include quality metrics such as the bit error rate, signal transition density for better clock and data recovery, and EMI reduction. The Host-cPHY, as a receiver, may perform a de-scrambling and/or decoding function on scrambled and coded data transmitted by the partner Host-cPHY or PHY.

The Host-cPHY-to-LINK translation layer 819 may be used to interface the Host-cPHY to a LINK which may be a Standards-based LINK. The translation layer 819 performs the signal translation to a specific LINK, for example, a DisplayPort LINK or a HDMI LINK. By implementing translation layers for different LINKs, the complexity of the Host-cPHY and the LINK can be substantially reduced since the Host-cPHY design can be optimized for contactless communication, whereas the LINK has been designed for a particular Standard. The translation layer 819 provides a seamless interface between the two blocks. In some implementations where the Host-cPHY interfaces with the cLINK, the translation layer may not be implemented between the Host-cPHY and the LINK, instead, it could be implemented between the integrated version of Host-cPHY/cLINK and the higher layers which may include the LINK of a Standards-based protocol or other proprietary protocol.

Figure 8B:
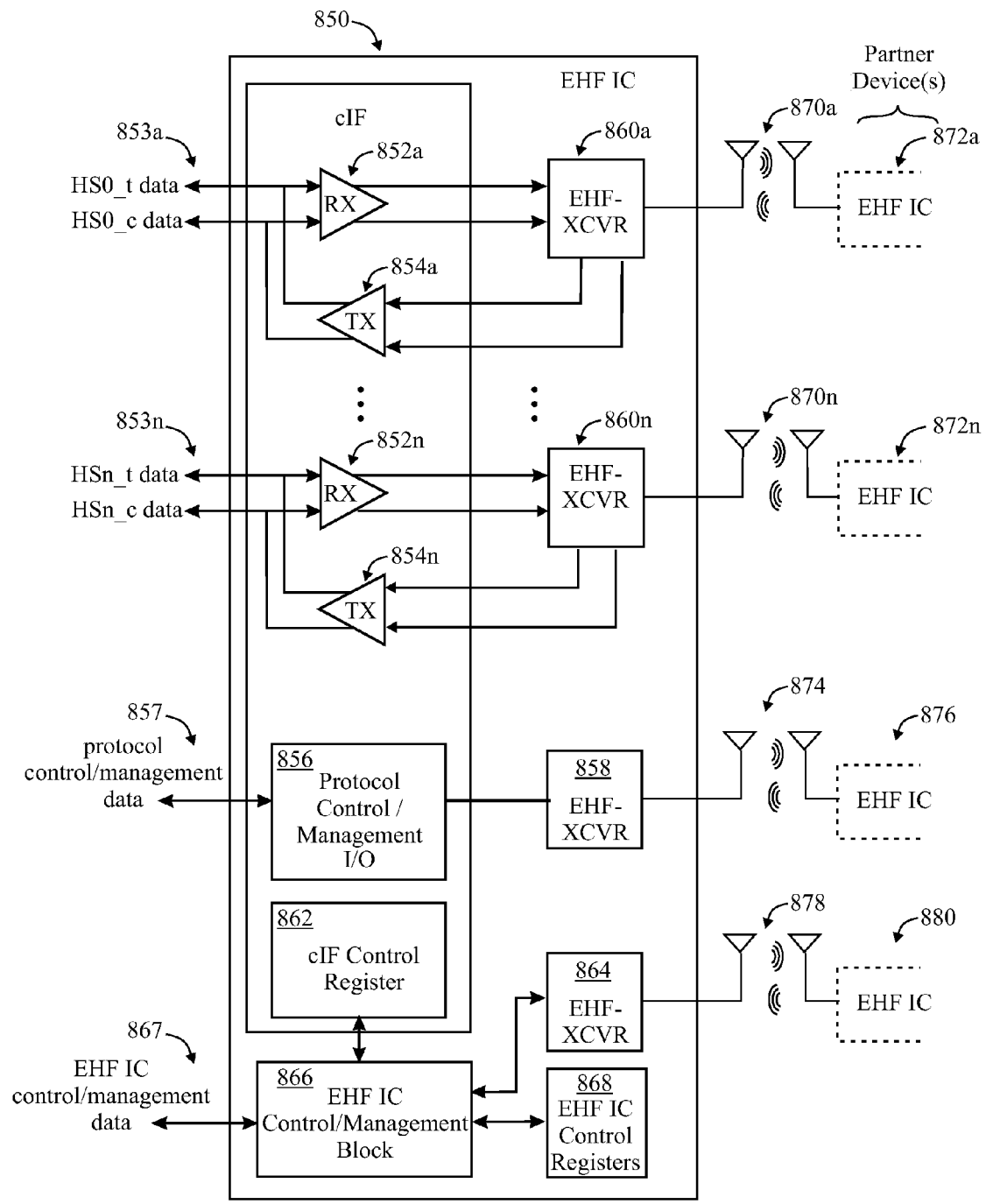
FIG. 8B is a diagram illustrating a EHF-cPHY in an exemplary EHF IC.

Example Implementation of the EHF IC:

The Host-cPHY 800 may interface with an EHF IC in an implementation of a contactless communication device. An example implementation of the EHF IC 850 is shown in FIG. 8B. The electrical interface 853*a* . . . 853*n* (which may collectively be referred to as "853") may interface with the high-speed interfaces 816, 818 of the Host-cPHY 800 (FIG. 8A). The EHF IC 850 may have a bidirectional interface at 853 with both EHF-cPHY-RXs 852*a* . . . 852*n* (which may collectively be referred to as "852") and EHF-cPHY-TX 854*a* . . . 854*n* (which may collectively be referred to as "854") I/Os. The transmitter and receiver function is defined with respect to the contactless interface(s) 870*a* . . . 870*n* (which may collectively be referred to as "870") in which data received from the Host-cPHY 800 through the EHF-cPHY-RXs 852 is transmitted over the contactless interface 870 by the EHF-XCVR 860*a* . . . 860*n* (which may collectively be referred to as "860") and the data received over the contactless interface by the EHF-XCVRs 860 is transmitted through the EHF-cPHY-TXs 854 to the Host-cPHY 800. The transceiver pairs 852/854 enable half-duplex transmission over the electrical interface 853. Based on whichever interface (either transmitter or receiver) of the Host-cPHY 800 is connected to each of the electrical interfaces 853, the EHF IC 850 may be programmed to operate either as a receiver or a transmitter. For example, if electrical interface 853*a* is coupled to the output 816*a* (as shown in FIG. 8A) of the Host-cPHY 800, then the EHF-cPHY-RX 852*a* may be enabled and the EHF-cPHY-TX 854*a* may be disabled for preventing any interference with the operation of the EHF-cPHY-RX 852*a*. As another example, if the electrical interface 853*n* is coupled to the input 818*n* (as shown in FIG. 8A) of the Host-cPHY 800, then the EHF-cPHY-TX 854*n* may be enabled and the EHF-cPHY-RX 852*n* may or may not be enabled The EHF-XCVRs 860 can operate in dual mode either receiving or transmitting carrier modulated signals in the EHF band over the contactless link 870. The protocol control/management data interface 857 may be coupled to either of the LINK (or cLINK) 820 (as shown in FIG. 8A) and the protocol control/management data line 822. This interface is coupled to the protocol control/management I/O 856 in the EHF IC 850, and data communicated on this line may be passed through/to the EHF-XCVR 858 for communication over the contactless link 874 to/from a partner EHF IC 876. The protocol control/management data may be Standards-based (for example, DisplayPort, HDMI, PCIe, USB). The EHF IC control/management data 867 interface may be used by the Host-cPHY 800 (as shown in FIG. 8A) in the host system to control and manage the EHF IC 850 through the EHF IC control/management block 866. The EHF IC control/management block 866 may include an I/O to receive and transmit data, and may also include logic to decode received data. The decoded data may contain control and management data that enable optimization of the EHF-XCVRs 860, 858, 864 for one or more parameters that may include power, speed, and modulation techniques. The control and management data may be programmed into the EHF IC Control Registers 868. The EHF IC Control Registers may also be programmed by an external interface such as a JTAG or I2C interface. The EHF IC control/management block 866 may communicate part of the control and management data either to the Host-cPHY 800 through the electrical communication path 867 or through the contactless link 878 to a partner EHF IC 880. This communication may be based in part on the control and management data. This ensures bidirectional communication of EHF IC control/management data for one or more of the EHF IC devices 850, 872, 876 and 880. It is contemplated that the EHF IC devices 872, 876, and 880 may comprise a single device or may be split into multiple devices.

An advantage of having a separate communication path for the EHF IC maintenance is that at least some of the operations of the EHF IC can be controlled independently of the protocol requirements of the LINK and higher layers, which may or may not be Standards-based.

Example Implementation of the cLINK:

In embodiments shown in FIGS. 2A, 2C, 2D, 2E and 2F, the cLINK provides functionality that may be directed specifically towards the Host-cPHYs and EHF ICs. The cLINK ensures a reliable communication path between the cLINK of one contactless device and the cLINK or LINK block of a partner contactless device. An example implementation of a cLINK in combination with the Host-cPHY and the LINK is shown in FIG. 8C. The cLINK 830 communicates with a LINK 820 that may be Standards-based. exchanging one or more of high-speed data represented as HS cLINK data 841, low-speed data represented as LS cLINK data 842, and protocol related data represented as cLINK protocol control/management data 843a. Throughout the various descriptions set forth herein, references to "data" may be construed to include the lines/signal paths over which the data is conveyed, as well as to the data itself, depending on the context. The HS cLINK data 841 may include stream data that may be either video data, audio data, memory write/read data, processor data. High speed data is communicated (transmitted and/or received) between LINK 820 and cLINK 830 as HS cLINK data 841. The high speed data may be processed by either the LINK and/or the cLINK. The high speed data is communicated (transmitted and/or received) between HOST-cPHY 840 and cLINK 830 as HS cPHY data 844. The Host-cPHY 840 and an EHF IC (not shown) communicate the high speed data as HS EHF IC data 848.

The LS cLINK data 842 may include data from a human interface device (HID), USB 1.0/1.1/2.0 and other isochronous streams. Low speed data is communicated (transmitted and/or received) between LINK 820 and cLINK 830 as LS cLINK data 842. The low speed data may be processed by either the LINK and/or the cLINK. The low speed data is communicated (transmitted and/or received) between HOST-cPHY 840 and cLINK 830 as LS cPHY data 845. The Host-cPHY 840 and the EHF IC communicate the high speed data as LS EHF IC data 849.

The cLINK Protocol Control/Management Data 843a may be related to the Standards-based protocol. For example, data corresponding to the AUX channel in DisplayPort may be categorized as protocol control/management data. Protocol control and management data is communicated (transmitted and/or received) between LINK 820 and cLINK 830 as cLINK Protocol Control/Management Data 843a. The protocol control and management data may be processed by either the LINK and/or the cLINK. The protocol control and management data is communicated (transmitted and/or received) between HOST-cPHY 840 and cLINK 830 as Protocol Control/Management Data 843b. The Host-cPHY 840 and an external interface communicate protocol control and management data as Protocol Control/Management Data 843c.

The cLINK 830 may provide additional functionality, in addition to the functionality provided by the LINK 820. Some of these functions may overlap and it is within the purview of system designers to decide on which functionality is integrated into the LINK or the cLINK. The cLINK can also be viewed as an extension of the logical sub-layer of the Host-cPHY (or PHY). Some of the functions of the cLINK 830 may include (but are not limited to) the following:

a. EHF encoding/decoding 831 function refers to an encoding/decoding scheme that would enhance the performance of the link between two contactless devices. The encoding/decoding scheme may include coding to ensure a certain number of transitions in the data, such as 8b/10b or 128b/130b. The function may include scrambling and de-scrambling of data.

b. FIFO 833 can buffer data passing through the cLINK when the system clock and the Host-cPHY clock may be offset in frequency or phase. The FIFO 833 can also be used as a buffer for flow control and/or traffic management.

c. The Framing/packet modification 832 function enables packets to either be appended to with or stripped of additional information (bits). When receiving packet/frame information from the LINK, the cLINK may modify the packet/frame to add more information to the packet/frame so that when this packet/frame is sent through the Host-cPHY over the contactless link the cLINK of the partner device may use the additional information for error correction, or may use the additional information to improve the performance of the link between the devices. These bits may include address information so that the packets/frames are forwarded to an intended EHF IC 850 (as shown in FIG. 8B) device. Packetizing and framing operation can provide additional advantages for contactless communication. For example, additional coding may be performed to increase the reliability of the data transferred over the contactless link. Additional information, such as attributes of the data may be inserted into the data stream when framing/packetizing is performed.

d. EHF state machine 834 block maintains the state machine information of the link that pertains to one or more of the following: the state of the Host-cPHY, the state of the interface to the EHF IC, the state of the EHF IC and the state of the contactless communication. The state machine may also include the state of the link in the partner device. The state machine information may include information about power (such as whether the link is enabled, disabled, or in low-power), data rate of the link, and link quality. In some implementations the state machine information may be communicated through the Contactless Control/Management Data interface 847.

e. Clock Translation 835 block coordinates the clock frequency required so that any data rate that changes as a result of packet modification or bit stuffing/stripping is reflected in the clock frequency that is either forwarded to the Host-cPHY 840 or the LINK 820. The Clock Translation block may aid frame/packet manipulation and the enables the capability of the cLINK to multiplex with isochronous streams.

f. EHF-related Encryption/Decryption 836 block is optional and may be used for enhancing the security of the EHF contactless communication link. A security cipher or code may be used to encrypt or decrypt data passing through the cLINK 830. In some implementations the encryption or decryption may be performed based on the device ID of the partner device. In some devices secure access is not needed and in these cases this functional block may be bypassed.

g. Data stream management 837 block may be implemented to manage multiple streams of data that may be received from one or more LINKs. An example of a management technique includes multiplexing multiple streams of data and providing a unique ID to each of these streams and then sending these streams over the EHF communication link. This block is also responsible for de-multiplexing streams received over the EHF communication link and, based on the stream ID, sending the corresponding stream(s) to the target LINKs. Other functionalities may include skew control of various logical or physical channels (including symbol or character synchronization), error discovery, error recovery based on redundant bits, and stream control in terms of data throughput.

h. cLINK Status Registers 839 include registers that store status information of the electrical interface between the Host-cPHY 840 and the EHF IC and the status of the contactless communication link between the EHF IC and a partner device. The cLINK status registers 839 may also include information regarding programmability or status of the cLINK, EHF IC and/or the Host-cPHY, and may share some of this information with the LINK, depending on a particular standard.

i. The Contactless Link Manager 838 block is responsible for overall flow and performance control of the Host-cPHY 840, the EHF IC, the communication link between the Host-cPHY 840 and the EHF IC, and the communication between the EHF IC and a partner contactless device. The Contactless Link Manager may also control several aspects of the Host-cPHY itself including controlling the electrical signal levels (and the number of levels). In some implementations the Contactless Link Manager may interpret the requirements of the protocol and perform appropriate functions. For example, in DisplayPort where the hot plug detect (HPD) status needs to be communicated to the LINK (which may be a DP LINK), the Contactless Link Manager 838 may manage the detection and communication of the HPD status to the LINK. The Contactless Link Manager 838 communicates Contactless Control/Management Data 847 to/from the Host-cPHY 840. Some of this communication may be used to set various parameters for the Host-cPHY (such as have been discussed herein) and the electrical communication with the EHF IC (not shown). Some portion of the Contactless Control/Management Data 847 may be sent/received to the EHF IC over a link that communicates EHF IC control/management data 846 that may set the various parameters (such as have been discussed herein) for the EHF IC and the EHF contactless communication.

Figure 8D:
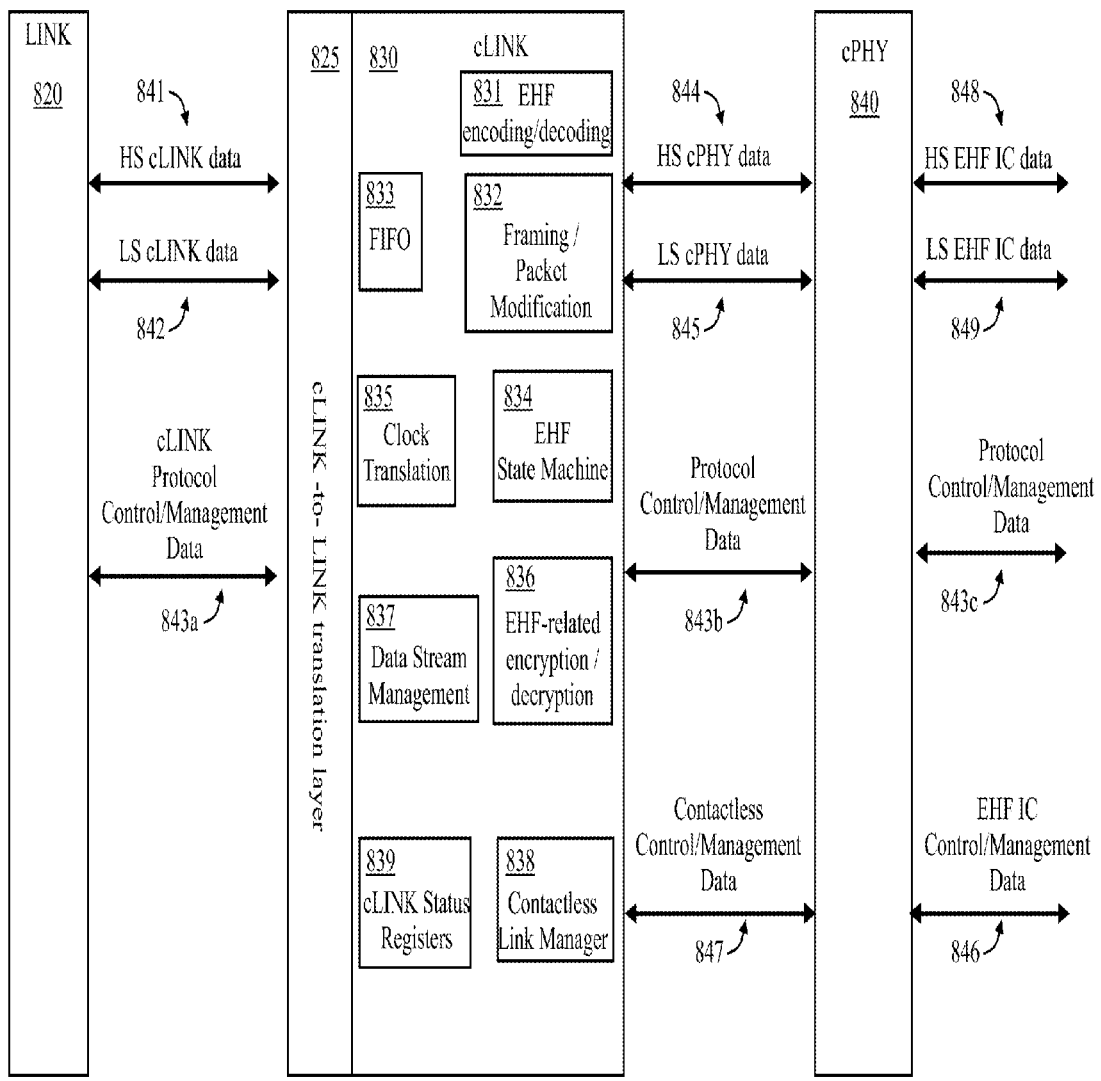
FIG. 8D, similar to FIG. 8C, is a diagram illustrating some details of a cLINK communicating and interacting with a Standards-based LINK, via a cLINK-to-LINK translation layer.

In some embodiments, the cLINK 830 may need to communicate with the LINK 820 in a prescribed format (as may be defined by the Standards-based protocols) which may require a translation of the data communicated between the cLINK 830 and the LINK 820. For example, the timing of the data may need to be made compatible across two different clock domains. FIG. 8D shows an embodiment in which a cLINK-to-LINK translation layer 825 provides the needed translation for transparent communication of LINK data across the electrical and contactless links. The functionality of the rest of the blocks may remain substantially the same. The translation layer may be different for various Standards-based LINKs thus enabling the use of multiple LINKs with the same Host-cPHY and/or cLINK.

VcPHY

It may be advantageous to have a universal physical interface to enable a host system to seamlessly communicate with another host system through an EHF contactless link. The host system may intend to communicate using any one (or more) of available Standards-based protocols or through a priority protocol optimized for EHF communication. However, each of these protocols would require a unique LINK and a unique PHY implementation that corresponds to the protocol's specifications. The burden of implementing a Standards-based protocol specification for an electrical interface to an EHF IC that in turn communicates with a partner EHF IC using electromagnetic signaling may impose undue constraints on both the design of the host system and the EHF IC itself. These constraints may include additional PHYs, pins, electrical signals, and die area. This issue is exacerbated if the host system has to communicate using more than one of the Standards-based protocols.

In general, a Standards-based LINK provides a virtualized PHY to higher layers. In some embodiments of the invention disclosed herein, a VcPHY may enable a host system above the LINK to transfer data streams without knowledge of the underlying contactless communication capability. The VcPHY may translate the Standards-based LINK specifications to a cLINK and Host-cPHY specifications to enable seamless and reliable transfer of data across the contactless link.

The LINK may be implemented in software, and typically handles the movement of data in and out across a PHY, or Host-cPHY. As will be described herein, some of the LINK or cLINK functionality may be moved to (incorporated in) the PHY layer or a modification thereof, such as the Host-cPHY or the VcPHY described herein.

Data and control blocks (or functions, such as measurement and control circuits) of the EHF IC may be split out from the EHF IC, and all or part of these data and control blocks may be integrated into the host system of the device.

FIG. 9 shows an embodiment 900 of the invention. A first device 902 may comprise a host system 904 and an EHF IC 906 capable of communicating over a contactless link 950 with another device 922 having a host system 924 an EHF IC 926. Insofar as shown, the two devices 902 and 922 may be mirror images of one another.

In this, and some of the other embodiments described herein, particularly those relating to a VcPHY, the illustrations and descriptions may be loosely based upon or may be considered to be extensions of any of the descriptions set forth above with respect to FIGS. 2 and 2A-2F. Therefore, some elements and relationships between elements may be described only briefly, or omitted in their entirety.

The host system 904 of the device 902 comprises a cLINK 915a that may be optimized for communication over the contactless link through a Host-cPHY 914. The Host-cPHY 914 may be optimized for communicating electrically with the EHF IC 906. The EHF IC 906 may be capable of communicating with the EHF IC of the partner device 922 over the contactless link 950. The host systems 904/924 may each have a microprocessor or microcontroller 916/936.

A LINK 917 is coupled to the cLINK 915a. The LINK 917 may be implemented per a Standards-based protocol specification.

The cLINK 915a and the Host-cPHY 914 together constitute what is referred to herein as a VcPHY 919/939 in the host system 904/924. The VcPHY may provide a seamless interface to the LINK 917/937 that may be substantially compliant with one or more of the Standards' specifications.

The LINK 917/937 may communicate with the VcPHY 919/939 as though the VcPHY is a PHY implementation from a corresponding Standards' specification. For example, if the LINK 917/937 is a DisplayPort LINK, then the LINK may interface with the VcPHY 919/939 using substantially a similar interface as it would to a DisplayPort PHY.

The LINKs 917/937 and cLINKs 915a/935a may incorporate independent training sessions. The LINKs 917/937 training may be directed towards the end-to-end (or between host systems 904/924) link and the cLINKs 915a/935a may direct their training towards the contactless link 950 through the EHF ICs 906/926.

Several attributes of the VcPHY may enable the LINKs of Standards to be interfaced to the VcPHY, thus "virtualizing" the PHY implementation in the host system to the Standards-based LINK and higher layers (layers above the LINK, also referred to as "upper" layers).

The terms "virtual", "virtualizing", "seamless" may be used interchangeably to highlight that parts of the system or device may not be affected by one or more of the other functional layers or blocks.

In general, for some embodiments of the invention, a cLINK 915a/935a within the VcPHY 919/939 may enable, control and provide various functionalities related to contactless links, including (but not limited to):

ensuring that an initial connection between contactless devices has been set up, including training of the link, dividing data output by the SERDES into data frames, handling acknowledgements from a Host-cPHY receiver that the data arrived successfully,
 ensuring that incoming data from a partner/companion device has been received successfully, such as by analyzing bit patterns within the frames.

The cLINK may also incorporate functions that are directed towards enabling the EHF IC to communicate data and control/management data with one or more of other EHF ICs. These functions may include one or more of the following: discovering, configuring and maintenance functions that are directed towards enabling and maintaining a contactless link across multiple EHF ICs. One or more functions including that of polling, beaconing, security verification functions may be implemented in the EHF IC. These functions may be directed towards the EHF IC's contactless communication with another EHF IC. The cLINKs may also incorporate functions that are directed to one or more of the electrical interface(s) between the host system and the EHF IC, and/or the EHF IC's contactless communication with another EHF IC. By substantially moving the LINK functions of both of these interfaces to a single cLINK in the VcPHY in the host system the complexity of the EHF IC can be substantially reduced, wherein the EHF IC can primarily include the analog functionality to enable EHF contactless communication. For example, any of the discovering, configuring and maintenance functions in the EHF IC may be moved to the cLINK. Therefore, the cLINK in the VcPHY can be used for discovering, configuring and maintenance functions directed towards either one or both of the electrical interface between the host system and the EHF IC, and between the EHF IC's contactless link with a partner EHF IC.

A device's software or application layers that communicate with the LINK may not be "aware" of the presence of a VcPHY that is inherently different from a Standards compliant PHY. For example, a device's software or application layers may not be aware of the EHF contactless link. Not being "aware" means that the functioning of the relevant layers or blocks in the higher layers may be independent of the underlying physical layer, which could refer to either the electrical interface (such as EHF-PHY or EHF-cPHY) between the Host-cPHY and the EHF IC, or the contactless link, or both. Moreover, since the VcPHY has some LINK (or cLINK) functionality incorporated therein, the function of the cLINK layer may be simplified, as contrasted with the "stand-alone" cLINK described (for example) with respect to FIG. 2. An advantage offered by implementing a Standards-based LINK (in contrast to having only a cLINK) is that the host system's upper layer(s) may need minimal or no update. This is possible since existing driver software in the OS Kernel and in the system (that has been designed for the LINK) can be reused for communication over the VcPHY and the EHF IC. This advantage facilitates adoption of Gen II contactless solutions into various systems without the need for making substantial changes in the protocol or software stacks of existing host systems. The LINK may be implemented or virtualized as a software layer and a number of virtualized LINKs may interface to one or more physical VcPHYs through a software interface.

Some Exemplary Implementations

Figure 10A:
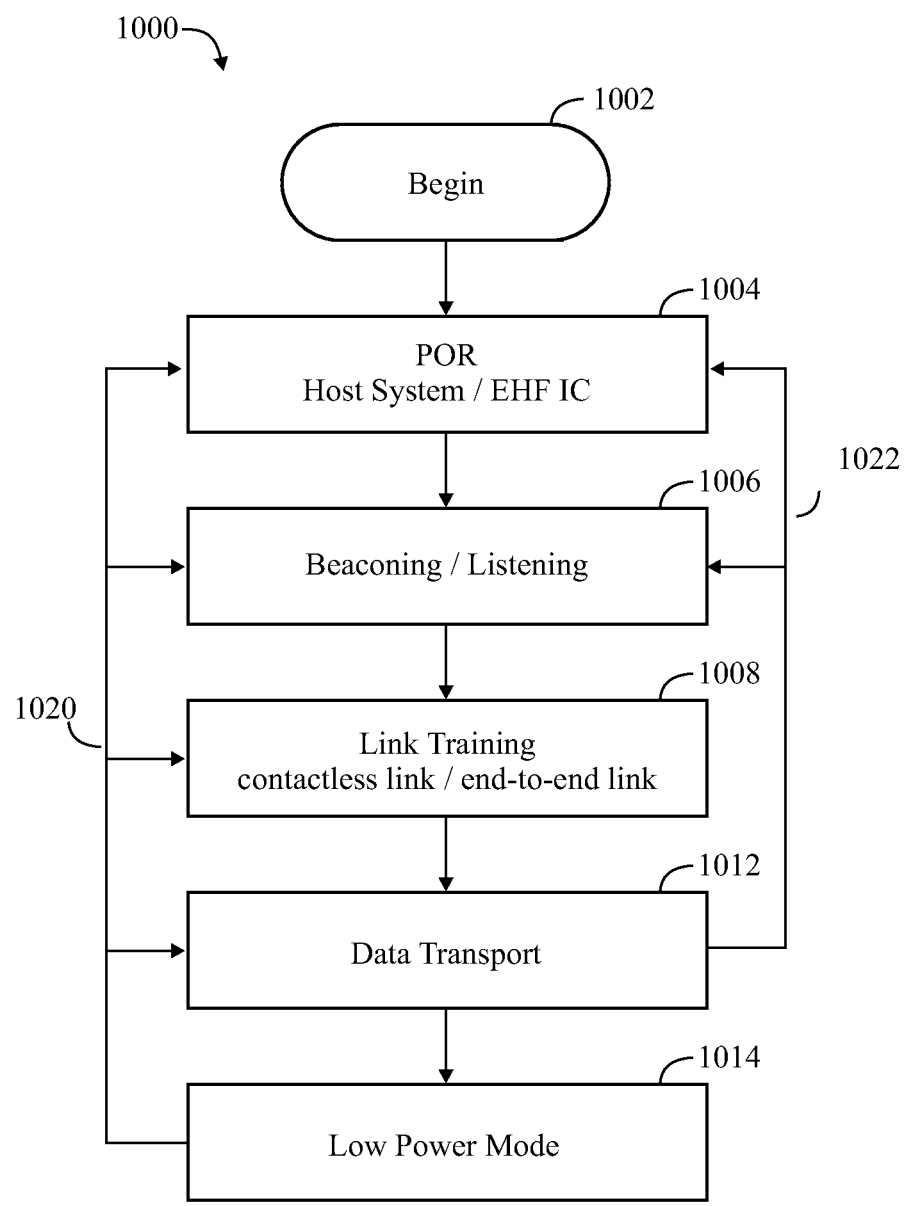
FIGS. 10A and 10B are flowcharts showing some techniques (methods) associated with communicating with devices having a VcPHY.

FIG. 10A illustrates an exemplary implementation 1000 which may be applicable to some embodiments of the invention, presented in a sequence of steps, in flowchart form. The sequence initiates ("Begin") at a step 1002. Unless expressly specified otherwise, some steps may be performed in an order other than the order in which they are described herein.

In a step 1004, the host system and the EHF IC follow a power-on-reset (POR) sequence after their respective supplies are powered up (crosses a certain threshold). The host system may initiate the POR sequence for the EHF IC. The POR function may also refer to the reset of signals within certain block(s) within the host system or the EHF IC, which may be performed sequentially or in parallel or a combination thereof. In some implementations, the POR sequence may be specifically directed towards part or whole of the VcPHY in the host system.

In a step 1006, after the POR sequence is completed, the EHF IC of a device ("initiating device") which is initiating a communications session, or the host system of the initiating device (through its EHF IC) initiates a beaconing/listening mode. In this mode, the EHF-TX (or transmitter portion of a EHF-XCVR) of the EHF IC sends beacon signals (for device detection), to be detected by another partner device in close proximity (approximately 0-5 cm) with the initiating device.

During the beaconing/listening mode, EHF-RX (or receiver portion of a EHF-XCVR) of the EHF IC may be in a listening mode, wherein it is capable of detecting beacon signals that are sent by the partner contactless device. In the beaconing/listening mode, the beaconing and listening operations may or may not be performed substantially simultaneously by the contactless device associated with the initiating EHF IC. The beaconing operation for an EHF IC may or may not overlap with its listening operation. After the initiating device has detected a partner device, the devices may enter a link-training mode.

It should be understood that one initiating device may detect and engage in a communication session with more than one partner device(s). It may also be possible for two partner devices to communicate with each other after the communications session has been initiated. In many of the diagrams presented herein, the initiating device is typically illustrated on the left-hand side of the figure, and the partner device(s) are typically illustrated on the right-hand side of the figures or are (in some cases) omitted.

Step 1008 comprises a link-training mode. There may be two aspects to the link training: (i) a first aspect relating to the contactless link, during which period is also referred to as "contactless link-training mode" and (ii) a second aspect relating to the end-to-end link, which refers to the link between the host system on one device to another host system in another device.

The end-to-end link may include the physical interface between the VcPHY and the EHF IC, and also the contactless link between the two devices. The first aspect of link training will be referred to as contactless link training (directed by the VcPHY block and executed by the EHF IC block), and the second aspect of link training will be referred to as end-to-end link training (which may be directed by the LINK and executed by the VcPHY). The VcPHY may direct the first aspect of link training (where the VcPHY may provide certain control and management signals to the EHF IC), to determine certain parameters of the EHF contactless link, which may include one or more of the power level of the EHF-TXs and/or EHF-RXs of the respective EHF ICs, the speed of the EHF link, security encryption code and other capabilities (which may include options for modulation schemes) or information about the contactless link. The VcPHY link training (first aspect of link training) may include configuring either or both the VcPHY and the EHF IC. This enables configuration of the parameters in the electrical link between the host system and the EHF IC which may include a one or more of pre-emphasis, signal swings, equalization, number of signal levels and/or a modulation scheme. This may be achieved by sending specific data patterns from the VcPHY to the EHF IC and then sent to a partner device through the contactless link that provides feedback (through the contactless link) on the signal integrity performance for different settings of the various parameters. The feedback information may be relayed to the VcPHY that may calibrate one or more parameters associated with the VcPHY and/or the EHF IC. In some implementations, some of these parameters are pre-programmed and the corresponding training mode can be bypassed. For example, the pre-emphasis or equalization settings may be pre-programmed since the channel information between the host system and the EHF IC may be known a priori, and therefore, the process of setting pre-emphasis or equalization settings may be partially or wholly bypassed. Once the VcPHY has completed its link training sequence, it may provide control signals to the LINK block of the completion of the VcPHY training, which in turn may initiate training of the end-to-end link.

The end-to-end link training mode may include the detection, configuration and maintenance of the overall link as per Standards-based protocol specifications. The end-to-end link training may be directed by the LINK (which may be Standards-based) to not only interpret the receive (partner) device capabilities but also to determine the channel throughput. The LINK may not be aware of the existence of the contactless link and/or the electrical interface between the VcPHY and the EHF IC. The VcPHY is therefore responsible for interpreting the directions of the LINK to optimize the channel performance and provide corresponding information back to the LINK. For example, the VcPHY, based on the data rate capabilities of the source and/or sink device (information that is typically stored in registers in the host systems), may determine the modulation scheme in the EHF IC, and provides a positive/negative acknowledgement to the LINK based on the capabilities determined from the contactless link-training mode. The LINK may not perform all the functions dictated by the LINK specification in a Standards-based specification. The Standards-based LINK and the associated training specifications are typically based on a specification that may be very stringent from an electrical signaling point-of-view. Since the cLINK and the physical interface between the host system and the EHF IC may be well controlled or have superior signaling performance, some of the training aspects of a Standards-based LINK layer may be bypassed during the end-to-end link-training mode.

In a step 1012, after link training is completed, the LINK (such as LINK 917/937 in FIG. 9) initiates the data transport mode, in which the LINK may handle the aspects of packetizing, framing of the transport stream as per a Standards-based protocol specification. In the data transport mode, the data stream is passed to/from the VcPHY layer, through the physical interface between the host system and the EHF IC and then through the contactless link. As indicated by the step 1012, once the device enters the data transport mode where the link control is handed off to the LINK and higher layers the LINK may still perform the detection, configuration and maintenance of the overall link as per Standards-based protocol specifications. The LINK may not perform all the functions performed by a LINK that is substantially in compliance with the Standards' specifications. In some examples, the LINK may bypass its own training period (part(s) of step 1008) and enables transition of the host system to a data transport mode (step 1012).

In the step 1012 (data transport), the transported data streams may include video data, audio data, data from human interfaces, processor and memory communication data. These data streams can be either synchronous, asynchronous or isochronous in nature. The LINK is still responsible for reliable delivery and reception of transport data packets across the link. The data transport mode may encompass functionalities from several layers in the open systems interconnections (OSI) model including the Transport Layer, the Network Layer and the application layers. For example, PCIe's Transaction Layer which is responsible for transmitting/receiving transaction packets across the link and interfaces with the LINK, encompasses functionalities from the Transport Layer and the Network Layer. The Transport Layer (not shown), in accordance with the corresponding a Standards-based protocol specification, packetizes/de-packetizes the data stream(s) and hands/receives to/from the LINK. The packets received/sent from/to the Transport Layer are further expanded/stripped in the LINK in a format that may bypass its own training period and begin to transmit/receive transport data packets, may be in accordance with the packetized structure as defined in the respective Standards-based protocol specifications.

The manner of exiting from the data transport mode (step 1012) may be dependent on the underlying protocols as defined in their respective Standards' specifications. For example, in the DisplayPort specification, there is a need to have a quick entry/exit into/from a data transport mode from a low power mode that could be defined to be a data transport idle state where only the blocks that can be powered up relatively quickly are powered off during the data transport idle state.

in the PCIe specification, several link states (L0, L1, L2, L3) are possible with each state having its own criteria for exit/entry and the associated latency to get into the L0 state (data transport mode) may depend on the present state.

Criteria for exit from the data transport mode (step 1012) and entry into a low power mode (step 1014) may be defined by the Standards' specifications or any other uniquely defined low power mode. The low power mode may encompass one or more states that are defined in the respective Standards' specifications.

Exiting the low power mode may be triggered by several possible events. For example, if the low power mode is based on the data transport idle mode, then if the data transport idle period extends for longer than a predetermined period of time or if a contactless link disconnection is detected the device can move back into POR mode (step 1004).

FIG. 10A illustrates that there are several possible ways for the device to enter or exit a particular mode (or state), including but not limited to the following.

As indicated by the line(s) 1020, the device may move from the low power mode (step 1014) to one of either the POR mode (step 1004), beaconing/listening mode (step 1006), link training mode (step 1008) or the data transport mode (step 1012). This may be initiated by a contactless link disconnection between two EHF IC devices.

As indicated by the line(s) 1022, the device may move from the data transport mode (step 1012) to either the beaconing/listening mode (step 1006) or the POR mode (step 1004). In an instance where the device is in the data transport mode (step 1012) and is transferring data streams, the EHF link may abruptly break, for example due to lack of proximity of the two EHF IC devices. In such a scenario, the device may go from the data transport mode (step 1012) to either the beaconing/listening mode (step 1006) or the POR mode (step 1004), depending on pre-configured settings in the device.

Several variations of the embodiment shown in the flow chart of FIG. 10A may be possible, including, but not limited to:

the LINK may also include its own discovery (detection), configuration and maintenance modes that may overlap with the link layer functionalities of the VcPHY and/or the EHF IC. For example, during the link-training mode the LINK may perform functions that may be similar to one or more of the functions performed during the contactless link-training mode.

the link training functionality of the VcPHY (performed during the contactless link-training mode) may be divided between the VcPHY and EHF IC.

Figure 10B:
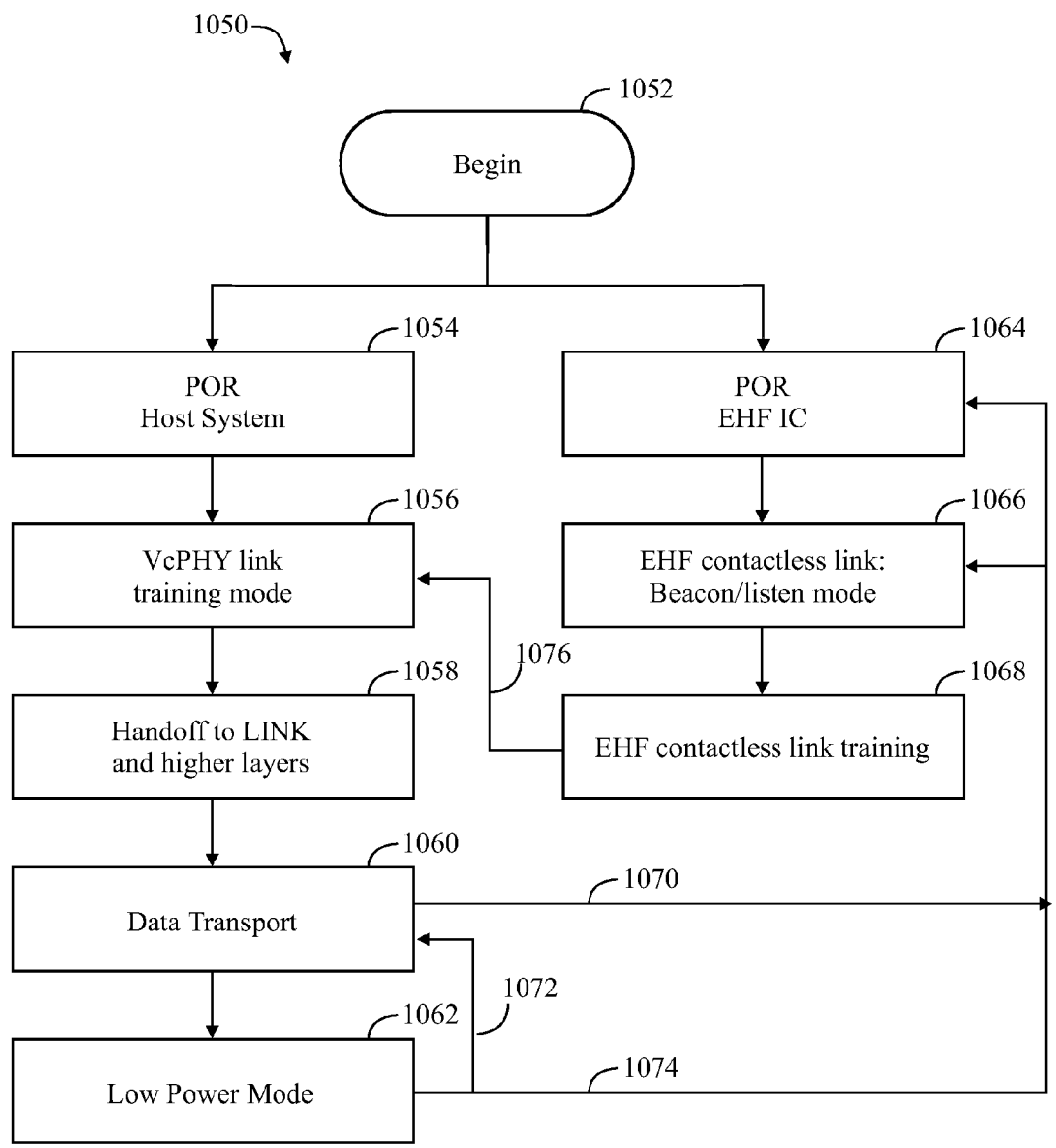

FIG. 10B is a flow chart 1050 that may be considered to be a modified version of the techniques shown and described with respect to the flowchart of FIG. 10A. The technique is presented in a sequence 1050 of steps, in flowchart form. The sequence initiates ("Begin") at a step 1052.

Unless expressly specified otherwise, some steps may be performed in an order other than the order in which they are described hereinbelow. In this embodiment, the EHF IC directs some of the link training functionality, which is in addition to the link training functionality provided by the VcPHY and LINK layers. Steps 1054 and 1064 represent powering up of and power-on-reset (POR) sequences being performed for the host system and the EHF IC, respectively.

In a step 1066, after the POR sequence is completed the EHF IC is in a beaconing/listening mode where beacon signals are sent out by the EHF-TX of the EHF IC, and are meant to be received by a close proximity partner device (approximately 0-5 cm). During the beaconing/listening mode, the EHF-RX of the EHF IC device is in listening mode when it is capable of detecting beacon signals that are sent by a partner EHF IC device. Meanwhile, the VcPHY may be performing its own link training (step 1056).

In a step 1068, once the two EHF IC devices have detected their presence, the devices now proceed to EHF contactless link training mode, in which certain parameters of the EHF contactless link are determined which may include the power level of the EHF-TXs and/or EHF-RXs of the respective EHF ICs, the speed of the EHF link, security encryption code, and other capabilities or information about the contactless link.

As indicated by the line 1076, once the EHF contactless link training is completed, based on the status of the VcPHY link training (during which the VcPHY directs training, as described above for FIG. 10A), overall control of the link may be handed over to the LINK and other higher layers. If the VcPHY has not completed its own training of the link (step 1056, which may be an optional step) the device may hold off transfer of control of the link to the LINK. During the VcPHY link-training period the VcPHY may configure the Host-cPHY of the VcPHY and/or the EHF-cPHY of the EHF IC. This enables optimization of the parameters in the electrical link between the host system and the EHF IC and the parameters may include one or more of pre-emphasis, signal swings, equalization, number of signal levels. Additional configurations with respect to power modes of the VcPHY or EHF IC may also be performed during this period.

As indicated by the step 1058, once the device enters the state where the link control is enabled for the LINK and higher layers, the LINK may still perform detection, configuration and maintenance of the overall link as per a Standards-based protocol specification. The LINK may not perform all the functions performed by a LINK layer that is substantially in compliance with the Standards-based protocol specification. In some examples, the LINK may bypass its own training period and may enable transition of the host system to a data transport mode (step 1060). The interaction between the LINK and the VcPHY may include some of the steps described in FIG. 10A wherein the VcPHY may be responsible for interpreting the training information of the LINK to optimize the channel performance (one or both of the electrical interface(s) and the contactless link) and provide corresponding feedback to the LINK. In some examples, the step 1058 may involve additional training, such as fine tuning, of the VcPHY's electrical interface and/or the contactless link.

In a step 1060 (data transport), once the VcPHY link training (1056) and EHF contactless link-training (1068) are completed, the layers above the LINK prepare and transmit/receive data streams through the LINK, VcPHY, and EHF IC. The data streams may include video data, audio data, data from human interfaces, processor and memory communication data. These data streams can be either synchronous, asynchronous or isochronous in nature. The LINK is still responsible for reliable delivery and reception of transport data packets across the link. The data transport mode may encompass functionalities from several layers in the Open Systems Interconnection (OSI) model including the Transport Layer, the Network Layer and the application layers. For example, PCIe's Transaction Layer which is responsible for transmitting/receiving transaction packets across the link and interfaces with the LINK, encompasses functionalities from the Transport Layer and the Network Layer. The Transport Layer (not shown) in accordance with the corresponding a Standards-based protocol specification packetizes/de-packetizes the data stream(s) and hands/receives to/from the LINK. The packets received/sent from/to the Transport Layer are further expanded/stripped in the LINK in a format that may be in accordance with the packetized structure as defined in the respective standards' specifications. The manner of exit from the data transport period is dependent on the underlying protocols as defined in the Standards-based protocol specifications. For example, in DisplayPort there is a requirement to have a quick entry/exit into/from a data transport mode from a low power state. The data transport idle state (also referred to as the low power mode) may support this by powering down functions which can be powered up relatively quickly.

As indicated by the line 1070, if the data transport idle mode is activated for more than a predetermined period of time the device may move back into EHF beacon/listen mode (step 1066) or the POR mode (step 1064), depending on system configuration. The device may also be able to exit the data transport period (or mode) and enter the EHF contactless link beacon/listen mode (step 1066) or the POR mode (step 1064) for various other reasons, such as the loss of the EHF link due to the lack of proximity of the two partner EHF IC devices. The LINK may also include its own discovery, configuration, and maintenance phases that may work in tandem with the link layer functionalities of the VcPHY and/or the EHF IC.

During data transport mode, if no data is sent or received for a predetermined amount of time, or if directed by the host system, the device (host system and EHF IC) may enter a low power mode (step 1062). There are a number of reasons why the host system may revert back to the data transport mode, as represented by line 1072, which may include (but are not limited to):

a. the host system begins a data transfer
b. the host system sends idle packets (such as low frequency periodic signaling (LFPS) in USB).
c. the host system detects that a partner device has initiated a data transfer or detects idle packets being sent by the partner device
d. the host system detects an event that enables data transport. For example, if the host system detects a power event (such as being attached to an external power source), the host system may instruct the EHF IC and VcPHY to enter into data transport mode.

Some Examples and Variations of Host Systems

In the host system, the VcPHY interfaces with the host systems' LINK that may substantially be compatible with a Standards-based protocol specification. The LINK may not use the discovering, configuring or maintenance functions for maintaining the link. The VcPHY may be capable of interfacing with multiple LINKs that may each be defined for a different Standard. A single VcPHY may be capable of interfacing with one or more of HDMI, DisplayPort, Thunderbolt, PCIe-based LINKs, based on configuration settings in the VcPHY.

To further simplify the complexity of the interface between the LINK and the VcPHY, part of the cLINK that interfaces with the LINK can be optimized for a specific LINK interface. The cLINK may be optimized for interfacing with the LINK of DisplayPort thus reducing the complexity of the cLINK layer when used in DisplayPort applications. Therefore, different versions of the cLINK can be implemented that can be used in a plug-and-play mode depending on the LINK protocol. An example embodiment is shown in FIG. 11. In this embodiment, part of the cLINK is dedicated to be compatible with a specific LINK interface which could be either HDMI, DisplayPort, PCI or USB. The cLINK pluggable parts that communicate with each of these LINKs are referred to as HDMI-cLINK, DisplayPort-cLINK, PCI-cLINK, USB-cLINK, respectively. Each of these pluggable cLINKs are designed to ensure that the rest of the cLINK (or VcPHY) may be substantially agnostic to the higher layer Standards-based protocols. In this embodiment, part of the cLINK is common to all the LINK interfaces and only the corresponding protocol-related module is modified in each individual cLINK to communicate with the respective Standards-based LINKs.

FIG. 9 illustrated a basic embodiment of a device having (i) a host system comprising a single LINK and a single VcPHY, the VcPHY comprising a single cLINK and a single Host-cPHY, and (ii) a single EHF IC. Some configurations of devices having (i) a host system comprising one or more of a plurality of LINKs and a plurality of VcPHYs, the VcPHYs comprising one or more of a plurality of cLINKs and a plurality of Host-cPHYs, and (ii) a plurality of EHF ICs will now be described, and may be illustrated in FIGS. 11-16.

As used herein, the term cLINK may also refer to a cLINK that is adapted for a Standards-based protocol. At least some portions of the cLINK may be implemented in software/firmware, thus enabling easier interfacing with the associated LINK, and at least some portion of the cLINK may be adapted for a LINK configured for a specific Standards-based protocol.

FIG. 11 (multiple LINKs, multiple VcPHYs) shows an embodiment 1100 of a device 1102 communicating over contactless links 1150A, 1150B, 1150C, 1150D (which may collectively be referred to as "1150") with a partner device 1122.

The device 1102 may comprise a host system 1104 and an EHF IC 1106. The EHF IC 1106 may comprise a plurality of EHF-XCVRs 1112*a*, 1112*b*, 1112*c* and 1112*d* (which may collectively be referred to as "1112"). Other details of the device 1102 (such as a microprocessor or microcontroller) are omitted, for illustrative clarity.

The device 1122 may be a mirror image of the device 1102, and may comprise a host system (not shown) and an EHF IC 1126 comprising a plurality of EHF-XCVRs 1132*a*, 1132*b*, 1132*c* and 1132*d*, other details of the device 1122 (such as VcPHYs, LINKs and microprocessor or microcontroller) being omitted, for illustrative clarity. There may be a single EHF IC 1126 with one or more EHF-XCVRs (four shown), as illustrated. Alternatively, there may be multiple EHF ICs each with its own one or more EHF-XCVRs.

The host system 1104 may comprise a plurality of Standards-based LINKs including, for example (but not limited to), an HDMI Link layer 1117*a*, a PCIe Link layer 1117*b*, a DP Link layer 1117*c* and a USB Link layer 1117*d*.

The host system 1104 may comprise a plurality of VcPHYs (collectively referred to as "1119") including, but not limited to, a first VcPHY 1119*a* comprising a Host-cPHY 1114*a* and a HDMI cLINK 1115*a* arranged for handling data received/transmitted from/to the HDMI LINK 1117*a* and communicating via a first EHF-XCVR 1112*a* in the EHF IC 1106.

a second VcPHY 1119*b* comprising a Host-cPHY 1114*b* and a PCIe cLINK 1115*b* arranged for handling data received received/transmitted from/to the PCIe LINK 1117*b* and communicating via a second EHF-XCVR 1112*b* in the EHF IC 1106.

a third VcPHY 1119*c* comprising a Host-cPHY 1114*c* and a DP cLINK 1115*c* arranged for handling data received/transmitted from/to the DP LINK 1117*c* and communicating via a third EHF-XCVR 1112*c* in the EHF IC 1106.

a fourth VcPHY 1119*d* comprising a Host-cPHY 1114*d* and a USB cLINK 1115*d* arranged for handling data received/transmitted from/to the USB LINK 1117*d* and communicating via a fourth EHF-XCVR 1112*d* in the EHF IC 1106.

The VcPHYs 1119 may communicate with respective EHF-XCVRs 1112 that may be inside one EHF IC or multiple EHF ICs, each of which may have a single EHF-XCVR pair or multiple EHF-XCVR pairs. In some implementations, the EHF IC's EHF-TXs and EHF-RXs may not be arranged in pairs but as individual elements. For example, if a lane is dedicated to HDMI then the EHF IC may have four individual EHF-TXs for transmitting HDMI data stream and one EHF-XCVR pair for HDMI control/management communication.

There may be a 1:1 relationship between the LINKs and the VcPHYs. There may similarly be a 1:1 relationship between the VcPHYs and the EHF-XCVRs (each EHF-XCVR shown may represent more than one EHF-XCVR, or separate EHF-TX and EHF-RX).

The concept of virtualizing the cLINK and Host-cPHY blocks as a single layer, the VcPHY, enables a simplified approach to designing a wide range of complex systems. This is possible since the VcPHY functionally may isolate the host system from either one or both of the electrical interface between the host system and the EHF IC and the contactless communication of the EHF IC with a partner EHF IC device. The host system of a first device can therefore communicate with the host system of another device without consideration for the underlying protocols or electrical specifications of the VcPHY layer and the EHF IC. Each of the VcPHYs (1119) is operative to communicate with one or more of the EHF ICs.

One or more of the multiple pairs of LINK (1117) and VcPHY (1119) may be implemented on discrete devices. Similarly, each of the plurality of EHF-XCVRs 1112a, 1112b, 1112c, and 1112d may be implemented as discrete EHF ICs.

Figure 12:
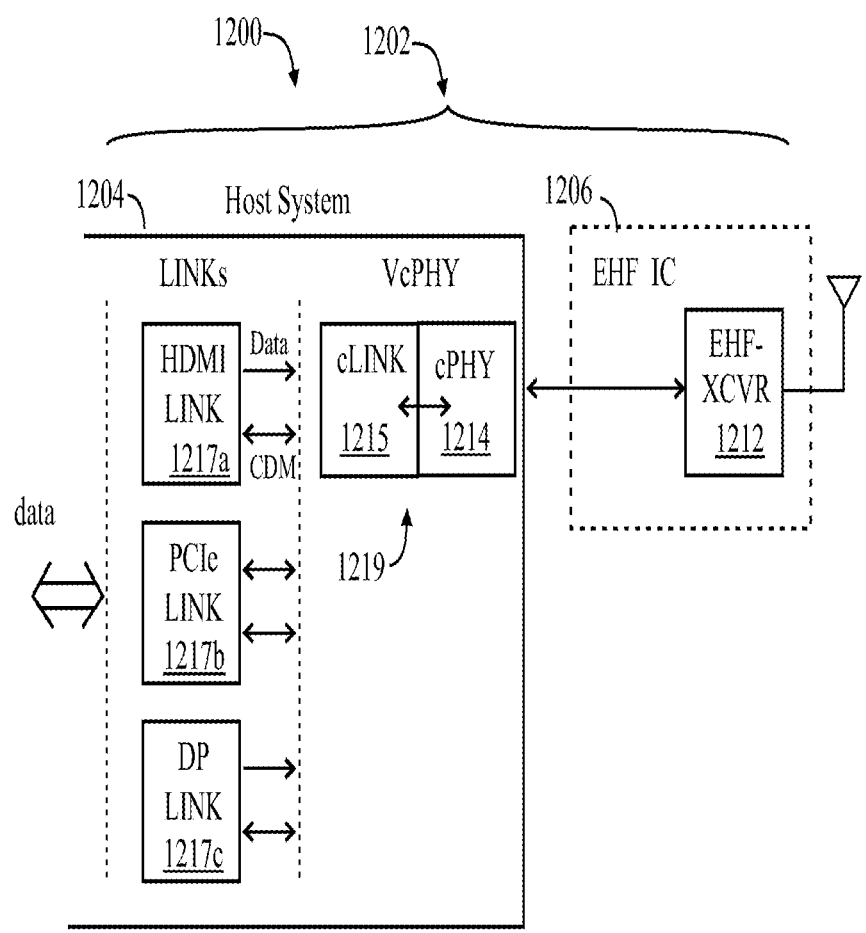
FIG. 12 is a diagram illustrating a device having a host system with a single VcPHY interacting with multiple Standards-based LINKs.

FIG. 12 (multiple LINKs, single VcPHY) shows an embodiment 1200 of a device 1202 suitable for communicating over a contactless link with a partner device (not shown). The contactless link and partner device are omitted, for illustrative clarity.

The device 1202 may comprise a host system 1204 and an EHF IC 1206. The EHF IC 1206 may comprise a single EHF-XCVR 1212, as shown, or multiple EHF-XCVRs, or one or more each of EHF-TX and EHF-RX. Other details of the device 1202 (such as a microprocessor or microcontroller) are omitted, for illustrative clarity.

The host system 1204 may comprise a plurality of Standards-based LINKs (collectively referred to as "1217") including, for example, an HDMI LINK 1217a, a PCIe LINK 1217b, and a DP LINK 1217c.

The host system 1204 may comprise a single VcPHY 1219 which may comprise a Host-cPHY 1214 and a cLINK 1215. All three LINKs 1217 may be coupled to the single VcPHY 1219, but only one of the LINKs (1217a, 1217b or 1217c) communicates with (is "selectively connected" to) the VcPHY at a given time. The host system 1204 can use any one of the Standards-based protocols, at any given time, to communicate with another host system (of another device) through the VcPHY 1219. The VcPHY 1219 is coupled to (communicates electrically with) the EHF IC 1206, which in turn is capable of communicating with the EHF IC of another device (not shown) through a contactless link (not shown). The host system 1204 may be substantially unaware of or agnostic to the underlying PHY interface or the EHF IC or the contactless link. The host system activates one of the LINKs, the HDMI LINK, PCIe LINK, or DP LINK, which may be based on the capabilities of a partner device in contactless communication with the host system 1204. For example, if the partner device intends to establish a PCIe link with the host system 1204 the cLINK 1215 in association with the PCIe LINK 1217b would enable a single link communication without involving HDMI LINK 1217a or DP LINK 1217c. Similarly, other protocol communications could be established based on the proximity device and the capabilities of the respective host systems.

In some embodiments, all three LINKs may communicate through the contactless link simultaneously through a single VcPHY. The VcPHY may multiplex the data streams from each of the LINKs into single or multiple data streams and then communicate this data stream(s) contactlessly with a partner device through one or more EHF ICs.

Figure 13:
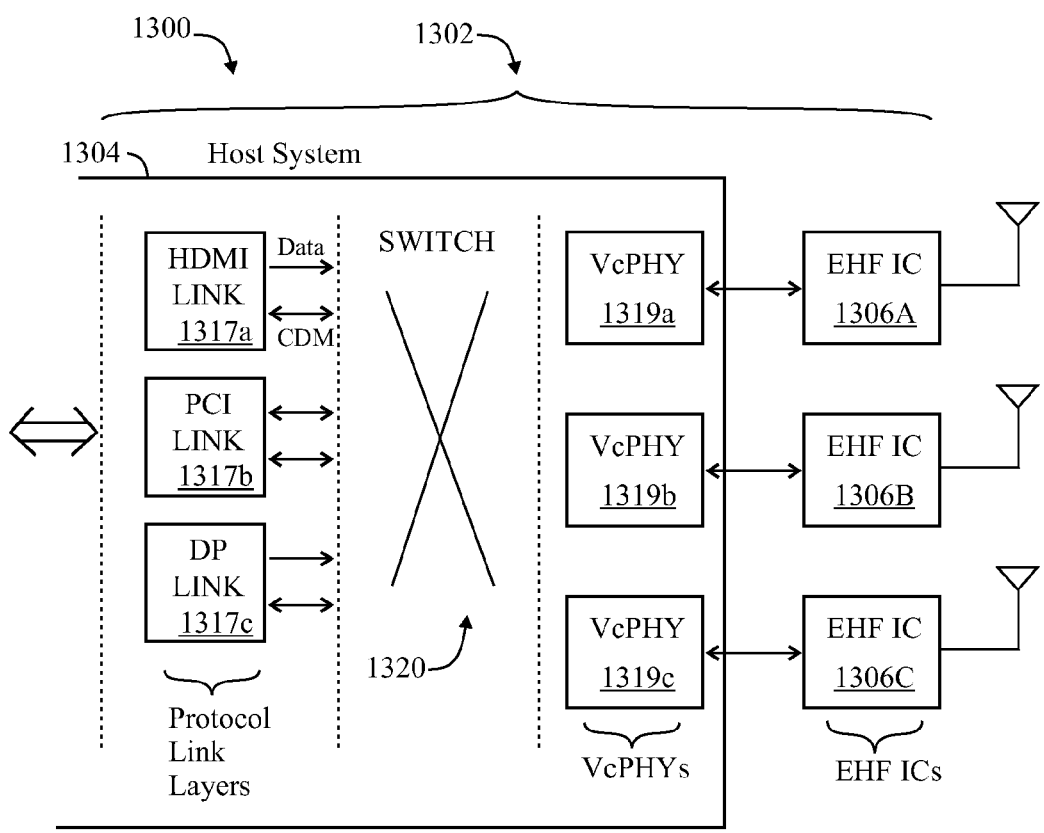
FIG. 13 is a diagram illustrating a device having a host system with multiple VcPHYs interacting with multiple Standards-based LINKs, via a switch.

FIG. 13 (multiple LINKs, multiple VcPHYs) illustrates an embodiment 1300 of a device 1302 suitable for communicating over a contactless link with a partner device (not shown). The contactless link and partner device are omitted, for illustrative clarity.

The device 1302 may comprise a host system 1304 and multiple EHF ICs 1306A, 1306B and 1306C (collectively referred to as "1306"). Each of the EHF ICs 1306 may comprise a single EHF-XCVR (not shown), or multiple EHF-XCVRs. Other details of the device 1302 (such as a microprocessor or microcontroller) are omitted, for illustrative clarity The host system 1304 may comprise a plurality of VcPHYs (collectively referred to as "1319") and a plurality of Standards-based LINKs (collectively referred to as "1317"), and a switch 1320, and may be arranged as follows.

- a first VcPHY 1319a (which may comprise a Host-cPHY and a cLINK, not shown) may be arranged for handling data received from any of the LINKs 1317, via the switch 1320, and communicating over a contactless link (not shown) via the EHF IC 1306A.
- a second VcPHY 1319b (which may comprise a Host-cPHY and a cLINK, not shown) may be arranged for handling data received from any of the LINKs 1317, via the switch 1320, and communicating over a contactless link (not shown) via the EHF IC 1306B.
- a third VcPHY 1319c (which may comprise a Host-cPHY and a cLINK, not shown) may be arranged for handling data received from any of the LINKs 1317, via the switch 1320, and communicating over a contactless link (not shown) via the EHF IC 1306C.
- additional Standards-based links (not shown, such as USB) may be connected (coupled), via the switch 1320, to any of the VcPHYs 1319.

In this embodiment, the host system 1304 couples given ones of the LINKs 1317 to the selected ones of the VcPHYs 1319 through the switch 1320 which may be configured by the host system through firmware, software or hardware control, and the connection matrix is dependent on the partner device(s) that intend to communicate with the host system. For example, if the partner device intends to establish a PCIe link with the host system 1304 through the EHF IC 1306B, the host system 1304 configures the switch 1320 such that the VcPHY 1319b communicates with PCIe LINK 1317b thus enabling a PCIe link between a host system and a counter part device. Multiple devices can simultaneously be connected to the host system through the EHF IC 1306. In an application, a first partner EHF IC (or device) may establish a PCIe link through EHF IC 1306B, a second partner EHF IC (or device) may establish a DP link through EHF IC 1306A, and a third partner EHF IC (or device) may establish a HDMI link through EHF IC 1306c. The switch is configured by the host system such that the corresponding VcPHY and EHF IC pairs communicate with the appropriate LINKs. To enable this the cLINK in each of the VcPHYs may provide information about the partner communication protocol to the host system such that the switch is appropriately configured.

The switch 1320, which may be implemented either in hardware or software, may be operative to route traffic (data streams) between multiple LINKs and multiple VcPHYs without functionally modifying the stream data or the control/management data. In some applications, the switch 1320 acts as a "dumb" routing element that, based on the configuration settings, provides communication channel(s)

between the Standards-based LINKs 1317 and the VcPHYs 1319. The number of LINKs 1317 and the number of VcPHYs 1319 may be, but need not be the same as one another. For example, the switch 1320 may be operative to route traffic (data streams) between multiple LINKs and a single VcPHY without functionally modifying the stream data or the control/management data.

Multiple Devices

In the examples set forth above, typically, a host system of a given device, which may be considered to be an "originating" device (which may be referred to as "x02", where "x" may be the figure number), is shown or discussed communicating with a single "partner" device (which may be referred to as "x22").

A host system (of a given, or "originating") device may communicate with the host systems of multiple partner devices coupled through a contactless link. Some of these partner devices may include display systems, peripherals and/or computing systems, for example. It should be understood that any of the devices (originating, partner) discussed herein may simply comprise a host system and an EHF IC, without displays and the like, such as may be typical of host systems in a networked environment.

Figure 14:
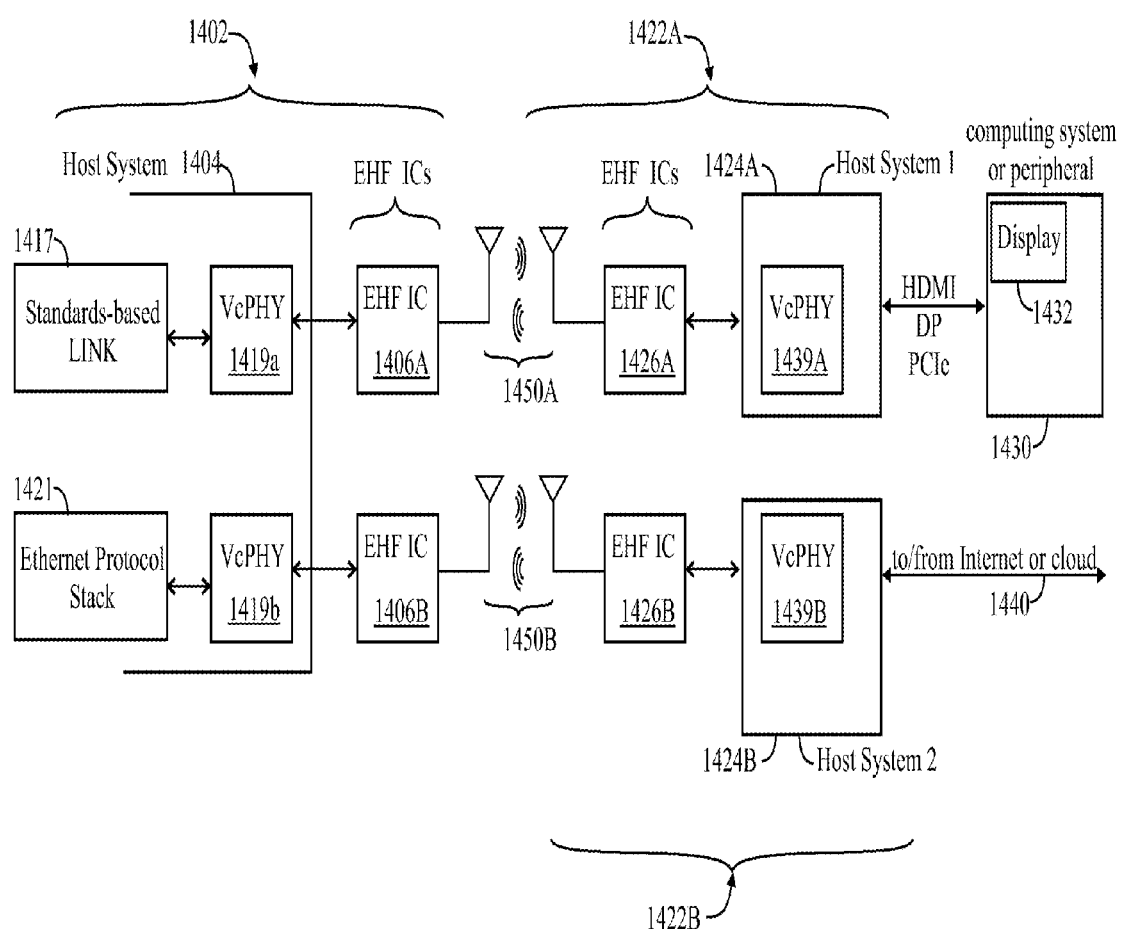
FIG. 14 is a diagram illustrating a device having a host system with a VcPHY interacting with one or more Standards-based LINKs and a VcPHY for interacting with an Ethernet Protocol Stack communicating with two other devices enabled for contactless communication.

FIG. 14 shows an embodiment 1400 of a device 1402 communicating over two contactless links 1450A and 1450B (which may collectively be referred to as "1450") with two partner devices 1422A and 1422B (which may collectively be referred to as "1422"). One or more of the partner devices 1422 may simply comprise a host system and an EHF IC.

The device 1402 may comprise a host system 1404 and multiple EHF ICs 1406A, 1406B (collectively referred to as "1406"). Each of the EHF ICs 1406 may comprise a single EHF-XCVR (not shown). Other details of the device 1402 (such as a microprocessor or microcontroller) are omitted, for illustrative clarity.

The host system 1404 may comprise a plurality (two shown) of VcPHYs (collectively referred to as "1419") including, but not limited to,
- a first VcPHY 1419a (comprising a Host-cPHY and a cLINK) arranged for handling data received/transmitted from/to one or more Standards-based LINKs either directly or via a switch.
- a second VcPHY 1419b (comprising a Host-cPHY and a cLINK) arranged for handling data received/transmitted from/to an Ethernet protocol stack 1421 either directly or via a switch.
- only two VcPHYs 1419 are shown, for illustrative clarity Two partner devices 1422A and 1422B are shown, each having an EHF IC 1426A and 1426B comprising one or more EHF-XCVRs (not shown) and a host system 1424A and 1424B, respectively. The host systems 1424A and 1424B may each comprise one or more VcPHYs 1439A and 1439B, respectively. Other details of the devices 1422A/1422B (such as a microprocessor or microcontroller) are omitted, for illustrative clarity.

As illustrated by the figure, a single host system 1404 can communicate with multiple devices 1422A, 1422B through multiple VcPHYs and multiple EHF ICs, each of these having a data stream that is based on a unique protocol, such as (but not limited to) Ethernet, HDMI, PCI, DisplayPort. The device 1422A is shown connected with a computing system or peripheral device 1430 which may include a Display 1432. Communication between the host system 1424A and the peripheral device 1430 may be over a Standards-based link. The device 1422B is shown with a connection 1440 to the Internet or the Cloud. This may be achieved through a wired Ethernet link or through a wireless link, such as WiFi or LTE.

The host system 1404 may enable communication of at least one of display stream and Ethernet protocol data. The Ethernet protocol data may be transferred to/from the Internet or the Cloud. Stream data transferred from the host system 1404 through the contactless link (1450) through one or more of the EHF ICs (1406, 1426) may be transferred to/from a device that has a wired connection to one or more of the display, computing or peripheral devices.

As used herein, the term "Internet" (and its variants) may refer to a global system of interconnected computer networks that use the standard Internet protocol suite (TCP/IP) to serve several billion users worldwide. It is a network of networks that consists of millions of private, public, academic, business, and government networks, of local to global scope, that are linked by a broad array of electronic, wireless and optical networking technologies. The Internet carries an extensive range of information resources and services, such as the inter-linked hypertext documents of the World Wide Web (WWW), the infrastructure to support email, and peer-to-peer networks. A multitude of other services are implemented over the Internet, including email, file transfer, remote computer control, newsgroups, and online games. All of these services can be implemented on any intranet, accessible to network users.

As used herein, the term "Cloud" (and its variants, such as "cloud computing") may refer to a variety of computing concepts that involve a large number of computers connected through a real-time communication network such as the Internet. Cloud computing is a synonym for distributed computing over a network, and means the ability to run a program or application on many connected computers at the same time. The phrase also more commonly refers to network-based services, which appear to be provided by real server hardware, and are in fact served up by virtual hardware, simulated by software running on one or more real machines. Such virtual servers do not physically exist and can therefore be moved around and scaled up or down on the fly without affecting the end user.

Some Additional Variations (Use Scenarios)

Many of the descriptions set forth above have focused on implementations of the Host-cPHY and VcPHY, as applicable to an "initiating" device (x02). In the following examples, the description may be directed more to particulars of one or more partner devices (x22).

In enterprise (such as large server type) applications, the contactless data transfer can be leveraged to dramatically simplify the complexity and improve the reliability and performance of the switch fabric. The links in these applications need to transmit at multi-Gbps data rates with very low error rates over a physical media that is wired with multiple boards and connectors embedded to these boards. The non-idealities introduced by these physical connections dramatically reduce the reliability and increase the power dissipation of these links. By having a substantial part of these links to communicate through the contactless link, including possibly using plastic waveguides for connecting over long distances the above issues can be dramatically mitigated.

As used herein, the term "switch fabric" may refer to switch an interconnect architecture used by a switching device, which redirects data coming in on one of its ports out to another of its ports. The switch fabric may be implemented in accordance with Ethernet protocols.

Figure 15:
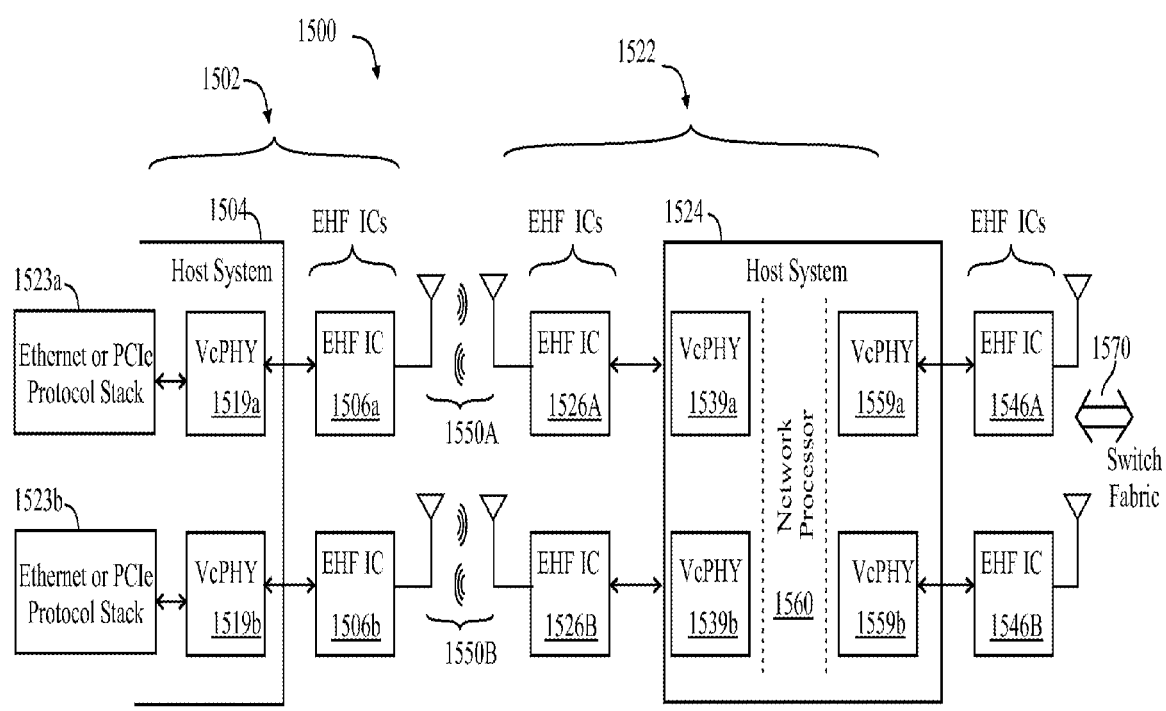
FIG. 15 is a diagram illustrating a device having a host system with a VcPHY interacting with one or more Standards-based LINKs and a VcPHY for interacting with an Ethernet Protocol Stack communicating with a device including a network processor for interfacing with a switch fabric.

FIG. 15 shows an embodiment 1500 of a device 1502 communicating over contactless links 1550A, 1550B (which may collectively be referred to as "1550") with a partner device 1522.

The device 1502 may comprise a host system 1504 and EHF ICs 1506A and 1506B (collectively referred to as "1506"). The EHF ICs 1506 may comprise one or more EHF-XCVRs, as described above. Other details of the device 1502 (such as a microprocessor or microcontroller) are omitted, for illustrative clarity.

The device 1522 may comprise EHF ICs 1526A and 1526B (collectively referred to as "1526"), and a host system 1524.

Additional EHF ICs 1546A and 1546B (collectively referred to as "1546") are shown communicating with the switch fabric 1570. These additional EHF ICs 1546A and 1546B may be included in the device 1522, or may be external to the device 1522.

The host system 1524 may comprise a network processor 1560 and VcPHYs, and may be arranged as follows:
- a VcPHY 1539a is connected between the network processor 1560 and the EHF IC 1526A.
- a VcPHY 1539b is connected between the network processor 1560 and the EHF IC 1526B.
- a VcPHY 1559a is connected between the network processor 1560 and the EHF IC 1546A.
- a VcPHY 1559b is connected between the network processor 1560 and the EHF IC 1546B.

The host system 1504 may be a server that interfaces with the network processor 1560 through a contactless link. The network processor 1560 may connect to the switch fabric 1570 through one or more contactless links. The communication between a computing system and a network processor may be through a contactless link. The communication between a network processor and the switch fabric may be through a contactless link.

Backplane applications may pose a significant physical bottleneck for higher data rate transmissions in networking applications. Optical links are supposed to mitigate these bottlenecks, but these links are expensive and have limitations due to physical constraints in terms of alignment of the optical fiber, size, etc. Contactless communication using EHF ICs mitigates these disadvantages of traditional wired links. Taking advantage of the techniques disclosed herein, particularly with respect to VcPHYs, the host system or server may be agnostic to the underlying physical media and can reliably transmit/receive data over the EHF contactless links.

As used herein, the term "backplane" may refer to a group of electrical connectors operating in conjunction with one another such as to allow several printed circuit boards to be connected together to make up a complete computer system. Mechanical connectors may be replaced by contactless connectors or contactless subsystems.

Figure 16:
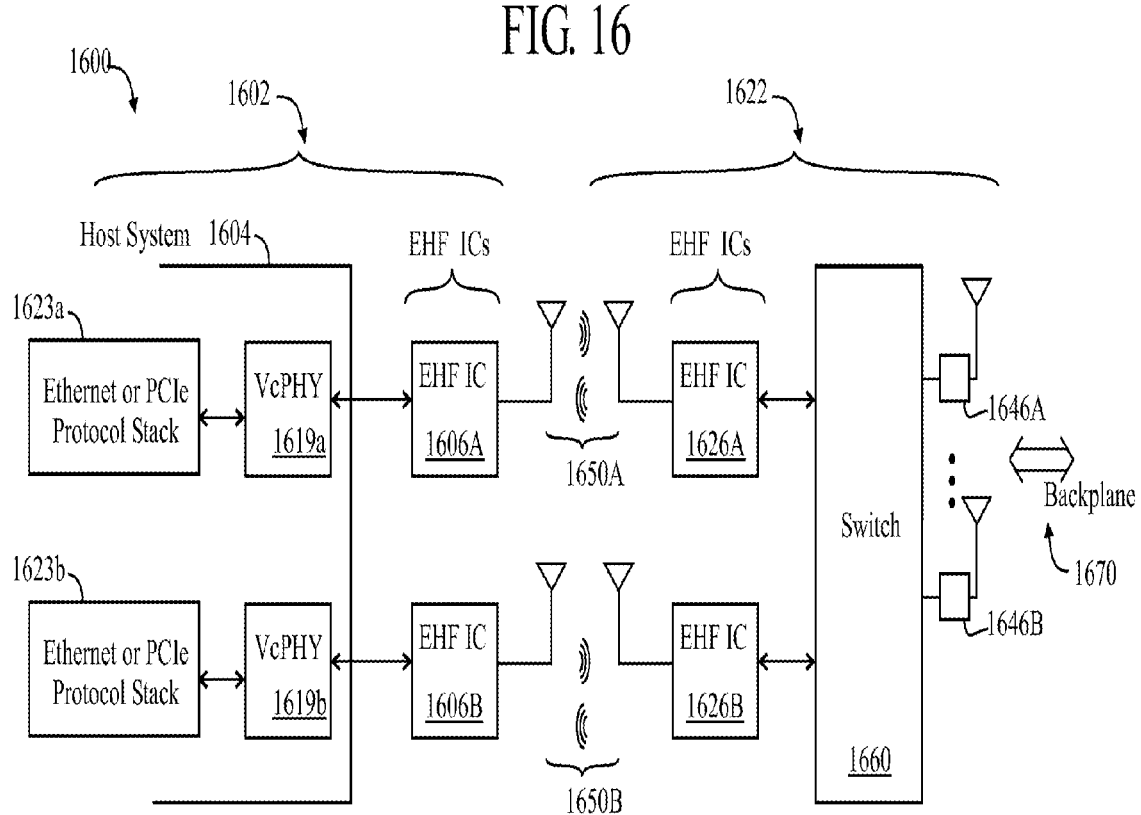
FIG. 16 is a diagram illustrating a device having a host system with a VcPHY interacting with one or more Standards-based LINKs and a VcPHY for interacting with an Ethernet Protocol Stack communicating with a device including a switch for interfacing with a backplane.

FIG. 16 shows an embodiment 1600 of a device 1602 communicating over contactless links 1650A, 1650B (which may collectively be referred to as "1650") with a partner device 1622.

The device 1602 may comprise a host system 1604 and EHF ICs 1606A and 1606B (collectively referred to as "1606"). The EHF ICs 1606 may comprise one or more EHF-XCVRs, as described above. Other details of the device 1602 (such as a microprocessor or microcontroller) are omitted, for illustrative clarity.

The device 1622 may comprise EHF ICs 1626A and 1626B (collectively referred to as "1626") and a switch chip 1660. Additional EHF ICs 1646A and 1646B (collectively referred to as "1646") are shown communicating with a backplane 1670.

This illustrates that the host system 1604 could be a server that can communicate with a switch chip 1660 through the EHF contactless links and the VcPHYs in the host system. The switch chip 1660 may, in turn, be coupled to the rest of the backplane environment through the EHF contactless links and the VcPHYs (not shown) in the switch chip itself, and EHF ICs. By avoiding transmission of base-band data over the physical backplane, the overall reliability and power dissipation due to transmission over the physical media may be dramatically mitigated. The switch chip 1660 may transmit and receive data that are compliant with traditional Ethernet protocols. The switch chip may be agnostic to the underlying PHY implementations.

Figure 17:
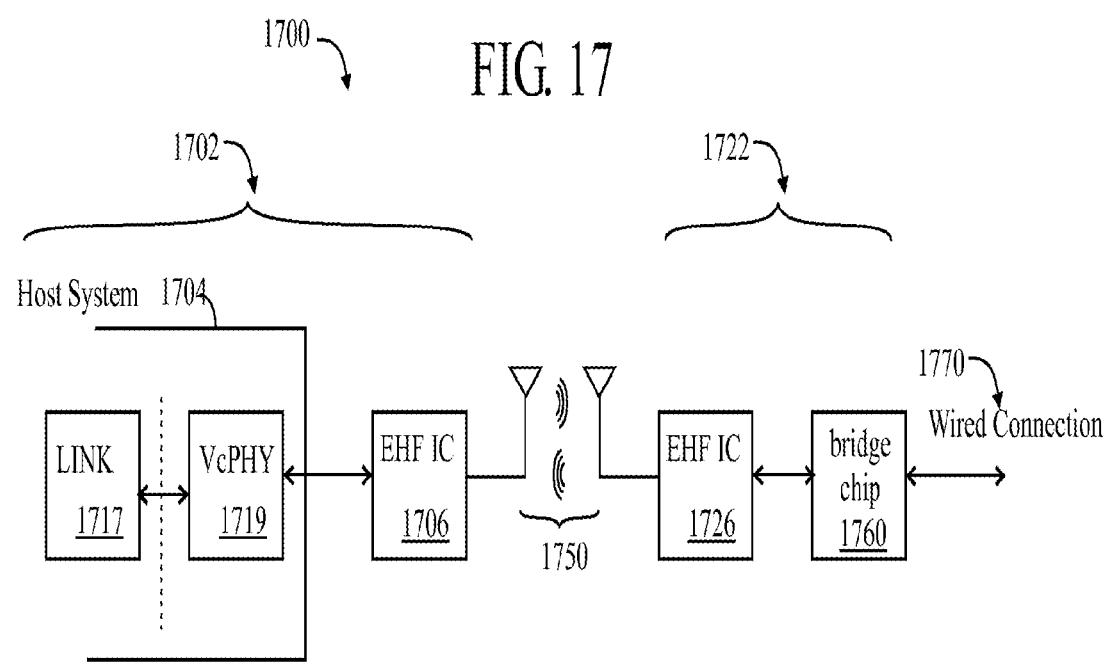
FIG. 17 is a diagram illustrating a device having a host system with a single VcPHY communicating over a contactless link with a device having a bridge chip.

FIG. 17 shows an embodiment where the host system 1704 of a device 1702 having a VcPHY 1719 is communicating via an EHF IC 1706 over a contactless link 1750 with a device 1722 comprising an EHF IC 1726 and a bridge chip 1760. A LINK 1717 in the host system may be compatible with any of the Standards-based protocols and the bridge chip 1760 may be designed to translate the data to/from the host system 1704, received and transmitted through its VcPHY, into a protocol data that is compatible with a different Standard and sent/received over a wired connection 1770. For example, the LINK may be designed for DisplayPort and the bridge chip can translate this data into a Thunderbolt-compatible data and maybe sent or received over the wired interface. Several extensions of this embodiment are possible including having the bridge chip translate the data stream received/transmitted from/to the host system into one or more data streams, each based on a different Standard.

As used herein, the term "bridge chip" may refer to an integrated circuit chip (or the like) which provides an interface between a contactless link and a wired (Standards-based) connection, allowing interconnection between two (or more) different I/O bus architectures and/or protocols.

In any of the embodiments described in this invention, the various layers or functionalities could be implemented either in software or in hardware depending on the particular device or system. In an embodiment, either or both of the VcPHY's cLINK and the LINK could be implemented in software. In one embodiment, part of the VcPHY could also be implemented in software, which may include part or whole of the cLINK. In one embodiment, the switch in FIG. 13 may be implemented in software.

While the invention(s) has been described with respect to a limited number of embodiments, these should not be construed as limitations on the scope of the invention(s), but rather as examples of some of the embodiments. Those skilled in the art may envision other possible variations, modifications, and implementations that should also be considered to be within the scope of the invention(s), based on the disclosure(s) set forth herein, and as may be claimed.

What is claimed is:

1. A method of communicating between electronic devices over an EHF contactless communications link, at least one device having a host system comprising a Physical Layer (PHY) and a first Standards-based Data Link Layer (LINK) and an EHF contactless HAT IC comprising at least one transceiver (EHF-XCVR) and capable of communicating over the EHF contactless communications link, the method comprising:

receiving a data stream operating according to specifications of the first LINK;

translating the data stream such that it operates according to specifications of a contactless link-based Link Layer (cLINK) existing within the PHY and specifications of a contactless Physical Layer (Host-cPHY) existing within the PHY, wherein the Host-cPHY implements interface specifications and medium requirements for sending and receiving signals over the EHF contactless link via the EHF contactless EHF IC, and wherein the cLINK couples the first LINK with the Host-cPHY; and contactlessly transmitting the translated data stream via the at least one EHF-XCVR.

2. The method of claim 1, wherein the cLINK enables the first LINK to communicate with the Host-cPHY as though the Host-cPHY is a Physical Layer implementation from a corresponding Standards' specification.

3. The method of claim 2, wherein the Standards' specification is selected from the group consisting of Display Port, HDMI, PCIe and USB.

4. The method of claim 1, further comprising using the cLINK to perform at least one of discovering, configuring and maintenance functions that are directed towards enabling and maintaining a contactless link.

5. The method of claim 1, further comprising using the cLINK to perform at least one of polling, beaconing and security verification functions.

6. The method of claim 1, further comprising using the cLINK to perform link training to establish the EHF contactless communications link.

7. The method of claim 1, further comprising using the cLINK to handle acknowledgements received from the Host-cPHY.

8. The method of claim 1, further comprising using the cLINK to ensure that incoming data transmitted from another device over the EHF contactless communications is successfully received.

9. The method of claim 1, wherein the cLINK and the Host-cPHY collectively form a virtualized contactless link-based Physical Layer (VcPHY) which is adapted to implement interface specifications and medium requirements for sending and receiving signals over the EHF contactless communications link.

10. The method of claim 9, further comprising:
performing a power on reset (POR) sequence.

11. The method of claim 10, wherein the POR sequence comprises:
beaconing, link training, and transporting data.

* * * * *

UNITED STATES PATENT AND TRADEMARK OFFICE
CERTIFICATE OF CORRECTION

PATENT NO. : 9,750,068 B2  
APPLICATION NO. : 15/408937  
DATED : August 29, 2017  
INVENTOR(S) : McCormack et al.

Page 1 of 1

It is certified that error appears in the above-identified patent and that said Letters Patent is hereby corrected as shown below:

In the Specification

In Column 54, Line 24, delete "email," and insert -- e-mail, --, therefor.

In Column 54, Line 25, delete "email," and insert -- e-mail, --, therefor.

In the Claims

In Column 56, Line 64, Claim 1, delete "HAT" and insert -- EHF --, therefor.

Signed and Sealed this  
Fifth Day of May, 2020

Andrei Iancu  
*Director of the United States Patent and Trademark Office*